(12) United States Patent
Kawazu et al.

(10) Patent No.: US 11,284,024 B2
(45) Date of Patent: Mar. 22, 2022

(54) SOLID-STATE IMAGING DEVICE, DRIVING METHOD, AND ELECTRONIC DEVICE

(71) Applicant: Sony Semiconductor Solutions Corporation, Kanagawa (JP)

(72) Inventors: Naoki Kawazu, Kanagawa (JP); Atsushi Suzuki, Kanagawa (JP); Takumi Oka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 18 days.

(21) Appl. No.: 16/461,942

(22) PCT Filed: Nov. 10, 2017

(86) PCT No.: PCT/JP2017/040618
§ 371 (c)(1),
(2) Date: May 17, 2019

(87) PCT Pub. No.: WO2018/096955
PCT Pub. Date: May 31, 2018

(65) Prior Publication Data
US 2019/0327430 A1     Oct. 24, 2019

(30) Foreign Application Priority Data

Nov. 25, 2016 (JP) .............................. JP2016-228617
Oct. 19, 2017 (JP) .............................. JP2017-202402

(51) Int. Cl.
*H04N 5/355* (2011.01)
*H04N 5/3745* (2011.01)
*H04N 5/378* (2011.01)

(52) U.S. Cl.
CPC ........... *H04N 5/3559* (2013.01); *H04N 5/378* (2013.01); *H04N 5/37455* (2013.01)

(58) Field of Classification Search
CPC ... H04N 5/3559; H04N 5/37455; H04N 5/378
See application file for complete search history.

(56) References Cited

U.S. PATENT DOCUMENTS

2010/0194904 A1*   8/2010  Takahashi .............. H04N 5/243
                                                                                           348/222.1
2011/0242381 A1   10/2011  Sakakibara et al.
(Continued)

FOREIGN PATENT DOCUMENTS

JP      2004-159274 A     6/2004
JP      2006-033454 A     2/2006
(Continued)

OTHER PUBLICATIONS

International Search Report and English translation thereof dated Feb. 6, 2018 in connection with International Application No. PCT/JP2017/040618.

*Primary Examiner* — Twyler L Haskins
*Assistant Examiner* — Fayez A Bhuiyan
(74) *Attorney, Agent, or Firm* — Wolf, Greenfield & Sacks, P.C.

(57) ABSTRACT

The present technology relates to a solid-state imaging device, a driving method, and an electronic device that are able to enhance a gray scale of a combined pixel value obtained from a pixel including a plurality of photoelectric conversion units having different light receiving sensitivities.

In a pixel array unit, a pixel including a plurality of photoelectric conversion units having different light receiving sensitivities is disposed. An analog to digital (AD) conversion unit that compares an electric signal corresponding to a charge of the photoelectric conversion unit having a low light receiving sensitivity among the plurality of photoelectric conversion units included in the pixel of the pixel array unit with a nonlinear reference signal that (Continued)

changes nonlinearly to perform AD conversion on the electric signal. The present technology is able to be applied to, for example, a complementary metal-oxide semiconductor (CMOS) image sensor.

16 Claims, 30 Drawing Sheets

(56) References Cited

U.S. PATENT DOCUMENTS

2016/0241803 A1* 8/2016 Ohya ................. H04N 5/37455
2018/0241955 A1* 8/2018 Sakano ................. H04N 5/378

FOREIGN PATENT DOCUMENTS

| JP | 2011-229120 A | 11/2011 |
| JP | 2016-048813 A | 4/2016 |
| WO | 2016/147885 A1 | 9/2016 |

* cited by examiner

SOLID-STATE IMAGING DEVICE, DRIVING METHOD, AND ELECTRONIC DEVICE

CROSS-REFERENCE TO RELATED APPLICATIONS

This application claims the benefit under 35 U.S.C. § 371 as a U.S. National Stage Entry of International Application No. PCT/JP2017/040618, filed in the Japanese Patent Office as a Receiving Office on Nov. 10, 2017, which claims priority to Japanese Patent Application Number JP2017-202402, filed in the Japanese Patent Office on Oct. 19, 2017, and Japanese Patent Application Number JP2016-228617, filed in the Japanese Patent Office on Nov. 25, 2016, each of which is hereby incorporated by reference in its entirety.

TECHNICAL FIELD

The present technology relates to a solid-state imaging device, a driving method, and an electronic device, and more particularly to, for example, a solid-state imaging device, a driving method, and an electronic device capable of enhancing a gray scale in a case of combining outputs of two photodiodes (PDs) having different light receiving sensitivities so that a pixel value has a wide dynamic range.

BACKGROUND ART

For example, in an image sensor, as a technology of combining outputs of a plurality of PDs having different light receiving sensitivities so that a pixel value has a wide dynamic range, there is a technology of combining outputs of a large PD having a large size and a small PD having a size smaller than that of the large PD.

For example, in a case in which a gray scale of a pixel value obtained from each of the large PD and the small PD is expressed by 12 bits (0 to 4096) (about 72 dB), a sensitivity ratio between the large PD and the small PD is (about) 240 times (47 dB), and thus it is possible to realize a pixel value of the gray scale of (about) 120 dB (≈72 dB+47 dB) as a combined pixel value obtained by combining outputs of the large PD and the small PD.

In the combination of the outputs of the large PD and the small PD, for example, until the output of the large PD is saturated, the output of the large PD is adopted as the combined pixel value, after the output of the large PD is saturated, the output of the small PD is multiplied by a digital gain of 240 times, and then the output of the small PD is adopted as the combined pixel value.

Therefore, after the output of the large PD is saturated, since a value obtained by multiplying the output of the small PD by the digital gain of 240 times is adopted as the combined pixel value, the gray scale of the combined pixel value becomes coarse as compared with a case in which the output of the large PD is adopted.

Note that, in the image sensor, it has been proposed to perform gamma correction by nonlinearly changing a waveform of a ramp wave used for analog to digital (AD) conversion of the output of the PD (for example, refer to Patent Literature 1).

CITATION LIST

Patent Literature

Patent Literature 1: JP 2006-33454A

DISCLOSURE OF INVENTION

Technical Problem

As described above, since the value obtained by multiplying the output of the small PD by a predetermined digital gain is adopted as the combined pixel value after the saturation of the output of the large PD, the gray scale of the combined pixel value of the output of the small PD is coarser than the gray scale of the combined pixel value in a case in which the output of the large PD is adopted.

The present technology has been made in view of such a situation, and is intended to enhance the gray scale.

Solution to Problem

A first solid-state imaging device of the present technology is a solid-state imaging device including: a pixel array unit in which a pixel including a plurality of photoelectric conversion units having different light receiving sensitivities is disposed; and an analog to digital (AD) conversion unit that compares an electric signal corresponding to a charge of the photoelectric conversion unit having a low light receiving sensitivity among the plurality of photoelectric conversion units included in the pixel of the pixel array unit with a nonlinear reference signal that changes nonlinearly to perform AD conversion on the electric signal.

A first driving method of the present technology is a driving method including: comparing an electric signal corresponding to a charge of a photoelectric conversion unit having a low light receiving sensitivity among a plurality of photoelectric conversion units included in a pixel of a pixel array unit in which the pixel including the plurality of photoelectric conversion units having different light receiving sensitivities is disposed with a nonlinear reference signal that changes nonlinearly to perform analog to digital (AD) conversion on the electric signal.

A first electronic device of the present technology is an electronic device including: a solid-state imaging device; and a control unit that controls the solid-state imaging device. The solid-state imaging device includes: a pixel array unit in which a pixel including a plurality of photoelectric conversion units having different light receiving sensitivities is disposed; and an analog to digital (AD) conversion unit that compares an electric signal corresponding to a charge of the photoelectric conversion unit having a low light receiving sensitivity among the plurality of photoelectric conversion units included in the pixel of the pixel array unit with a nonlinear reference signal that changes nonlinearly to perform AD conversion on the electric signal.

In the first solid-state imaging device, driving method, and electronic device of the present technology, an electric signal corresponding to a charge of a photoelectric conversion unit having a low light receiving sensitivity among a plurality of photoelectric conversion units included in a pixel of a pixel array unit in which the pixel including the plurality of photoelectric conversion units having different light receiving sensitivities is disposed is compared with a nonlinear reference signal that changes nonlinearly to perform analog to digital (AD) conversion on the electric signal.

A second solid-state imaging device of the present technology is a solid-state imaging device including: a pixel array unit in which a pixel including a plurality of photoelectric conversion units having different light receiving sensitivities is disposed; and an analog to digital (AD) conversion unit that compares an electric signal corresponding to a charge of the photoelectric conversion unit having a low light receiving sensitivity among the plurality of photoelectric conversion units included in the pixel of the pixel array unit with a linear reference signal that changes linearly to perform AD conversion on the electric signal. The AD conversion unit includes: a comparator that compares the electric signal with the linear reference signal; and a counter that outputs a count value obtained by counting a time required for a change of the linear reference signal according to a clock of which a frequency is changed until the electrical signal and the linear reference signal match according to a result of the comparison between the electrical signal and the linear reference signal.

A second driving method of the present technology is a driving method including: by an analog to digital (AD) conversion unit of an solid-state imaging device including a pixel array unit in which a pixel including a plurality of photoelectric conversion units having different light receiving sensitivities is disposed, and the AD conversion unit that compares an electric signal corresponding to a charge of the photoelectric conversion unit having a low light receiving sensitivity among the plurality of photoelectric conversion units included in the pixel of the pixel array unit with a linear reference signal that linearly changes to perform an AD conversion on the electric signal, comparing the electric signal with the linear reference signal; and outputting a count value obtained by counting a time required for a change of the linear reference signal according to a clock of which a frequency is changed until the electrical signal and the linear reference signal matches according to a result of the comparison between the electrical signal and the linear reference signal.

A second electronic device of the present technology is an electronic device including: a solid-state imaging device; and a control unit that controls the solid-state imaging device. The solid-state imaging device includes: a pixel array unit in which a pixel including a plurality of photoelectric conversion units having different light receiving sensitivities is disposed; and an analog to digital (AD) conversion unit that compares an electric signal corresponding to a charge of the photoelectric conversion unit having a low light receiving sensitivity among the plurality of photoelectric conversion units included in the pixel of the pixel array unit with a linear reference signal that changes linearly to perform AD conversion on the electric signal, and the AD conversion unit comprises: a comparator that compares the electric signal with the linear reference signal; and a counter that outputs a count value obtained by counting a time required for a change of the linear reference signal according to a clock of which a frequency is changed until the electrical signal and the linear reference signal match according to a result of the comparison between the electrical signal and the linear reference signal.

In the second solid-state imaging device, driving method, and electronic device of the present technology, an electric signal corresponding to a charge of a photoelectric conversion unit having a low light receiving sensitivity among a plurality of photoelectric conversion units included in a pixel of a pixel array unit in which the pixel including the plurality of photoelectric conversion units having different light receiving sensitivities is disposed is compared with a nonlinear reference signal that changes nonlinearly to perform analog to digital (AD) conversion on the electric signal. In the AD conversion, the electrical signal is compared with the linear reference signal, and a count value obtained by counting a time required for a change of the linear reference signal according to a clock of which a frequency is changed until the electrical signal and the linear reference signal match according to a result of the comparison between the electrical signal and the linear reference signal is output.

Advantageous Effects of Invention

According to the present technology, it is possible to enhance the gray scale.

MODE(S) FOR CARRYING OUT THE INVENTION

<Pixel Value Has Wider Dynamic Range by Combining Outputs of Plurality of PDs Having Different Light Receiving Sensitivities>

In an image sensor, a technology of combining outputs of a plurality of PDs having different light receiving sensitivities so that a pixel value has a wide dynamic range will be described.

As the plurality of PDs having the different light receiving sensitivities, for example, a plurality of PDs having different sizes are able to be adopted.

Figure 1:
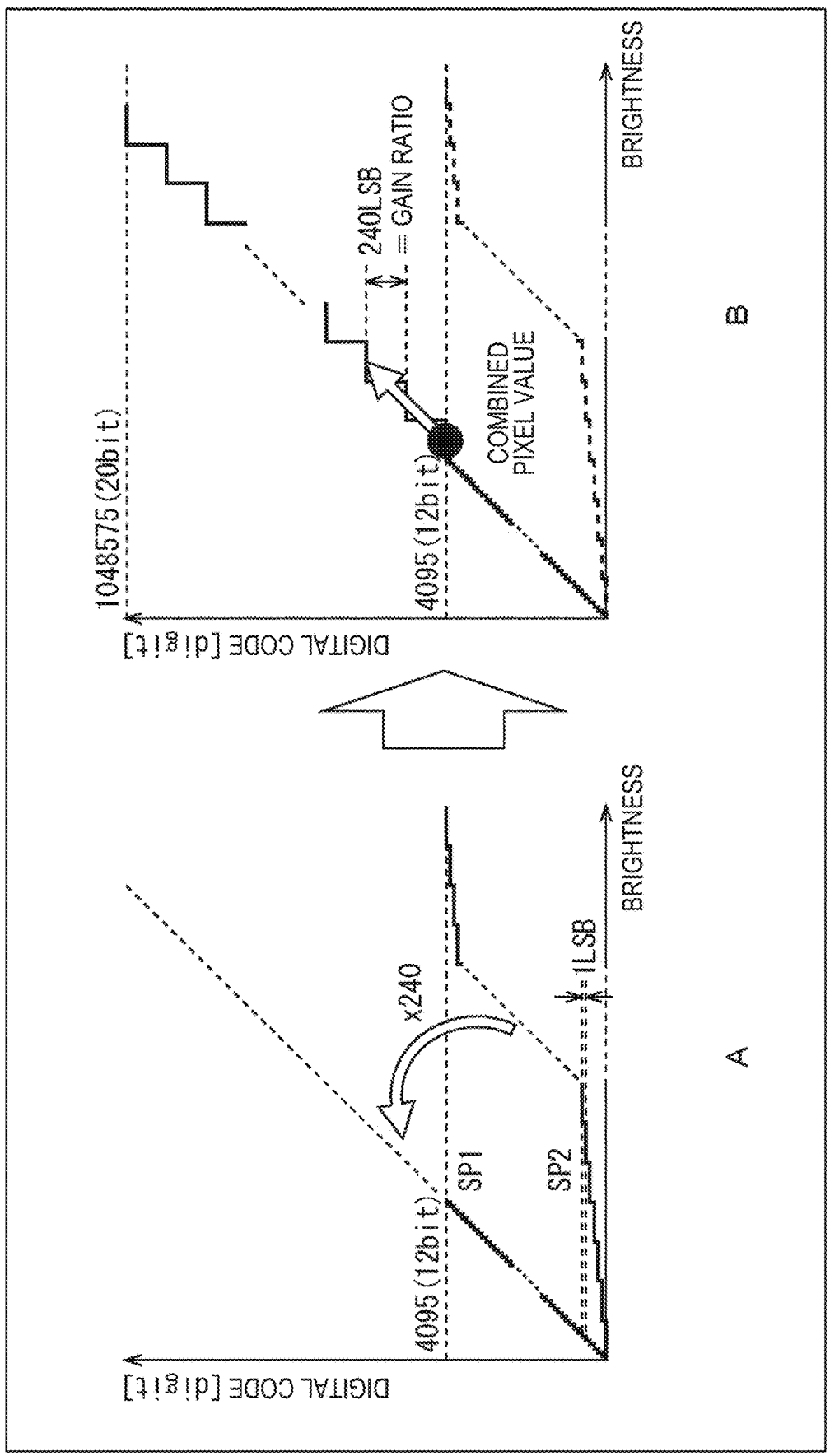
FIG. 1 is a diagram illustrating an example of a technology for combining outputs of large and small pixels so that a pixel value has a wide dynamic range.

FIG. 1 illustrates an example of a technology for combining outputs of a large PD (also referred to as SP1 in the drawing) with a large size and a small PD (also referred to as SP2 in the drawing) with a smaller size than the large PD so that a pixel value has a wide dynamic range.

For example, as illustrated in A of FIG. 1, a pixel value in which a sensitivity ratio of the large PD to the small PD is 240 and gray scales of both the PDs before the combination are 4096 (12 bits) can have a wide dynamic range as wide as 1048576 (20 bits) (to realize 120 dB) if an output of the small PD is multiplied by a digital gain of 240. However, when the digital gain is multiplied, the gray scales may be roughened by a factor of 240 in a region in which an output of the small PD is combined compared to a region in which an output of the large PD is adopted, as illustrated in B of FIG. 1.

When the gray scales of the pixel value are roughened in this way, a necessary resolution may not be satisfied, for example, for use of on-vehicle sensing or the like.

For example, in on-vehicle sensing, there is a request to achieve constant resolution (Con Res.)=ΔLSB/digital code of 1% or less. In the example of FIG. 1, however, Con Res.=5.85 (=240/4095×100)% is obtained at a point at which the large PD switches to the small PD. Thus, the above-described request may not be achieved.

As a method of reducing Con Res., a method of causing the waveform of a ramp wave to be nonlinear for comparing outputs of PDs at the time of AD conversion of the outputs of the PDs can be exemplified. Additionally, a method of causing the waveform of a ramp wave to be nonlinear is disclosed in, for example, PTL 1.

According to the technology disclosed in PTL 1, the waveform of a ramp wave can be caused to be nonlinear. However, since its use is gamma correction, Con Res. at the time of combination of outputs of large and small PDs may not be improved.

Therefore, the present technology is provided to improve Con Res. at the time of combination of outputs of a plurality of PDs.

FIG. 1 is a diagram for explaining a wide dynamic range of a pixel value obtained by combining outputs of two PDs as a plurality of photoelectric conversion units having different light receiving sensitivities.

A of FIG. 1 is a diagram showing a relationship between brightness of light incident on the SP1 and the SP2 and a digital code that is an AD conversion result obtained by performing AD conversion on outputs of the SP1 and the SP2, with respect to the SP1 that is a large PD of which the size is large and the light receiving sensitivity is high and the SP2 that is a small PD of which the size is smaller than that of the large PD and of which the light receiving sensitivity is lower than that of the large PD.

In A of FIG. 1, outputs of both the SP1 and the SP2 are AD converted into 12 bits. Hereinafter, AD conversion into N bits also referred to as N bit AD conversion. A digital code obtained by 12 bit AD conversion of the outputs of the SP1 and the SP2 is a value in a range of 0 to 4095.

Here, hereinafter, the digital code obtained by the AD conversion of the output of the SP1 is also referred to as a digital code of the SP1. Similarly, the digital code obtained by the AD conversion of the output of the SP2 is also referred to as a digital code of the SP2.

In A of FIG. 1, a ratio of the light receiving sensitivities of the SP1 and the SP2 has become (about) 240 times (47 dB). That is, the light receiving sensitivity of the SP1 is 240 times as high as the light receiving sensitivity of the SP2.

Therefore, a least significant bit (LSB) of the digital code of the SP2 corresponds to the brightness of 240 times the brightness corresponding to an LSB of the digital code of the SP1.

B of FIG. 1 is a diagram showing an example of a relationship between the brightness of the light incident on the SP1 and the SP2 and the digital code as the combined pixel value obtained by combining the outputs of the SP1 and the SP2.

In a case in which a wide dynamic range is realized by combining the outputs of the SP1 and the SP2, in combining the outputs of the SP1 and the SP2, for example, the digital code of the SP1 is adopted (selected) as a combined pixel value until the output of the SP1 is saturated, after the output of the SP1 is saturated, the digital code of the SP2 is multiplied by a digital gain of 240 times that is the ratio of the light receiving sensitivities of the SP1 and the SP2, and the digital code of the SP2 is adopted as the combined pixel value. Hereinafter, obtaining the combined pixel value as described above is also referred to as combination of the digital codes of the SP1 and the SP2.

Here, the digital codes of the SP1 and the SP2 are both 12 bits (about 72 dB), since the ratio of the light receiving sensitivities of the SP1 and the SP2 is 240 times (about 47 dB) (about 8 bits), and according to the combined pixel value obtained by combining the outputs of the SP1 and the SP2, (about) 120 dB (≈72 dB+47 dB), that is, a range of 0 to 1048675 expressed by 20 bits (≈12 bits+8 bits) of wide (high) dynamic range is able to be achieved.

According to the combination of the digital codes of the SP1 and the SP2, it is possible to improve a signal to noise ratio (S/N) at the time of a low illuminance of the combined pixel value by the digital code of the SP1. In addition, it is possible to enhance a saturation illuminance (characteristic) of the pixel and achieve the wide dynamic range of the combined pixel value by the digital code of the SP2. Furthermore, it is possible to suppress motion artifacts.

However, in the combination of the digital codes of the SP1 and the SP2, since the digital code of the SP2 is multiplied by 240 to be the combined pixel value, a change of the LSB (1 LSB) of the digital code of the SP2 is expressed as a change of 240 LSB.

Therefore, in a case in which the digital code of the SP2 (240 times) is adopted as the combined pixel value, the gray scale is coarsened by 240 times as compared with a case in which the digital code of the SP1 is adopted.

Now, it is assumed that a value expressed by ΔLSB/digital code is adopted as an example of an index of fineness (roughness) of the gray scale of a pixel value.

Here, "digital code" in the ΔLSB/digital code represents the digital code as the combined pixel value and "ΔLSB" represents an amount of the change in the digital code as the combined pixel value when the LSB of the digital code of the SP1 or the digital code of the SP2 is changed.

In addition, the value represented by the ΔLSB/digital code is referred to as Constant resolution and will be abbreviated as Con Res.

In the combined pixel value, the Con Res. is degraded most at a switching point between a time at which the digital code of the SP1 is employed and a time at which the digital code of the SP2 is employed. That is, in FIG. 1, since Con Res. is degraded most in a case in which the digital code of the combined pixel value is 4095 and the digital code of the combined pixel value is increased by 1×240 in a case in which the digital code of the SP2 is increased by 1 in a state in which the digital code of the combined pixel value is 4095, the Con Res. becomes 240/4095≈5.85%.

For example, regarding the image sensor mounted on a car, Con Res. of 1% or less may be required, however, in the combination of the digital codes of the SP1 and the SP2 shown in FIG. 1, Con Res. of 1% or less is not able to be achieved.

Therefore, in the present technology, the gray scale of the combined pixel value is enhanced, and Con Res. that is equal to or less than a predetermined value such as 1% or less is achieved.

In an image sensor to which an embodiment of the present technology is applied, a high-sensitivity PD (for example, a PD with a large size; hereinafter referred to as an SP1), a low-sensitivity PD (for example, a PD with a small size; hereinafter referred to as an SP2), and a capacitor (FC) in a pixel are disposed in one pixel cell. In the SP1, correlated double sampling (CDS) driving in which D-phase data is read after P-phase data is read is adopted. On the other hand, in the SP2, double data sampling (DDS) driving in which P-phase data is read after D-phase data is read is adopted.

Here, in the image sensor to which the present technology is applied, the pixel has a plurality of PDs (the SP1 and the SP2) as the photoelectric conversion unit that performs the photoelectric conversion, and AD conversion of an electric signal output from the pixel is performed by a reference signal comparison type AD conversion.

In the reference signal comparison type AD conversion, for example, a reference signal that changes with time, such as a ramp signal (ramp wave), is compared with an electric signal on which the AD conversion is to be performed. In addition, a time until a magnitude relationship between the reference signal and the electric signal changes is counted. A count value obtained by counting the time is set as the digital code as an AD conversion result of the electric signal.

In addition, in the image sensor to which the present technology is applied, AD conversion of a noise signal and AD conversion of a data signal are performed as the AD conversion of the electric signal output from the pixel.

In the AD conversion of the noise signal, a voltage of a floating diffusion (FD) configuring the pixel is AD converted as the noise signal immediately after reset of the FD to a power voltage, and in the AD conversion of the data signal, the voltage of the FD is AD converted as the data signal immediately after a charge obtained by a photoelectric conversion of the PD is transmitted to the FD.

In the AD conversion of the noise signal, the reference signal to be compared with the noise signal is changed only for a predetermined period, and this predetermined period is also referred to as a P (Preset) phase. Similarly, in the AD conversion of the data signal, the reference signal to be compared with the data signal is changed only for a predetermined period, and this predetermined period is also referred to as a D (Data) phase.

Further, in the image sensor, an electric signal is output from the pixel, AD conversion of the electric signals is performed, and a digital code as a result of the AD conversion is obtained, which is referred to as reading of the digital code from the pixel. In addition, operating the pixel so as to read the digital code from the pixel is referred to as driving the pixel. Furthermore, in reading of the digital code from the pixel, data (the AD conversion result of the noise signal) read in the P phase is also referred to as P phase data and data read in the D phase is also referred to as D phase data (the AD conversion result of the data signal).

A driving method of a pixel includes CDS driving and DDS driving. In the CDS driving, first, the P phase data is read and then the D phase data is read. In the DDS driving, first, the D phase data is read and then the P phase data is read.

In addition, in either of the CDS driving and the DDS driving, a difference between the D phase data and the P phase data is obtained as the AD conversion result of a signal component corresponding to the electric signal that is generated by the photoelectric conversion by the PD of the pixel. By taking the difference between the D phase data and the P phase data, it is possible to reduce noise.

In driving the pixel, a reference signal used for the AD conversion of the electric signal (the noise signal and the data signal) output from the pixel is able to be generated by, for example, a digital to analog converter (DAC) (DA converter).

Figure 2:
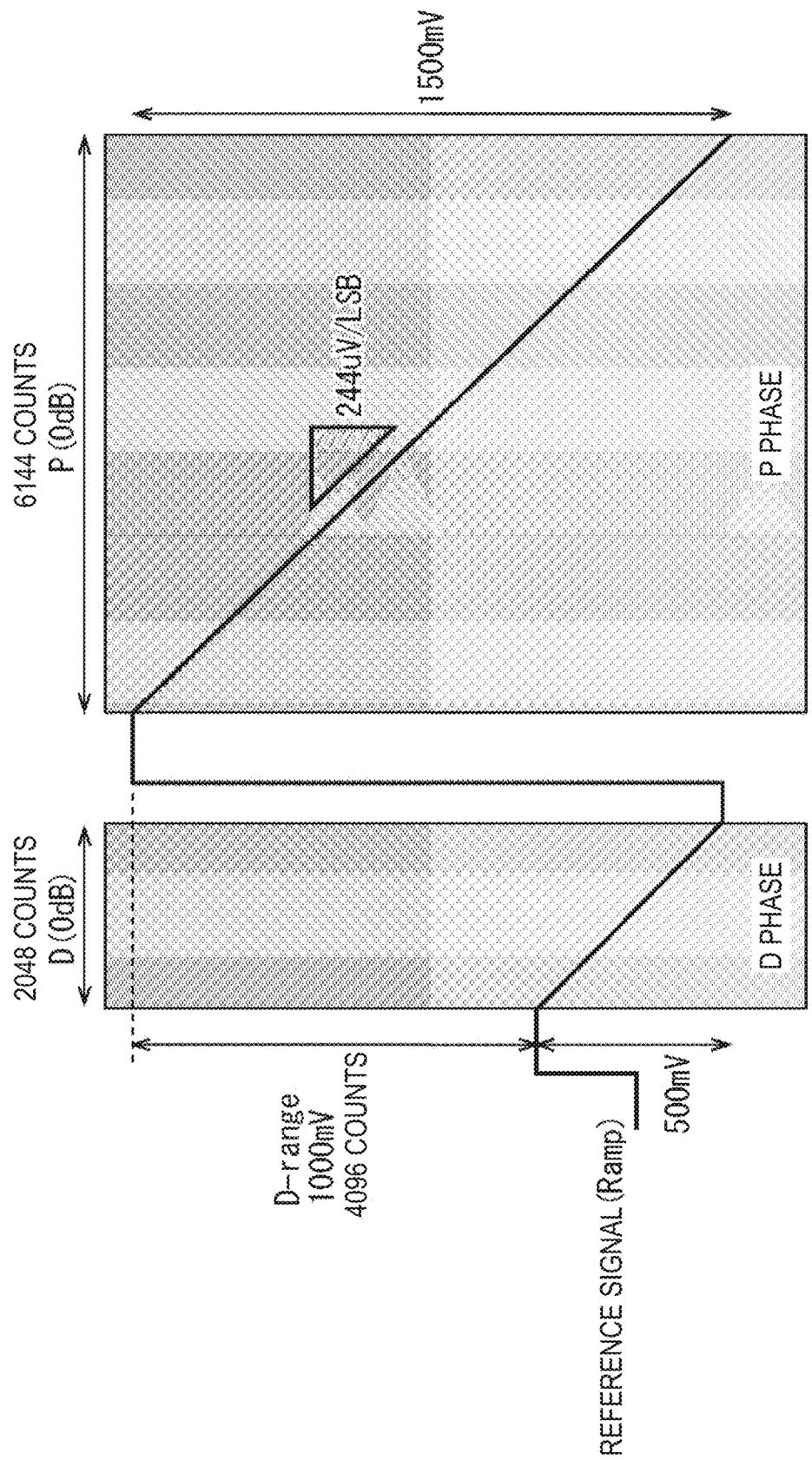
FIG. 2 is a diagram illustrating a nonlinear output of a DA converter.
Figure 3:
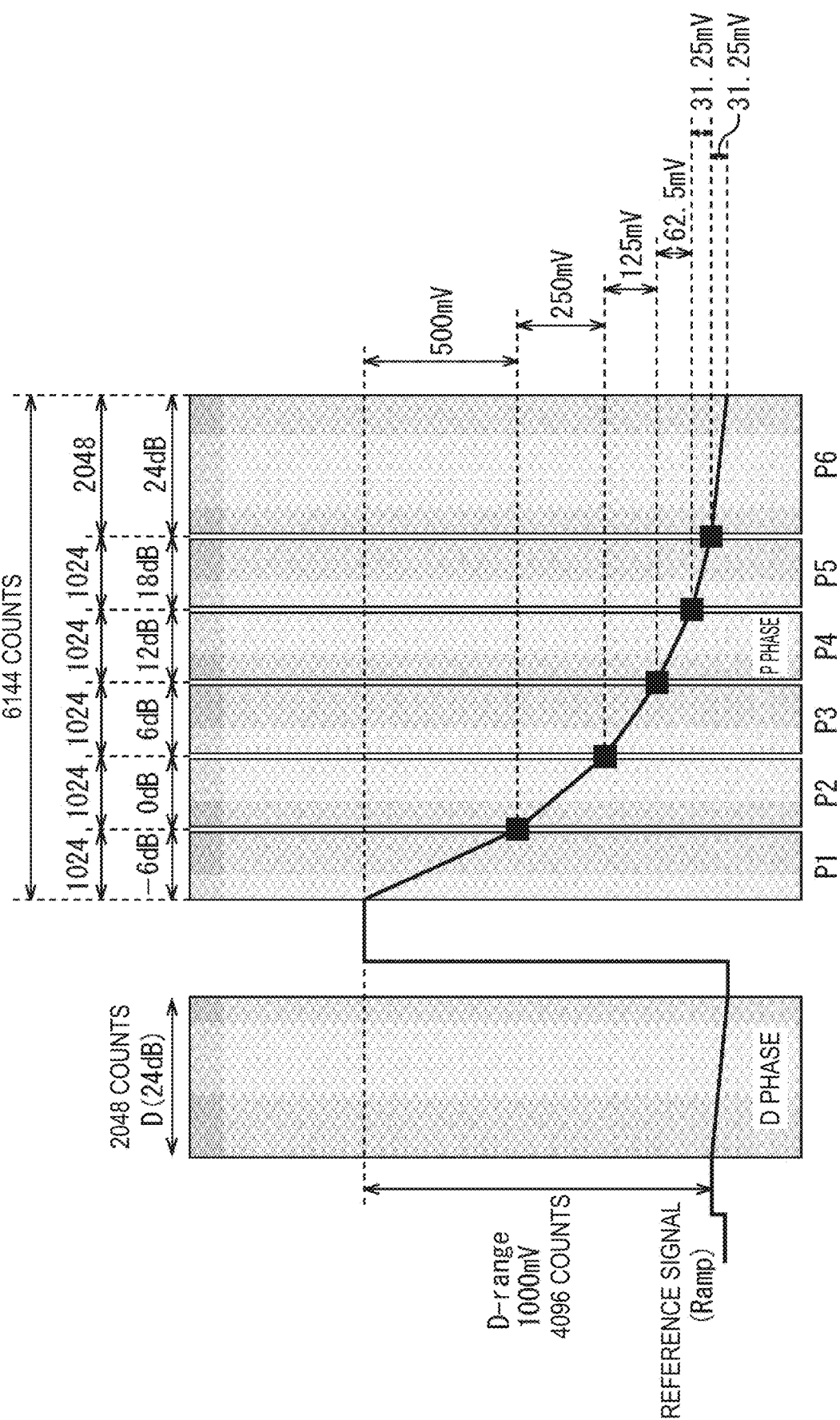
FIG. 3 is a diagram illustrating a nonlinear output of a DA converter to which an embodiment of the present technology is applied.

FIG. 2 illustrates a linear output (a ramp wave) of an DA converter in the DDS driving. FIG. 3 illustrates an output (a ramp wave) of an DA converter of an image sensor to which an embodiment of the present technology is applied in the DDS driving. As illustrated in FIG. 3, the output of the DA converter of the image sensor to which an embodiment of the present technology is applied is set to be nonlinear, for example, from 24 dB to −6 dB.

In this case, Con Res.=0.36 (=(240/16)/4095×100)% is satisfied, and thus a request for setting Con Res. to 1% or less can be achieved.

That is, FIG. 2 is a waveform diagram showing a first example of the reference signal used for the AD conversion of the DDS driving. FIG. 3 is a waveform diagram showing a second example of the reference signal used for the AD conversion of the DDS driving.

Note that, in FIGS. 2 and 3, a horizontal axis represents time and a vertical axis represents a voltage (or a level).

In the first example of the reference signal of FIG. 2, the reference signal (voltage) decreases linearly (with a constant slope) in the D phase, thereafter, the reference signal increases to a voltage higher than a voltage at the start of the D phase by 1000 mV just before the P phase and then decreases linearly in the P phase.

In addition, in FIG. 2, the D phase is a period of 2048 counts of the count value of the counter that counts the time until the magnitude relationship between the electric signal output from the pixel and the reference signal changes (according to a clock having a constant frequency), and the reference signal decreases by 500 mV during the 2048 counts.

Here, a gain (analog gain) of the AD conversion performed using the reference signal that decreases linearly by 500 mV during the 2048 counts is set to 0 dB.

In FIG. 2, the P phase is started after the reference signal increases to the voltage higher than the voltage at the start of the D phase by 1000 mV. Therefore, a voltage difference between the reference signal at the start of the P phase and the reference signal at the start of the D phase is 1000 mV (here, corresponding to a voltage corresponding to 4096 counts), but in the DDS driving, 1000 mV that is the voltage difference becomes the dynamic range (D-range) of the AD conversion. Note that, in the CDS driving, a voltage difference between the reference signal at an end of the P phase and the reference signal at an end of the D phase becomes the dynamic range of the AD conversion.

In FIG. 2, in the P phase, the reference signal decreases linearly by 1500 mv during the 6144 counts. Therefore, in FIG. 2, the slopes of the reference signals of the D phase and the P phase are the same and constant, −500 mV/2048 counts=−1500 mV/6144 counts≈−244 µV/count (LSB). In addition, the gain of the AD conversion performed using the reference signal is 0 dB.

Here, for example, since the gain of the AD conversion corresponds to the slope of the reference signal, the reference signal on which AD conversion of a certain gain x [dB] is performed is also referred to as a reference signal of x [dB].

In addition, in the D phase and the P phase, the reference signal is able to be changed so as to increase in addition to being changed so as to decrease. However, in the present specification, in order to simplify the description, a case in which the reference signal is changed so as to decrease is described, and a case in which the reference signal is changed so as to increase is not described.

In the second example of the reference signal of FIG. 3, similarly to a case of the first example, the reference signal decreases linearly in the D phase, and thereafter, the reference signal increases to a voltage higher than a voltage at the start of the D phase by 1000 mV just before the P phase and then decreases in the P phase. Furthermore, in FIG. 3, similarly to FIG. 2, the D phase is a period of 2048 counts and the P phase is a period of 6144 counts.

However, in the P phase, in the first example of the reference signal, the reference signal decreases linearly, but in the second example of the reference signal, the reference signal changes nonlinearly. In FIG. 3, the reference signal changes in a so-called concave shape in the P phase.

That is, here, for convenience, the P phase is divided into six sub periods of a P1 phase, a P2 phase, a P3 phase, a P4 phase, a P5 phase, and a P6 phase in order from the earliest. In the P phase of 6144 counts, the P1 phase, the P2 phase, the P3 phase, the P4 phase, the P5 phase, and the P6 phase have a period of 1024 counts from the beginning, a period of the next 1024 counts, a period of the next 1024 counts, a period of the next 1024 counts, a period of the next 1024 counts, and a period of the last 2048 counts, respectively.

In addition, reference signals of the P1 phase, the P2 phase, the P3 phase, the P4 phase, the P5 phase, and the P6 phase are a reference signal of 6 dB, a reference signal of 0 dB, a reference signal of 6 dB, a reference signal of 12 dB, a reference signal of 18 dB, and a reference signal of 24 dB, respectively.

Since the slope of the reference signal 0 dB of the P2 phase is −500 mV/2048 counts=−250 mV/1024 counts, the reference signal decreases by 250 mV in the P2 phase of 1024 counts.

Since the slope of the reference signal of −6 dB of the P1 phase is twice the slope of the reference signal of 0 dB, in the P1 phase of 1024 counts, the reference signal decreases by 500 mV=250 Mv×2.

Since the slope of the reference signal of 6 dB of the P3 phase is half the slope of the reference signal of 0 dB, in the P3 phase of 1024 counts, the reference signal decreases by 125 mV=250 mV/2.

Since the slope of the reference signal of 12 dB of the P4 phase is ¼ of the slope of the reference signal of 0 dB, in the P4 phase of 1024 counts, the reference signal decreases by 62.5 mV=250 mV/4.

Since the slope of the reference signal of 18 dB of the P5 phase is ⅛ of the slope of the reference signal of 0 dB, in the P5 phase of 1024 counts, the reference signal decreases by 31.25 mV=250 mV/8.

Since the slope of the reference signal of 24 dB of the P6 phase is 1/16 of the slope of the reference signal of 0 dB, in the P6 phase of 2048=1024×2 counts, the reference signal decreases by 31.25 mV=250 mV/16×2.

Note that, in the second example of the reference signal of FIG. 3, the D phase is the period of 2048 counts similarly to the case of FIG. 2. However, in FIG. 3, the reference signal of the D phase is not a reference signal of 0 dB but is the reference signal of 24 dB similar to the last P6 phase of the P phase.

It is possible to enhance the Con Res. by adopting a higher gain of the reference signal in a period during which a voltage of the reference signal of the P phase at the time of the DDS driving is lower, that is, a period of a side of the P6 phase in FIG. 3.

In FIG. 3, the reference signal of 24 dB is adopted in the P6 phase, and it is possible to enhance the Con Res. by 24 dB, that is, to about 1/16 times as compared with a case of FIG. 2 in which the reference signal of 0 dB is adopted in a similar period.

Therefore, for example, in a case in which the Con Res. in a case of adopting the reference signal of FIG. 2 is 5.85% as described with reference to FIG. 1, in a case of adopting the reference signal of FIG. 3, it is possible to enhance the Con Res. to 0.36%≈5.85%/16.

That is, with respect to the SP2, it is possible to enhance the gray scale of the combined pixel value by performing the AD conversion by the application of the reference signal of FIG. 3.

Note that, as in the first example of the reference signal of FIG. 2, the linearly changing reference signal is also referred to as a linear reference signal, and as in the second example of the reference signal of FIG. 3, the nonlinearly changing reference signal is also referred to as a nonlinear reference signal.

Regarding the gain at the P1 phase to the P6 phase of the nonlinear reference signal, the gain of the last P6 phase of the P phase is able to be determined, and the gain of the P5 to P1 phases is able to be determined so as to gradually decrease, from the gain of the P6 phase. For example, the gain of the last P6 phase of the P phase is able to be determined according to the gray scale of the required combined pixel values, that is, for example, the required Con Res.

Here, in FIG. 3, the P phase is divided into the six sub periods of the P1 phase to the P6 phase, in each sub period, and by adopting the linearly changing reference signal and gradually increasing the gain of the reference signal of the P1 phase to the P6 phase, the reference signal is changed nonlinearly in the entire P phase. However, the number of sub periods into which the P phase is divided is not limited to six. That is, the P phase is able to be divided into two or a greater arbitrary number of sub periods.

Figure 4:
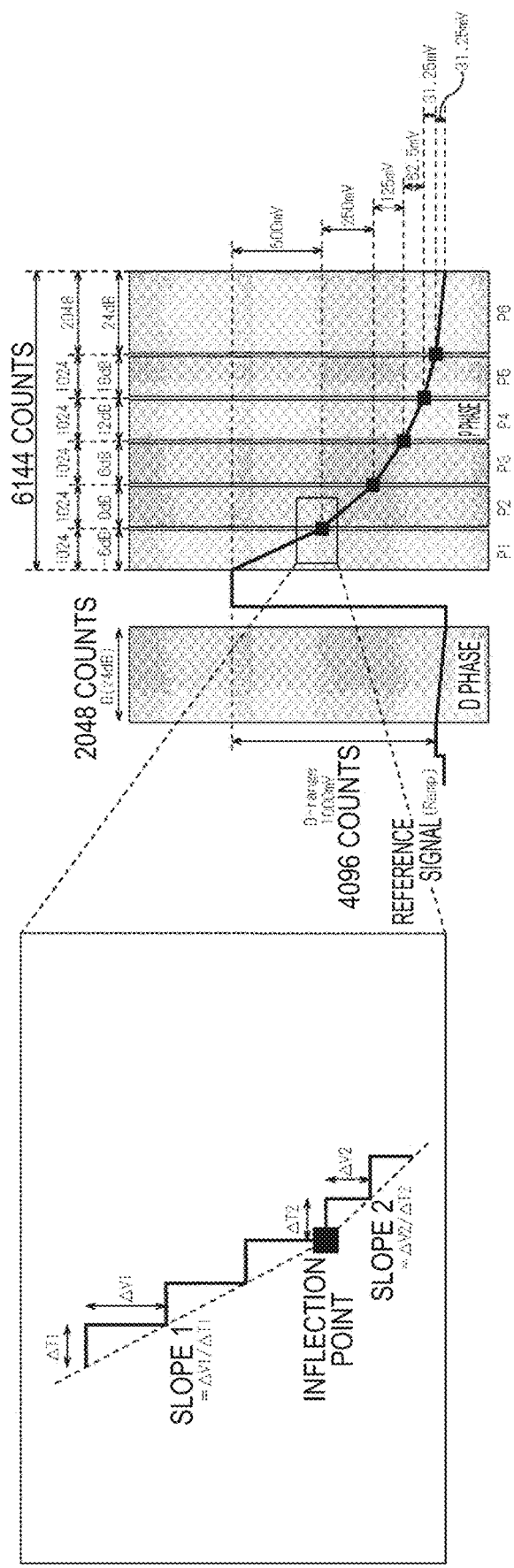
FIG. 4 is an expanded diagram of FIG. 3.

FIG. 4 is an expanded diagram of a slope of the ramp wave in the reading of the P-phase of FIG. 3. As illustrated in FIG. 4, a slope of the ramp wave (a ramp slope) is realized by changing a voltage by $\Delta V$ at one count ($\Delta T$). Accordingly, the slope of the ramp wave can be changed when $\Delta T$ or $\Delta V$ is changed using an inflection point of the ramp wave as a boundary.

Note that, as described above, in a case in which the CDS driving is adopted in the SP1, the DDS driving is adopted in the SP2, and the output of the DA converter during the reading of the P phase in the DDS driving of the SP2 is set to be nonlinear, an object of the present application is achieved. However, the output of the DA converter may be nonlinear also during the reading of the D phase in the CDS driving of the SP1.

That is, FIG. 4 is an enlarged view showing the nonlinear reference signal.

It is possible to change the gain (slope) of the reference signal for each sub period of the P phase (P #i phase (here, i=1, 2, ..., 6)) by changing at least one of a unit time $\Delta T$ for changing the voltage of the nonlinear reference signal or a change amount $\Delta V$ of a voltage of the reference signal for each unit time $\Delta T$.

In FIG. 4, $\Delta T$ and $\Delta V$ are changed from $\Delta T1$ and $\Delta V1$ to $\Delta T2$ and $\Delta V2$.

An inflection point for changing the gain of the reference signal is a timing at which the sub period starts.

Figure 5:
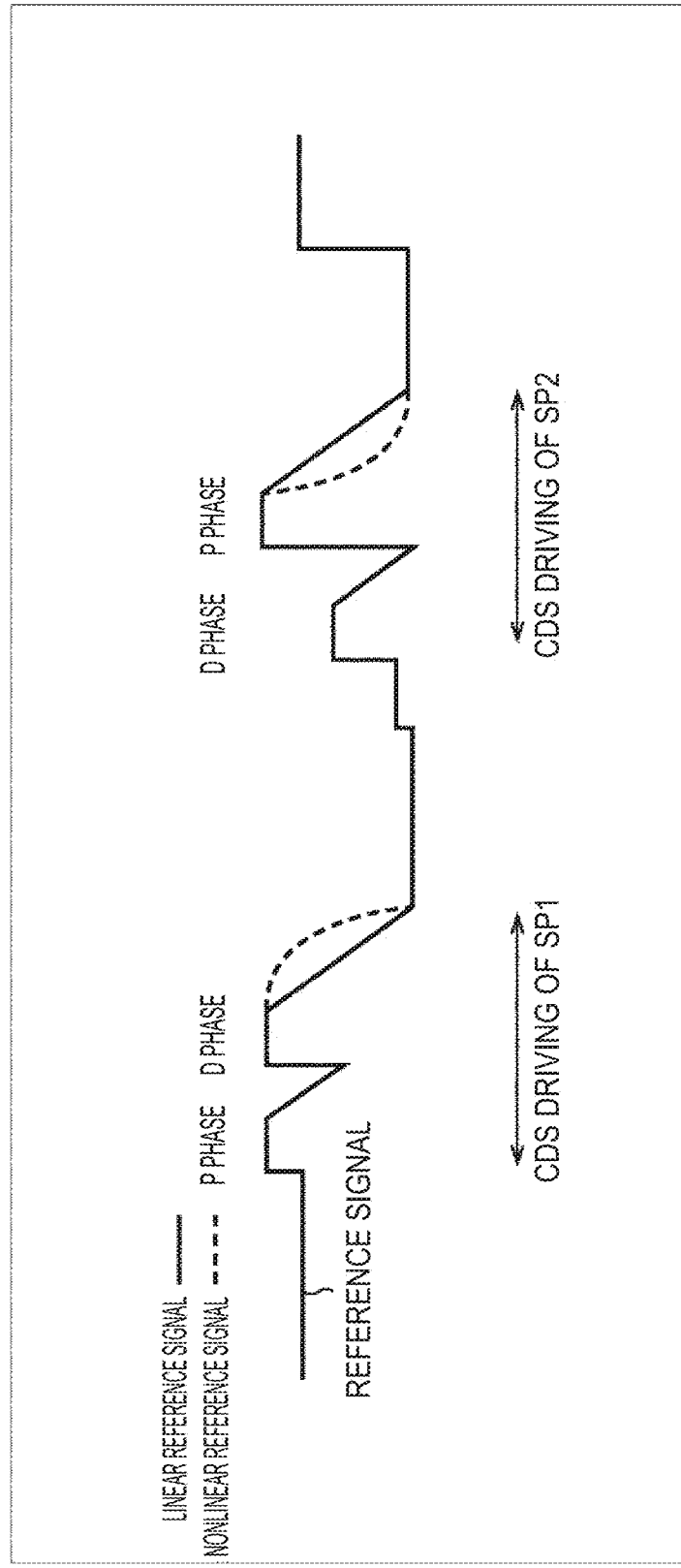
FIG. 5 is a diagram illustrating the waveform of a ramp wave in a case in which an output of an AD converter is nonlinear at the time of reading of a D-phase in CDS driving of an SP1 and at the time of reading of a P-phase in DDS driving of an SP2.

FIG. 5 illustrates the waveform of a ramp wave in a case in which an output of the DA converter is nonlinear at the time of the reading of the D-phase in the CDS driving of the SP1 and at the time of the reading of the P-phase in the DDS driving of the SP2.

As illustrated in the drawing, while a ramp wave at the time of the reading of the P-phase in the DDS driving of the SP2 is set to be nonlinear in a concave form, a ramp wave at the time of the reading of the D-phase in the CDS driving of the SP1 is set to be nonlinear in a convex form. In this case, gray scales at the time of low illumination in the SP1 can be improved.

That is, FIG. 5 is a diagram showing an example of the reference signal used for the CDS driving of the SP1 and the reference signal used for the DDS driving of the SP2.

In FIG. 5, a solid line represents the linear reference signal and a dotted line represents the nonlinear reference signal.

In the DDS driving of the SP2, by using the nonlinear reference signal that changes in a concave shape as the reference signal of the P phase, it is possible to enhance the gray scale of the combined pixel value as described with reference to FIG. 3.

Note that, in the CDS driving of the SP1, it is possible to use the nonlinear reference signal that changes in a convex shape as the reference signal of the D phase. In this case, it is possible to enhance the gray scale of the combined pixel value at low illuminance.

<Configuration Example of Image Sensor According to Present Technology>

Figure 6:
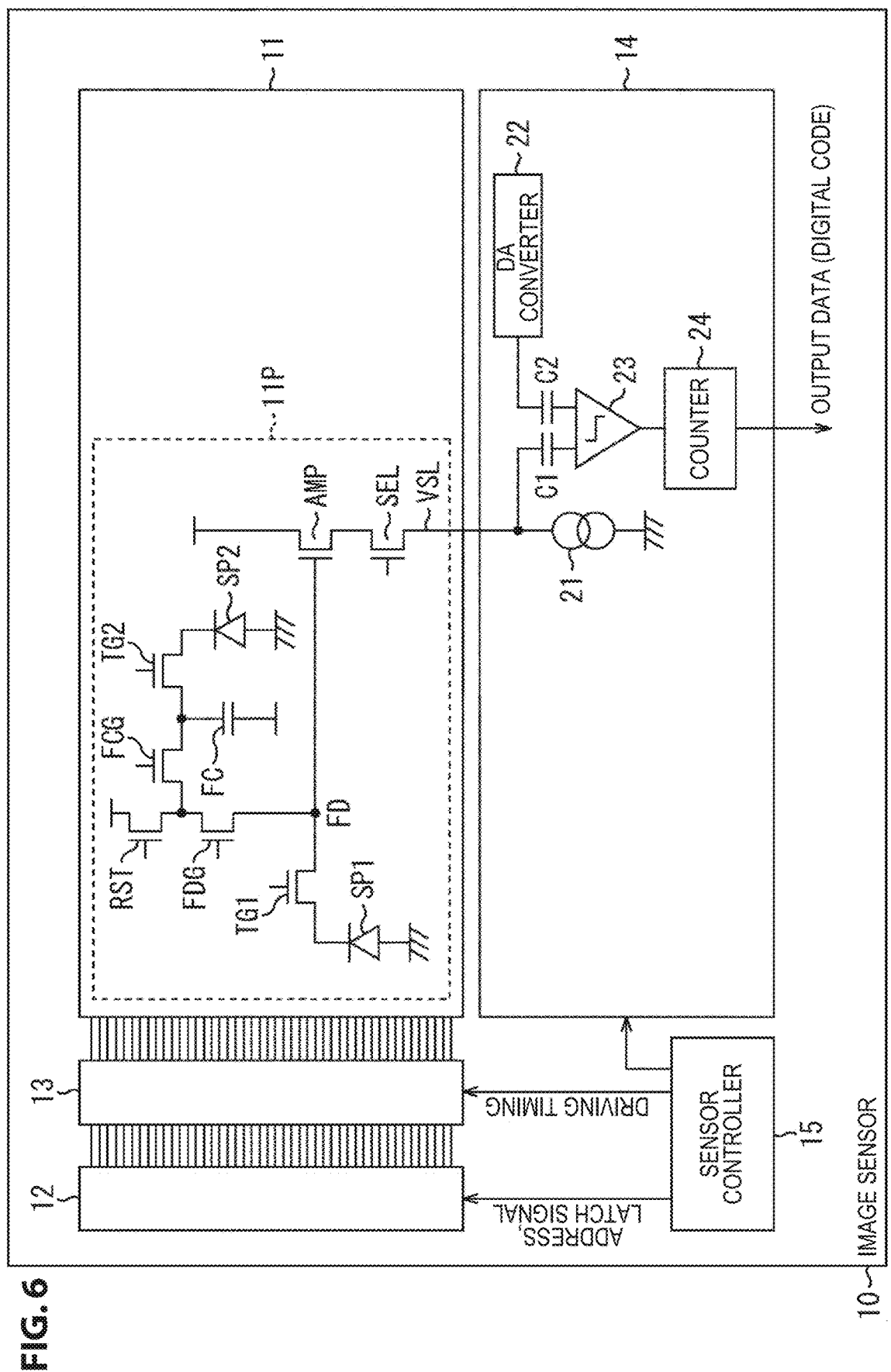
FIG. 6 is a block diagram illustrating a configuration example of an image sensor to which an embodiment of the present technology is applied.

Next, FIG. 6 illustrates a configuration example of an image sensor according to an embodiment of the present technology.

That is, FIG. 6 is a diagram showing a configuration example of an embodiment of an image sensor to which the present technology is applied.

An image sensor 10 includes a pixel array unit 11, an address decoder 12, a pixel timing driving unit 13, an AD conversion unit 14, and a sensor controller 15.

In the pixel array unit 11, a plurality of pixels 11P that outputs an electric (voltage) signal corresponding to a charge obtained by the photoelectric conversion are two-dimensionally disposed. The address decoder 12 and the pixel timing driving unit 13 control driving of each pixel 11P disposed in the pixel array unit 11. That is, the address decoder 12 supplies a control signal for designating the pixel 11P to be driven or the like to the pixel timing driving unit 13 according to an address, a latch signal, and the like supplied from the sensor controller 15. The pixel timing driving unit 13 drives (an FET configuring) the pixel 11P according to a driving timing signal supplied from the sensor controller 15 and the control signal supplied from the address decoder 12. The AD conversion unit 14 performs the AD conversion on the electric signal output from the pixel array unit 11 and supplied through a vertical signal line VSL and outputs the electric signal to the subsequent stage. The sensor controller 15 controls the entire image sensor 10. That is, for example, the sensor controller 15 supplies the address and the latch signal to the address decoder 12, and supplies the driving timing signal to the pixel timing driving unit 13. In addition, the sensor controller 15 supplies a control signal for controlling the AD conversion to the AD conversion unit 14. Among the configuration elements of the image sensor 10 described above, the present technology particularly relates to the AD conversion unit 14.

The configuration of the pixel 11P and the configuration of the AD conversion unit 14 will be described later in detail.

<Configuration Example of Pixel 11P>

Figure 7:
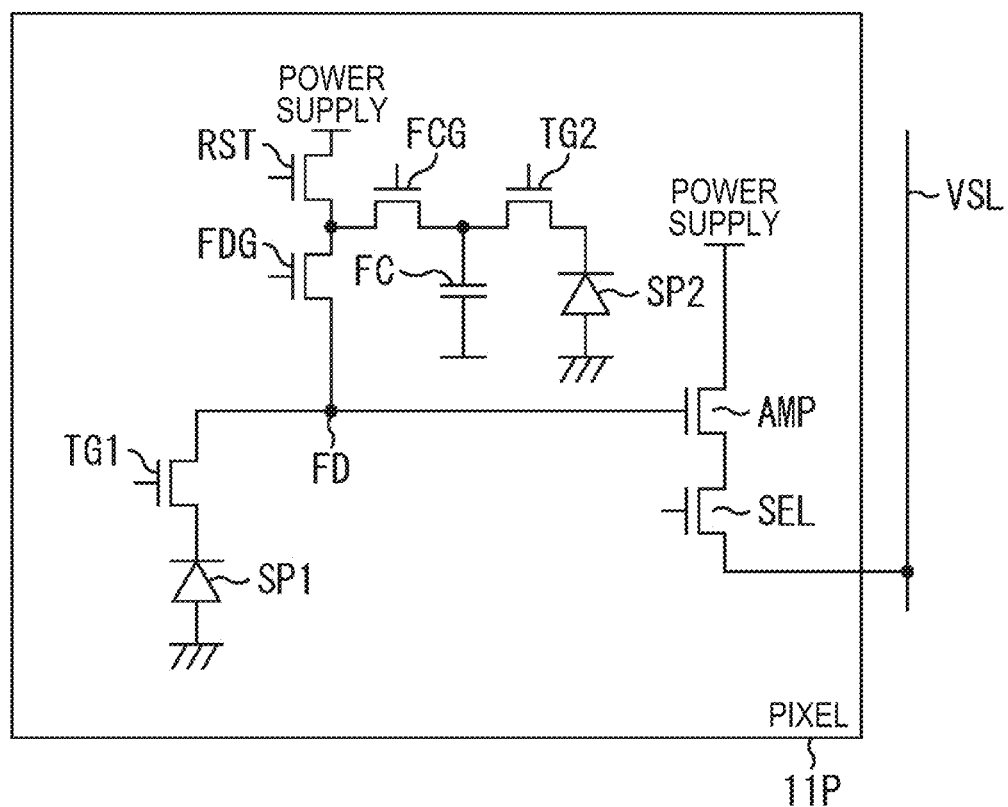
FIG. 7 is a circuit diagram illustrating a configuration example of a pixel disposed in a pixel array unit.

FIG. 7 illustrates a configuration example of the pixel 11P disposed in the pixel array unit 11. The pixel 11P is a pixel of a 7Tr. (transistor) type single-pixel scheme and includes the SP1 of a high-sensitivity PD, the SP2 of a low-sensitivity PD, and the capacitor FC in the pixel. The pixel 11P further includes a transmission gate (transmission transistor) TG1 corresponding to the SP1, a transmission gate (transmission transistor) TG2 corresponding to the SP2, an amplification gate (amplifier transistor) AMP, a selection gate (selection transistor) SEL, a reset gate (reset transistor) RST, an FD gate (FD transistor) FDG, and an FC gate (FC transistor) FCG.

The capacitor FC in the pixel is a capacitor that stores charges overflowing from the SP2 and can realize low-sensitivity/high D-range (saturation expansion) of the SP2 by reading the charges of the SP2 and the charges of the FC. Additionally, the FC is reset at the time of reading of P-phase data. Therefore, as described above, the SP2 is considered to perform the DDS driving in which the D-phase data is read earlier and the P-phase data is read later.

In the pixel 11P, after the charges read from the SP1 or the SP2 are retained in the FD, the charges are output as an electric signal to a vertical signal line VSL via the AMP and the SEL.

That is, in the pixel 11P, the transmission transistors TG1 and TG2, the amplifier transistor AMP, the selection transistor SEL, the reset transistor RST, the FD transistor FDG, and the FC transistor FCG include field effect transistors (FETs). In addition, in the pixel 11P, the drain of the transmission transistor TG1 and the gate of the amplifier transistor AMP are connected to each other, and the FD is formed at a connection point between the drain of the transmission transistor TG1 and the gate of the amplifier transistor AMP.

In addition, in the pixel 11P, the cathode of the SP1 of which the anode is grounded is connected to the FD through the transmission transistor TG1. In addition, the FD is connected to the power supply through the FD transistor FDG and the reset transistor RST. Note that, the FD transistor FDG is a transistor for controlling the conversion efficiency of the pixel 11P (for example, the efficiency of conversion from charge to voltage).

The connection point between the FD transistor FDG and the reset transistor RST, that is, the connection point between the drain of the FD transistor FDG and the source of the reset transistor RST is connected to the other end of the pixel content amount FC through the FC transistor FCG and is also connected to the cathode of the SP2 of which the anode is grounded through the transmission transistor TG2.

In addition, in the pixel 11P, the drain of the amplifier transistor AMP is connected to the power supply, and the source of the amplifier transistor AMP is connected to the vertical signal line VSL through the selection transistor SEL.

The pixel timing driving unit 13 (FIG. 6) drives the pixels 11P by controlling on/off of the transmission transistors TG1 and TG2, the selection transistor SEL, the reset transistor RST, the FD transistor FDG, and the FC transistor FCG.

In the pixel 11P configured as described above, the SP1 performs photoelectric conversion on the light incident on the pixel 11P to accumulate the light. The charge accumulated by the photoelectric conversion in the SP1 is transmitted to the FD through the transmission transistor TG1 and is accumulated in the FD.

The charge obtained by the photoelectric conversion of the SP1 (hereinafter also referred to as the charge of the SP1) is converted into a voltage corresponding to the charge by being accumulated in the FD and is output to the vertical signal line VSL through the amplifier transistor AMP and the selection transistor SEL.

In addition, in the pixel 11P, the SP2 performs photoelectric conversion on the light incident on the pixel 11P to accumulate the light. Since the SP2 is the PD of which the size is small, the charge of the SP2 (charge obtained by the photoelectric conversion of the SP2) overflows from the SP2, even though the light incident on the pixel 11P is not very strong light.

The charge overflowing from the SP2 is accumulated in the pixel content amount FC.

The charge accumulated in the SP2 and the charge accumulated in the pixel content amount FC is transmitted to the FD through the FC transistor FCG and the FD transistor FDG and is accumulated in the FD.

As described above, the charge accumulated in the SP2 and the charge accumulated in the pixel content amount FC are converted into a voltage by accumulating in the FD, and the voltage is output to the vertical signal line VSL through the amplifier transistor AMP and the selection transistor SEL.

Therefore, in the pixel 11P, the charge of the SP2 (the charge obtained by the photoelectric conversion of the SP2) is accumulated in the SP2 and the pixel content amount FC, and the voltage corresponding to the charge is output from the pixel 11P.

Since the SP2 is the PD of which the size is small, the sensitivity is low, but since the charge overflowing from the SP2 is accumulated in the pixel content amount FC, the charge amount (saturated charge amount) until apparently the SP2 is saturated, and it is possible to realize a wide (high) dynamic range.

Note that, in a case in which the CDS driving is adopted to the reading of the charge of the SP2 (the output of the voltage corresponding to the charge of the SP2), that is, a reading of the charge accumulated in the SP2 and the charge accumulated in the pixel content amount FC, immediately before the P phase that is performed earlier among the P phase and the D phase, the FD is reset to the power supply voltage through the reset transistor RST and the FD transistor FDG, and at that time, the FC is also reset.

Therefore, in the reading of the charge of the SP2, the DDS driving in which the P phase is first disposed and the D phase is later disposed is adopted.

Figure 8:
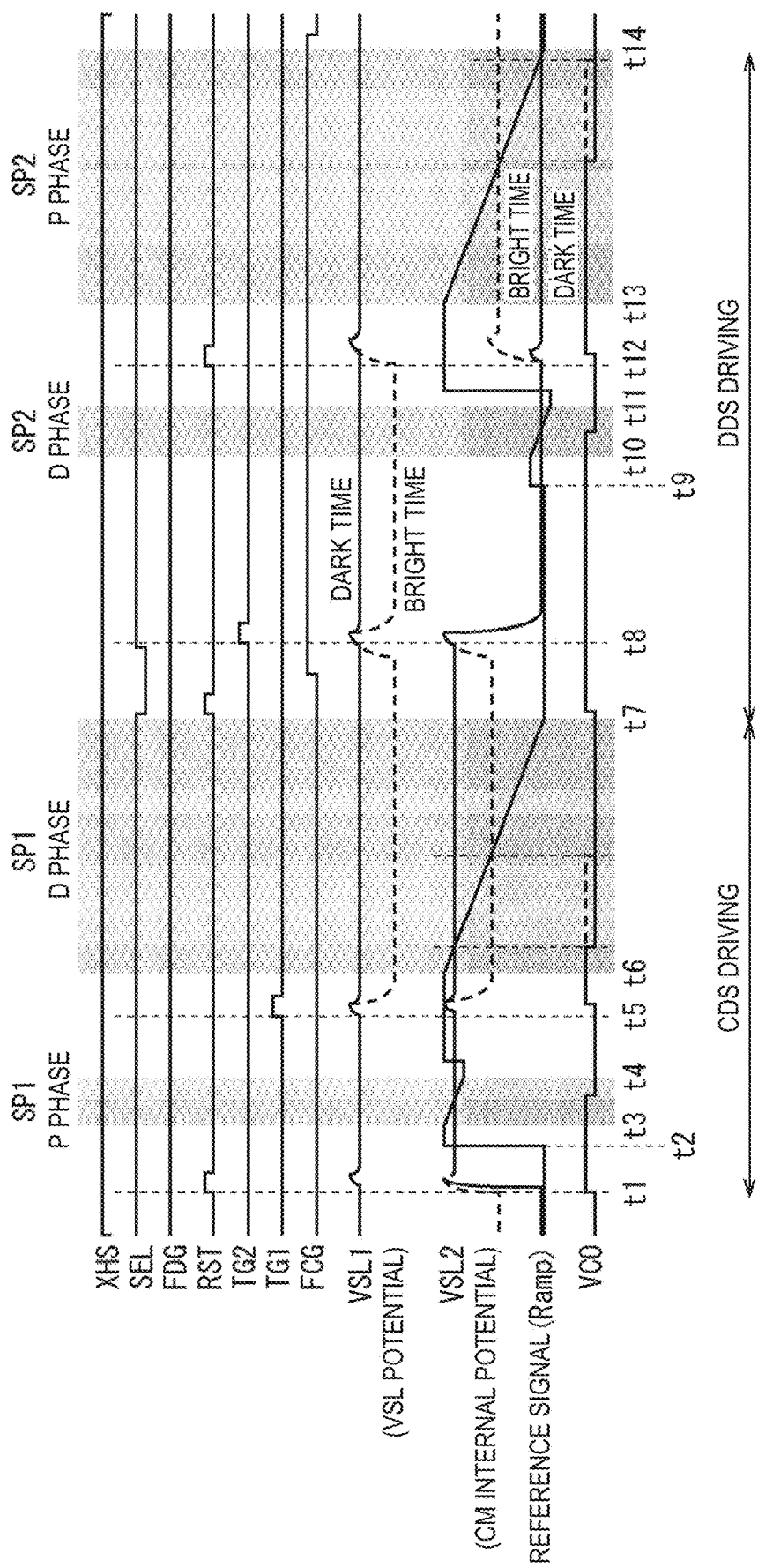
FIG. 8 is a diagram illustrating driving timings of the pixel.

FIG. 8 illustrates driving timings of the pixel 11P. In the pixel 11P, as illustrated in the drawing, after the P-phase data of the SP1 is read, the D-phase data of the SP1 is read. Next, after the D-phase data of the SP2 is read, the P-phase data of the SP2 is read. Additionally, an embodiment of the present technology is not applied to a ramp wave in FIG. 8, but the ramp wave indicates a linear waveform.

FIG. 8 shows on/off timings of the selection transistor SEL, the FD transistor FDG, the reset transistor RST, the transmission transistors TG2 and TG1, and the FC transistor FCG.

Furthermore, in FIG. 8, VSL voltages VSL1 and VSL2 as a signal read from the pixel 11P, the reference signal (actually) input to an input terminal of a comparator 23 included in the AD conversion unit 14 (FIGS. 6 and 10), and an output (a comparator output) VCO of the comparator 23 are shown.

Note that, in FIG. 8, a horizontal synchronization signal XHS is also shown. In addition, in FIG. 8, for simplification of description, the linear reference signal is shown as the reference signal.

Furthermore, in FIG. 8, the VSL voltage VSL1 represents a VSL voltage (VSL potential) on the vertical signal line VSL. In addition, the VSL voltage VSL2 represents a VSL voltage (CM (comparator) internal potential) (actually) input to the input terminal of the comparator 23 included in the AD conversion unit 14 (FIGS. 6 and 10), that is, a voltage obtained by offsetting the VSL voltage VSL1 according to a voltage of a condenser C1 immediately before the input terminal of the comparator 23.

In the AD conversion unit 14, a so-called auto zero process is performed, and voltages of the condenser C1 and a condenser C2 (FIG. 10) immediately before of the input terminal of the comparator 23 are adjusted so that the voltages (actually) input to the two input terminals of the comparator 23 become equal when the auto zero process is performed. The VSL voltage VSL2 represents a VSL voltage input to the input terminal of the comparator 23 after adjusting the voltages of the condensers C1 and C2 by the auto zero process described above. Note that, with respect to the VSL voltages VSL1 and VSL2, the VSL voltage of a dark case is represented by a solid line and the VSL voltage of a bright case is represented by a dotted line.

As a driving of the pixel P11, for example, first, the CDS driving for reading the digital code corresponding to the charge of the SP1 is performed, and thereafter, the DDS driving for reading the digital code corresponding to the charge of the SP2 is performed.

That is, first, the selection transistor SEL is turned on, the FD transistor FDG is turned on, the reset transistor RST is turned off, the transmission transistors TG2 and TG1 are turned off, and the FC transistor FCG is turned off.

In addition, in the CDS driving, at a time t1, the reset transistor RST is temporarily turned on and the FD is reset. The VSL voltages VSL1 and VSL2 are changed by reset of the FD and reset feed-through occurring after the reset.

In addition, the auto zero process is performed, therefore, in a time t2, the VSL voltage VSL2 (input to the input terminal of the comparator 23) and the reference signal (reference signal in which the voltage is offset according to the voltage of the condenser C2 immediately before of the input terminal of the comparator 23) input to the input terminal of the comparator 23 are changed so that the VSL voltage VSL2 and the reference signal are the same, and furthermore, the reference signal is increased by a predetermined value.

In addition, at a time t3, the P phase of the CDS driving of the SP1 is started, and the reference signal starts decreasing (reduction). The decrease of the reference signal continues until a time t4 when the P phase of the CDS driving of the SP1 ends.

In the P phase of the CDS driving of the SP1, in a case in which the magnitude relationship between the reference signal and the VSL voltage VSL2 is inverted from the start of the P phase, the comparator output VCO of the comparator 23 is inverted, for example, from an H (high) level to an L (low) level.

The counter 24 included in the AD conversion unit 14 (FIGS. 6 and 10) starts the count of the count value from the start of the P phase of the CDS driving of the SP1 and ends the count of the count value according to the comparator output VCO when the comparator output VCO is inverted. The count value at this time is P phase data as the AD conversion result of the noise signal with respect to the SP1.

As described above, the AD conversion unit 14 obtains the count value obtained by counting the time required for the change of the reference signal until the VSL voltage VSL2 (electric signal) matches the reference signal according to the comparator output VCO as the AD conversion result of the VSL voltage.

Thereafter, at a time t5, the transmission transistor TG1 is temporarily turned on, and the charge of the SP1 is transmitted to the FD and is accumulated in the FD. The VSL voltages VSL1 and VSL2 are changed (decreased) to voltages corresponding to the charge of the SP1 accumulated in the FD. Note that, at the time of high illuminance (bright case), since the charge amount of the SP1 (a charge amount of a negative charge) becomes large, the VSL voltage VSL1 decreases more as compared with the time of low illuminance (dark case).

On the other hand, after the end of the P phase of the CDS driving of the SP1, the reference signal is increased to the voltage at the start of the P phase.

In addition, at a time t6 after the transmission transistor TG1 is temporarily turned on, the D phase of the CDS driving of the SP1 is started, and the reference signal starts decreasing. The decrease of the reference signal continues until a time t7 when the D phase of the CDS driving of the SP1 ends.

In the D phase of the CDS driving of the SP1, in a case in which the magnitude relationship between the reference signal and the VSL voltage VSL2 is inverted from the start of the D phase, the comparator output VCO of the comparator 23 is inverted, for example, from the H level to the L level.

The counter 24 included in the AD conversion unit 14 starts the count of the count value from the start of the D phase of the CDS driving of the SP1 and ends the count of the count value when the comparator output VCO is inverted. The count value at this time is D phase data as the AD conversion result of the data signal with respect to the SP1.

After a time t7 at which the D phase of the CDS driving of the SP1 ends, the DDS driving of the SP2 is started.

In the DDS driving of the SP2, the selection transistor SEL is temporarily turned off. Furthermore, in a part of a period during which the selection transistor SEL is turned off, the reset transistor RST is temporarily turned on and the FD is reset.

In addition, in a period during which the selection transistor SEL is turned off, the FC transistor FCG is turned on after a period during which the reset transistor RST is turned on has elapsed.

By turning on the FC transistor FCG, the charge accumulated in the pixel content amount FC is transmitted to the FD and is accumulated in the FD.

Thereafter, at a time t8 after the selection transistor SEL is returned to turning on, the transmission transistor TG2 is temporarily turned on, and the charge accumulated in the SP2 is transmitted to the FD through the FC transistor FCG and the FD transistor FDG and is accumulated in the FD.

Therefore, the change accumulated in the pixel content amount FC and the charge accumulated in the SP2 are accumulated in the FD, the VSL voltages VSL1 and VSL2 are changed to voltages corresponding to the charge accumulated in the FD.

Note that, at the time of high illuminance (bright case), since the charge amount accumulated in the SP2 and the pixel content amount FC (a charge amount of a negative charge) becomes large, the VSL voltage VSL1 decreases more as compared with the time of low illuminance (dark case).

Then, the auto zero process is performed, therefore, the VSL voltage VSL2 (input to the input terminal of the comparator 23) and the reference signal (reference signal in which the voltage is offset according to the voltage of the condenser C2 immediately before of the input terminal of the comparator 23) input to the input terminal of the comparator 23 are changed so that the VSL voltage VSL2 and the reference signal are the same, and furthermore, in a time t9, the reference signal is increased by a predetermined value.

In addition, at a time t10, the D phase of the DDS driving of the SP2 is started, and the reference signal starts decreasing. The decrease of the reference signal continues until a time t11 when the D phase of the DDS driving of the SP2 ends.

In the D phase of the DDS driving of the SP2, in a case in which the magnitude relationship between the reference signal and the VSL voltage VSL2 is inverted from the start of the D phase, the comparator output VCO of the comparator 23 is inverted from the H level to the L level.

The counter 24 included in the AD conversion unit 14 starts the count of the count value from the start of the D phase of the DDS driving of the SP2 and ends the count of the count value when the comparator output VCO is inverted. The count value at this time is D phase data as the AD conversion result of the data signal with respect to the SP".

Thereafter, at a time t12, the reset transistor RST is temporarily turned on, and the FD is reset.

In the reset of the FD, the charge accumulated in the FD and accumulated in the SP2 and pixel content amount FC is discharged to the power supply, the VSL voltages VSL1 and VSL2 increase by an amount of a voltage corresponding to the charge. That is, at the time of high illuminance (bright case), the VSL voltages VSL1 and VSL2 increases more as compared with the time of low illuminance (dark case).

On the other hand, after the end of the D phase of the DDS driving of the SP2, the reference signal is increased to a voltage higher than the voltage at the time of the start of the D phase by the dynamic range of the AD conversion unit 14.

In addition, at a time t13 after the reset transistor RST is temporarily turned on, the P phase of the DDS driving of the SP2 is started, and the reference signal starts decreasing. The decrease of the reference signal continues until a time t14 when the P phase of the DDS driving of the SP2 ends.

In the P phase of the DDS driving of the SP2, in a case in which the magnitude relationship between the reference signal and the VSL voltage VSL2 is inverted from the start of the P phase, the comparator output VCO of the comparator 23 is inverted from the H level to the L level.

The counter 24 included in the AD conversion unit 14 starts the count of the count value from the start of the P phase of the DDS driving of the SP2 and ends the count of the count value when the comparator output VCO is inverted. The count value at this time is D phase data as the AD conversion result of the noise signal with respect to the SP".

In the driving of the pixel 11P as described above, in the image sensor 10 (FIG. 6), the nonlinear reference signal described with reference to FIG. 3 is used as the reference signal of the P phase of the DDS driving of the SP2.

Figure 9:
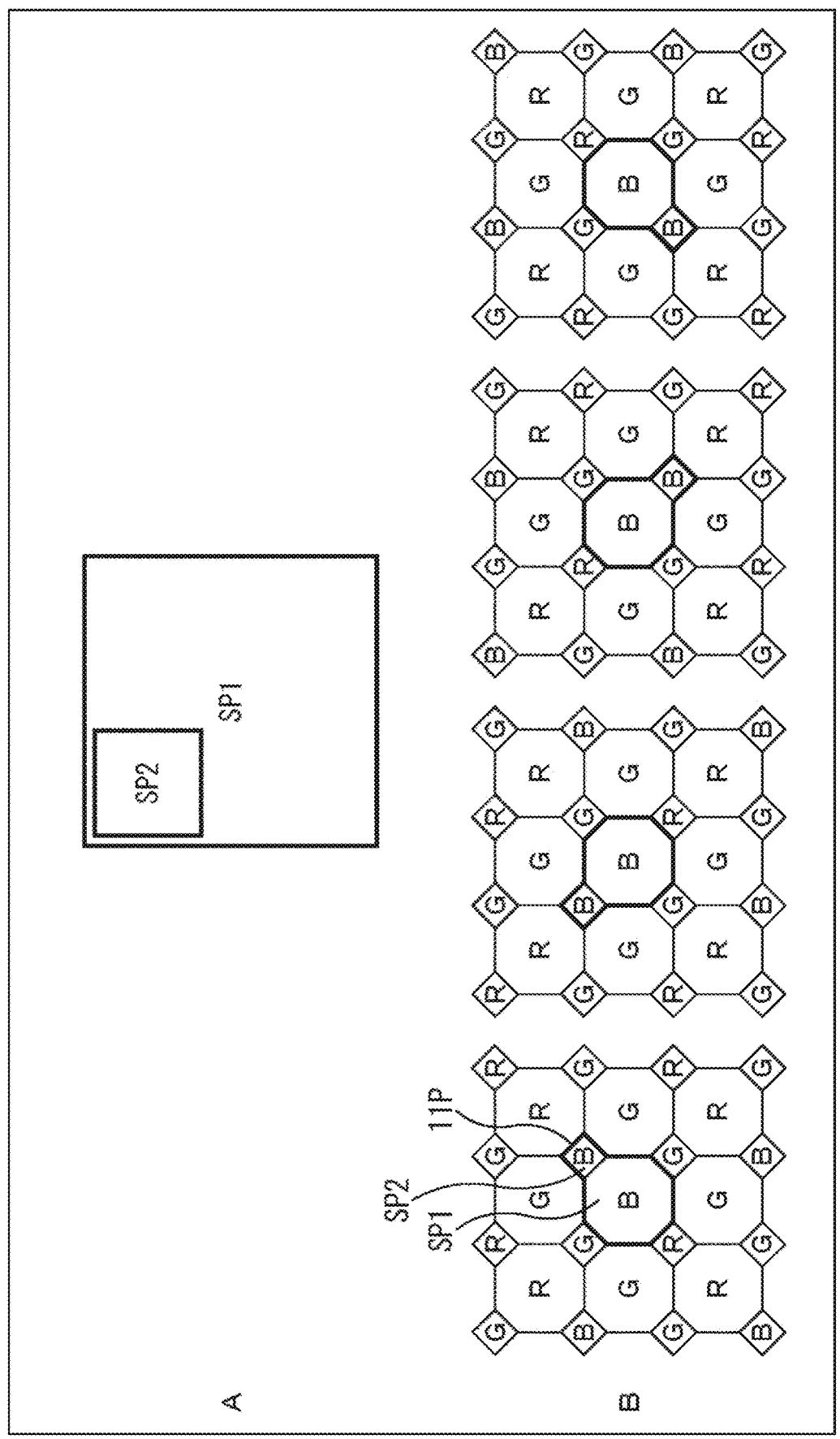
FIG. 9 is a diagram illustrating a disposition example of the SP1 and the SP2 in the pixel.

FIG. 9 illustrates a disposition example of the SP1 and the SP2 in the pixel 11P. In the case of the drawing, the SP2 is disposed in the top left of a region of one pixel, but the SP2 can be disposed at any position in the region of one pixel.

That is, A of FIG. 9 is a plan view showing an outline of a layout of the SP1 and the SP2 in the pixel 11P.

B of FIG. 9 is a plan view showing details of the layout of the SP1 and the SP2 in the pixel 11P.

Note that, in B of FIG. 9, R, G, and B represents the SP1 or the SP2 as the PD that performs the photoelectric conversion on each light of R (red), G (green), and B (blue) through color filters of a Bayer array.

As shown in B of FIG. 9, one pixel 11P may be configured by disposing the SP2 that is the PD, of which the size is small on the upper right, the upper left, the lower right, and the lower left of the SP1 that is the PD of which the size is large.

Here, in B of FIG. 9, a Bayer array color filter is adopted. In the pixel 11P of 2×2 pixels in the horizontal x vertical, the upper left pixel 11P is a pixel that receives the light of R, the upper right pixel 11P is a pixel that receives the light of G, the lower left pixel 11P is a pixel that receives the light of G, and the lower right pixel 11P is the pixel that receives the light of B, however, an arrangement of the color filters is not limited to the Bayer arrangement.

Now, in the 2×2 pixels 11P, as described above, it is assumed that the arrangement of the color filters in which the upper left pixel 11P receives the light of R, the upper right pixel 11P receives the light of G, the lower left pixel 11P receives the light of G, and the lower right pixel 11P receives the light of B is described as an RGGB arrangement in which the light received by the pixels 11P are arranged in the order of the upper left pixel, the upper right pixel, the lower left pixel, and the lower right pixel 11P.

As the arrangement of the color filter, it is possible to adopt an arrangement in which an RCCC arrangement, an RCCB arrangement, an RCCC arrangement, an RCCB arrangement, and an RGGB arrangement are mixed, other than only the RGGB arrangement. Here, in the RCCC arrangement and the RCCB arrangement, C (clear) represents a pixel that receives light of all wavelengths without a color filter.

<Configuration Example of AD Conversion Unit>

Figure 10:
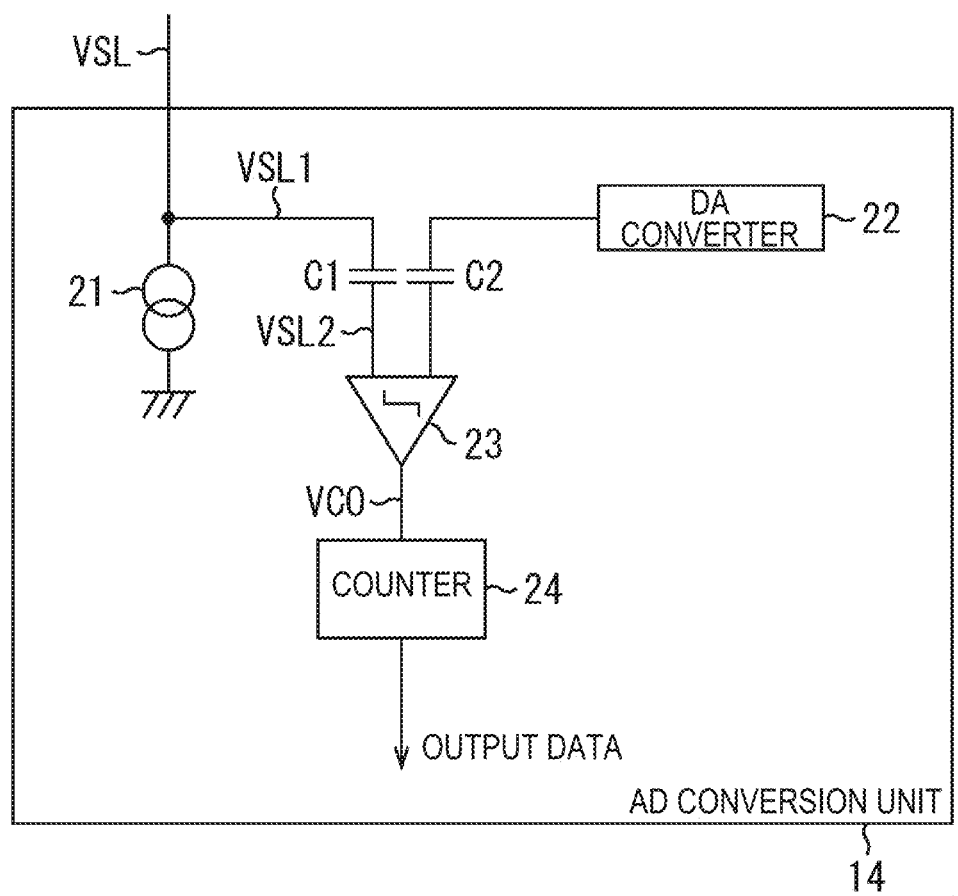
FIG. 10 is a block diagram illustrating a configuration example of an AD conversion unit.

Next, FIG. 10 illustrates a configuration example of the AD conversion unit 14. The AD conversion unit 14 includes a single slope type DA converter 22 that performs AD conversion on an output of the pixel array unit 11 input via a constant current circuit 21 and a VLS, a comparator 23, and a counter 24.

The constant current circuit 21 is connected to the vertical signal line VSL and configures a source follower circuit together with the amplifier transistor AMP of the pixel 11P.

The DA converter 22 generates (the voltage as) the reference signal by performing a DA conversion and outputs the reference signal. The reference signal output from the DA converter 22 is supplied to one input terminal of the comparator 23 through the condenser C2.

The comparator 23 has two input terminals, and the reference signal output from the DA converter 22 is supplied to the one input terminal of the comparator 23 through the condenser C2 as described above. The VSL voltage as an electric signal output from the pixel 11P is supplied to the other input terminal of the comparator 23 from the vertical signal line VSL through the condenser C1.

The comparator 23 compares the VSL voltage (VSL2) and the reference signal that are supplied to the two input terminals with each other, and outputs the comparator output VCO representing the comparison result. That is, the comparator 23 outputs the comparator output VCO representing the magnitude relationship between the VSL voltage (VSL 2) and the reference signal. The comparator output VCO of the comparator 23 is supplied to the counter 24.

The counter 24 counts the count value in synchronization with a predetermined clock. That is, the counter 24 starts the count of the count value from the start of the P phase or the D phase, and counts the count value until the magnitude relationship between the VSL voltage and the reference signal changes and the comparator output VCO is inverted. In addition, when the comparator output VCO is inverted, the counter 24 stops the count of the count value and outputs the count value at that time as the AD conversion result (output data) of the VSL voltage.

The AD conversion unit 14 has the constant current circuit 21, the comparator 23 including the condensers C1 and C2, and the counter 24, for example, for each column of the pixels 11P of the pixel array unit 11.

The reference signal output from the DA converter 22 is supplied to the comparator 23 of each column of the pixels 11P.

Figure 11:
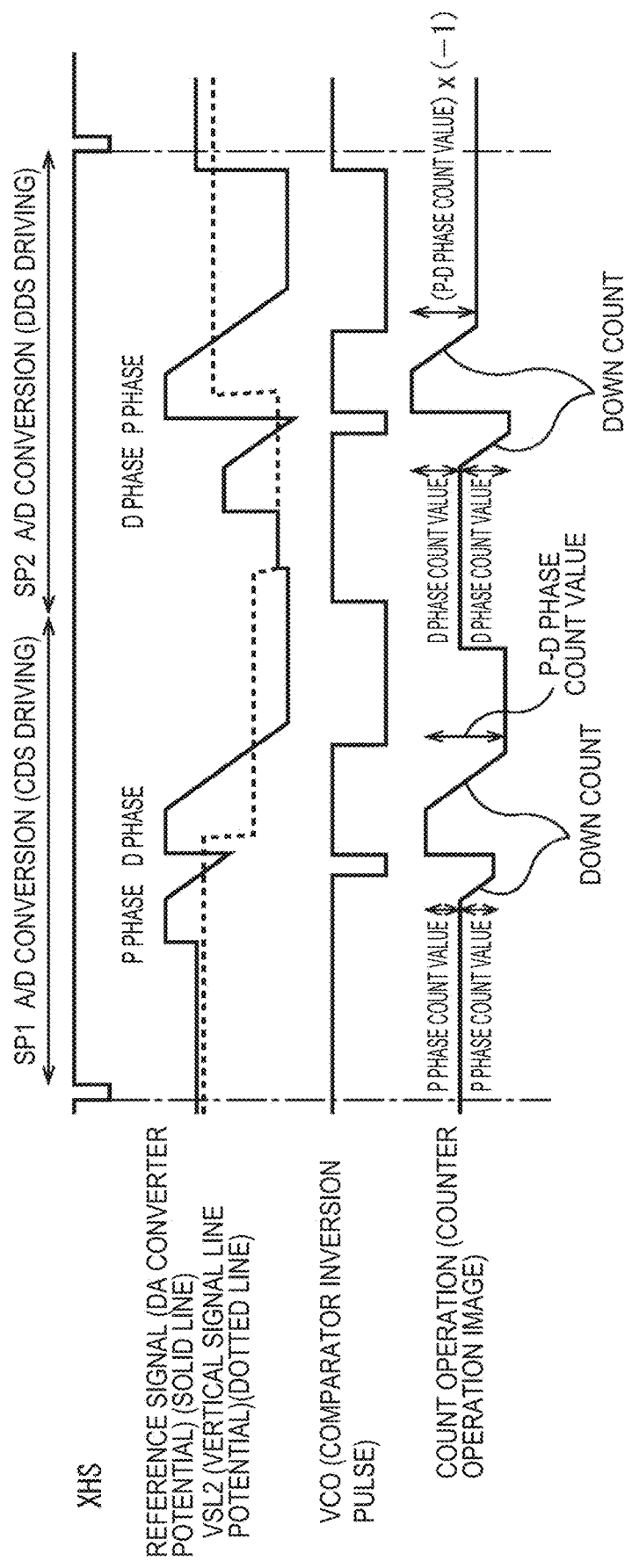
FIG. 11 is a circuit diagram illustrating driving timings of the AD conversion unit.

FIG. 11 illustrates driving timings of the AD conversion unit 14. As described above, the AD conversion is performed through the CDS driving on the SP1 and is performed through the DDS driving on the SP2.

That is, FIG. 11 shows a count operation of the horizontal synchronization signal XHS, the reference signal, the VSL voltage VSL2, the comparator output VCO, and the count value of the counter 24 (FIG. 10).

In FIG. 11, the horizontal synchronization signal XHS, the reference signal, the VSL voltage VSL2, and the comparator output VCO are similar to those in a case of FIG. 8, and description thereof will be omitted.

The counter 24 starts a countdown of the count value from the start of the P phase of the CDS driving of the SP1 and ends the count of the count value when the comparator output VCO is inverted.

In addition, the counter 24 sets a value obtained by inverting a sign of a current count value to an initial value, starts a countdown of the count value from the start of the D phase of the CDS driving of the SP1 and ends the count of the count value when the comparator output VCO is inverted.

The count value at this time is a subtraction value (P-D phase count value) obtained by subtracting the D phase data that is the AD conversion value of the data signal from the P phase data that is the AD conversion value of the noise signal with respect to the SP1, and for example, a value obtained by inverting the sign of the subtraction value is the digital code corresponding to the charge of the SP1.

Thereafter, the counter 24 resets the count value to 0. In addition, the counter 24 starts a countdown of the count value from the start of the D phase of the DDS driving of the SP2 and ends the count of the count value when the comparator output VCO is inverted.

In addition, the counter 24 sets a value obtained by inverting a sign of a current count value to an initial value, starts a countdown of the count value from the start of the P phase of the DDS driving of the SP2 and ends the count of the count value when the comparator output VCO is inverted.

The count value at this time is a value obtained by inverting the sign of the subtraction value obtained by subtracting the D phase data that is the AD conversion value of the data signal from the P phase data that is the AD conversion value of the noise signal with respect to the SP2 ((P-D phase count value)×(−1)), and for example, a value obtained by inverting the sign of this value is the digital code corresponding to the charge of the SP2.

<Configuration Example of DA Converter 22>

Figure 12:
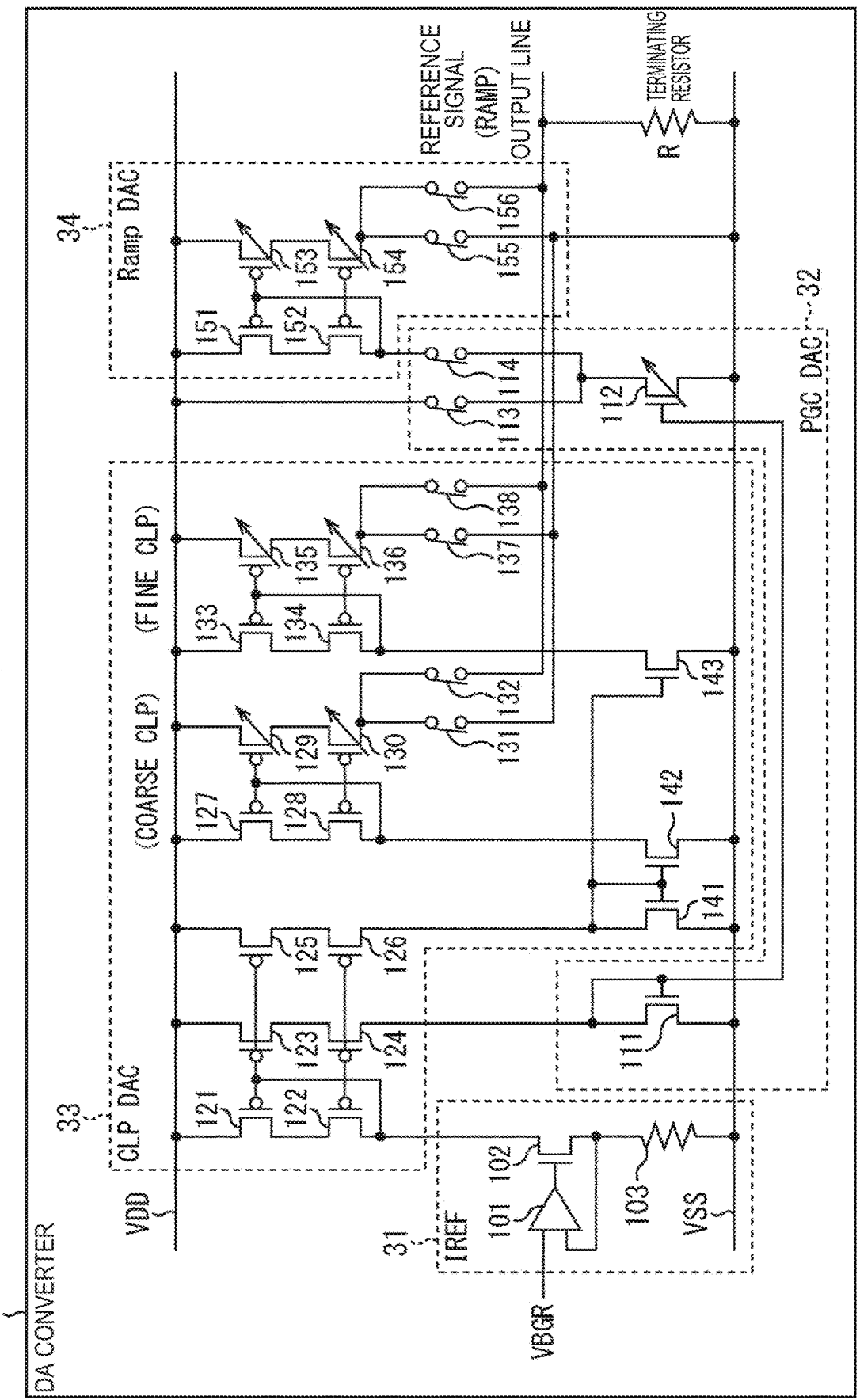
FIG. 12 is a circuit diagram illustrating a configuration example of a DA converter of the AD conversion unit.

FIG. 12 illustrates a configuration example of the DA converter 22 of the AD conversion unit 14. The DA converter 22 includes an IREF circuit 31 that generates a reference current, a PGC DAC 32 that varies a current ratio in accordance with a gain, a CLP DAC 33 that performs offset output on a dark current of the pixel array unit 11, and a ramp DAC 34 that generates a ramp slope. Of the constituent elements of the DA converter 22 described above, an embodiment of the present technology particularly relates to the PGC DAC 32 and the ramp DAC 34.

In FIG. 12, the DA converter 22 has the I-reference (IREF) circuit 31, the programmable gain control (PGC) DAC 32, the clamp (CLP) DAC 33, the ramp DAC 34, and the termination resistor R.

The IREF circuit 31 has an operational amplifier 101, an FET 102, and a resistor 103, and generates a current according to a voltage supplied to the IREF circuit 31. The current generated by the IREF circuit 31 is output as a reference current.

The PGC DAC 32 includes FETs 111 and 112 and switches 113 and 114.

The FETs 111 and 112 configure a current mirror in which the FET 111 is set as a mirror source of the current mirror and the FET 112 is set as a mirror destination of the current mirror. Therefore, a current according to a current flowing through the FET 111 that is the mirror source (a current of a mirror ratio multiplied by the current flowing through the FET 111) flows through the FET 112 that is the mirror destination.

Here, in FIG. 12, an arrow described in the FET 112 of the mirror destination indicates that the FET 112 is a plurality of FETs and the plurality of FETs are connected to the FET 111 of the mirror source in parallel. Note that, a plurality of sets of switches 113 and 114 connected to the FET 112 are also present according to the fact that the FET 112 is the plurality of FETs.

The switches 113 and 114 are exclusively turned on or off. That is, when one of the switches 113 and 114 is turned on, the other switch is turned off.

When the switch 113 is turned on (accordingly, when the switch 114 is turned off), the current flowing through the FET 112 is discarded, for example, to the power supply VSS such as GND (ground). When the switch 114 is turned on (accordingly, when the switch 113 is turned off), the current flowing through the FET 112 flows through FETs 151 and 152 of the mirror source configuring the ramp DAC 34, which will be described later.

Here, as the switches 113 and 114 are exclusively turned on or off, the current flowing from the power supply VDD in the DA converter 22 is not changed and becomes constant by turning on or off the switches 113 and 114, and it is possible to prevent fluctuation of the voltage as the reference signal caused by the change of the current flowing from the power supply VDD.

In the PGC DAC 32, by controlling the number of FETs that turn on the switch 114 among the plurality of FETs as the FET 112, it is possible to control the current flowing through the FETs 151 and 152 of the mirror source, which configure the ramp DAC 34. By changing the current flowing through the FETs 151 and 152 of the mirror source, which configure the ramp DAC 34, it is possible to generate the nonlinear reference signal by changing the gain (slope) of the reference signal.

The CLP DAC 33 includes FETs 121 and 122, FETs 123 and 124, FETs 125 and 126, FETs 127 and 128, FETs 129 and 130, switches 131 and 132, FETs 133 and 134, FETs 135 and 136, switches 137 and 138, an FET 141, an FET 142, and an FET 143.

The FETs 121 to 126 configure a current mirror in which the FETs 121 and 122 are set as a mirror source and the FETs 123 and 124 and the FETs 125 and 126 are set as mirror destinations, respectively.

The reference current generated by the IREF circuit 31 flows through the FETs 121 and 122 of the mirror sources, and a current according to the reference current flowing through the FETs 121 and 122 that are the mirror sources flows through the FETs 123 and 124 and the FETs 125 and 126 of the mirror destinations, respectively.

The current flowing through the FETs 123 and 124 flows through the FET 112 of the PGC DAC 32, and the current flowing through the FETs 125 and 126 flows through the FET 141.

Here, the FETs 141 to 143 configure a current mirror in which the FET 141 is set as a mirror source and the FET 142 and the FET 143 are set as mirror destinations, respectively.

Therefore, a current according to the current flowing through the FET 141 of the mirror source flows through the FET 142 and the FFT 143 that are mirror destinations.

The current flowing through the FET 142 flows to the FETs 127 and 128 configuring a COARSE CLP circuit which will be described later, and the current flowing through the FET 143 flows to the FETs 133 and 134 configuring a FINE CLP circuit which will be described later.

The FETs 127 and 128 and the FETs 129 and 130 configure a current mirror in which the FETs 127 and 128 are set as mirror sources of the current mirror and the FETs 129 and 130 are set as mirror destinations of the current mirror. Therefore, a current according to the current flowing through the FETs 127 and 128 that are mirror sources flows through the FETs 129 and 130 that are mirror destinations.

Here, in FIG. 12, similarly to a case of the FET 112, an arrow described in the FETs 129 and 130 of the mirror destinations indicates that each of the FETs 129 and 130 is a plurality of FETs and the plurality of FETs are connected to the FETs 127 and 128 of the mirror sources in parallel. Note that, a plurality of sets of switches 131 and 132 connected to the FETs 129 and 130 are also present according to the fact that each of the FETs 129 and 130 is the plurality of FETs.

Similarly to the switches 113 and 114, the switches 131 and 132 are exclusively turned on or off.

When the switch 131 is turned on (accordingly, when the switch 132 is turned off), the current flowing through the FETs 129 and 130 is discarded to the power supply VSS such as GND. When the switch 132 is turned on (accordingly, when the switch 131 is turned off), the current flowing through the FETs 129 and 130 flows through a reference signal output line. The current flowing through the reference signal output line flows to a terminating resistor R, and a voltage drop caused by the current flowing through the terminating resistor R is output from the DA converter 22 as the reference signal (voltage).

Similar to switches 113 and 114, as the switches 131 and 132 are exclusively turned on or off, the current flowing from the power supply VDD in the DA converter 22 is not changed and becomes constant by turning on or off the switches 131 and 132, and it is possible to prevent fluctuation of the voltage as the reference signal caused by the change of the current flowing from the power supply VDD.

The FETs 133 and 134 and the FETs 135 and 136 configure a current mirror in which the FETs 133 and 134 are set as mirror sources of the current mirror and the FETs 135 and 136 are set as mirror destinations of the current mirror. Therefore, a current according to the current flowing through the FETs 133 and 134 that are mirror sources flows through the FETs 135 and 136 that are mirror destinations.

Here, in FIG. 12, similarly to a case of the FET 112, an arrow described in the FETs 135 and 136 of the mirror destinations indicates that each of the FETs 135 and 135 is a plurality of FETs and the plurality of FETs are connected to the FETs 133 and 134 of the mirror sources in parallel. Note that, a plurality of sets of switches 137 and 138 connected to the FETs 135 and 136 are also present according to the fact that each of the FETs 135 and 136 is the plurality of FETs.

Similarly to the switches 113 and 114, the switches 137 and 138 are exclusively turned on or off.

When the switch 137 is turned on (accordingly, when the switch 138 is turned off), the current flowing through the FETs 135 and 136 is discarded to the power supply VSS such as GND. When the switch 138 is turned on (accordingly, when the switch 137 is turned off), the current flowing through the FETs 135 and 136 flows through a reference signal output line. The current flowing through the reference signal output line flows to a terminating resistor R, and a voltage drop caused by the current flowing through the terminating resistor R is output from the DA converter 22 as the reference signal (voltage).

Similar to switches 113 and 114, as the switches 137 and 138 are exclusively turned on or off, the current flowing from the power supply VDD in the DA converter 22 is not changed and becomes constant by turning on or off the switches 137 and 138, and it is possible to prevent fluctuation of the voltage as the reference signal caused by the change of the current flowing from the power supply VDD.

In the CLP DAC 33, by controlling the number of FETs that turn on the switch 132 among the plurality of FETs as the respective FETs 129 and 130 and controlling the number of FETs that turn on the switch 138 among the plurality of FETs as the respective FETs 135 and 136, in order to cancel a dark current flowing through the pixel 11P, a current for adjusting (clamping) the voltage as the reference signal flows through the reference signal output line.

Here, in the CLP DAC 33, the FETs 127 and 128, the FETs 129 and 130, and the switches 131 and 132 configure a COARSE CLP circuit, and the FETs 133 and 134, the FETs 135 and 136, and the switches 137 and 138 configure a FINE CLP circuit.

According to the COARSE CLP circuit, the current on the reference signal output line for canceling the dark current flowing through the pixel 11P is roughly adjusted, and according to the FINE CLP circuit, the current on the reference signal output line for canceling the dark current flowing through the pixel 11P is finely adjusted.

The ramp DAC 34 includes the FETs 151 and 152, the FETs 153 and 154, and the switches 155 and 156.

The FETs 151 and 152 and the FETs 153 and 154 configure a current mirror in which the FETs 151 and 152 are set as mirror sources of the current mirror and the FETs 153 and 154 are set as mirror destinations of the current mirror. Therefore, a current according to the current flowing through the FETs 151 and 152 that are mirror sources flows through the FETs 153 and 154 that are mirror destinations.

Here, in FIG. 12, similarly to a case of the FET 112, an arrow described in the FETs 153 and 154 of the mirror destinations indicates that each of the FETs 153 and 154 is a plurality of FETs and the plurality of FETs are connected to the FETs 151 and 152 of the mirror sources in parallel. Note that, a plurality of sets of switches 155 and 156 connected to the FETs 153 and 154 are also present according to the fact that each of the FETs 153 and 154 is the plurality of FETs.

Similarly to the switches 113 and 114, the switches 155 and 156 are exclusively turned on or off.

When the switch 155 is turned on (accordingly, when the switch 156 is turned off), the current flowing through the FETs 153 and 154 is discarded to the power supply VSS such as GND. When the switch 156 is turned on (accordingly, when the switch 155 is turned off), the current flowing through the FETs 153 and 154 flows through a reference signal output line. The current flowing through the reference signal output line flows to a terminating resistor R, and a voltage drop caused by the current flowing through the terminating resistor R is output from the DA converter 22 as the reference signal (voltage).

Similar to switches 113 and 114, as the switches 155 and 156 are exclusively turned on or off, the current flowing from the power supply VDD in the DA converter 22 is not changed and becomes constant by turning on or off the switches 155 and 156, and it is possible to prevent fluctuation of the voltage as the reference signal caused by the change of the current flowing from the power supply VDD.

In the ramp DAC 34, by controlling the number of FETs that turn on or off the switch 156 among the plurality of FETs as the respective FETs 153 and 154, the current flowing through the reference signal output line is increased or decreased.

That is, in the P phase and the D phase, the current flowing through the reference signal output line is gradually decreased by gradually decreasing the number of FETs that turn on the switch 156 among the plurality of FETs as the respective FETs 153 and 154. Therefore, in the P phase and the D phase, the reference signal (voltage) gradually decreases.

In the DA converter 22 configured as described above, in the ramp DAC 34, a current according to the number of switches 114 that are turned on (hereinafter also referred to as a unit current) flows through the FETs 151 and 152 that are mirror sources.

Here, for simplification of description, it is assumed that a mirror ratio of the current mirror including the FETs 151 to 154 is 1:1. In this case, in the ramp DAC 34, for example, a current obtained by multiplying the unit current flowing through the FETs 151 and 152 that are mirror sources by several times the switch 156 that is turned on flows through the reference signal output line.

In addition, in the P phase and the D phase, the number of the switches 156 that are turned on is sequentially decreased, that is, the plurality of switches 156 are sequentially switched from an on state to an off state, and thus the current flowing through the reference signal output line and the reference signal are gradually decreased.

As described above, the current obtained by multiplying the unit current by several times the switch 156 that is turned on flows through the reference signal output line, and in a case in which the unit current does not change in the current flowing through the reference signal, the reference signal linearly decreases as the current flowing through the reference signal output line linearly decreases number of switches 156 that are turned on in time.

Therefore, for example, the nonlinear change of the reference signal is able to be performed by nonlinearly changing (decreasing) the number of switches 156 that are turned on.

In addition, for example, the nonlinear change of the reference signal is able to be performed by changing the change amount of the reference signal (voltage) for each time the number of the switches 156 that are turned on is changed one by one, by changing the unit current.

That is, for example, the DA converter 22 linearly decreases the nonlinear reference signal (voltage) by sequentially turning off ½ switch 156 among the plurality of switches 156. Furthermore, the DA converter 22 is able to change the slope of the nonlinear reference signal before and after clearing, by performing clearing to turn on all of the plurality of switches 156, decreasing a current flowing through one switch 156 to ½, and linearly decreasing the nonlinear reference signal by sequentially turning off the ½ switch 156 among the plurality of switches 156.

Note that, control of the switches 113 and 114, the switches 131 and 132, the switches 137 and 138, and the switches 155 and 156 (the plurality of switches as each) is performed, for example, by the sensor controller 15 (FIG. 6).

<Configuration Example of Ramp DAC 34>

Figure 13:
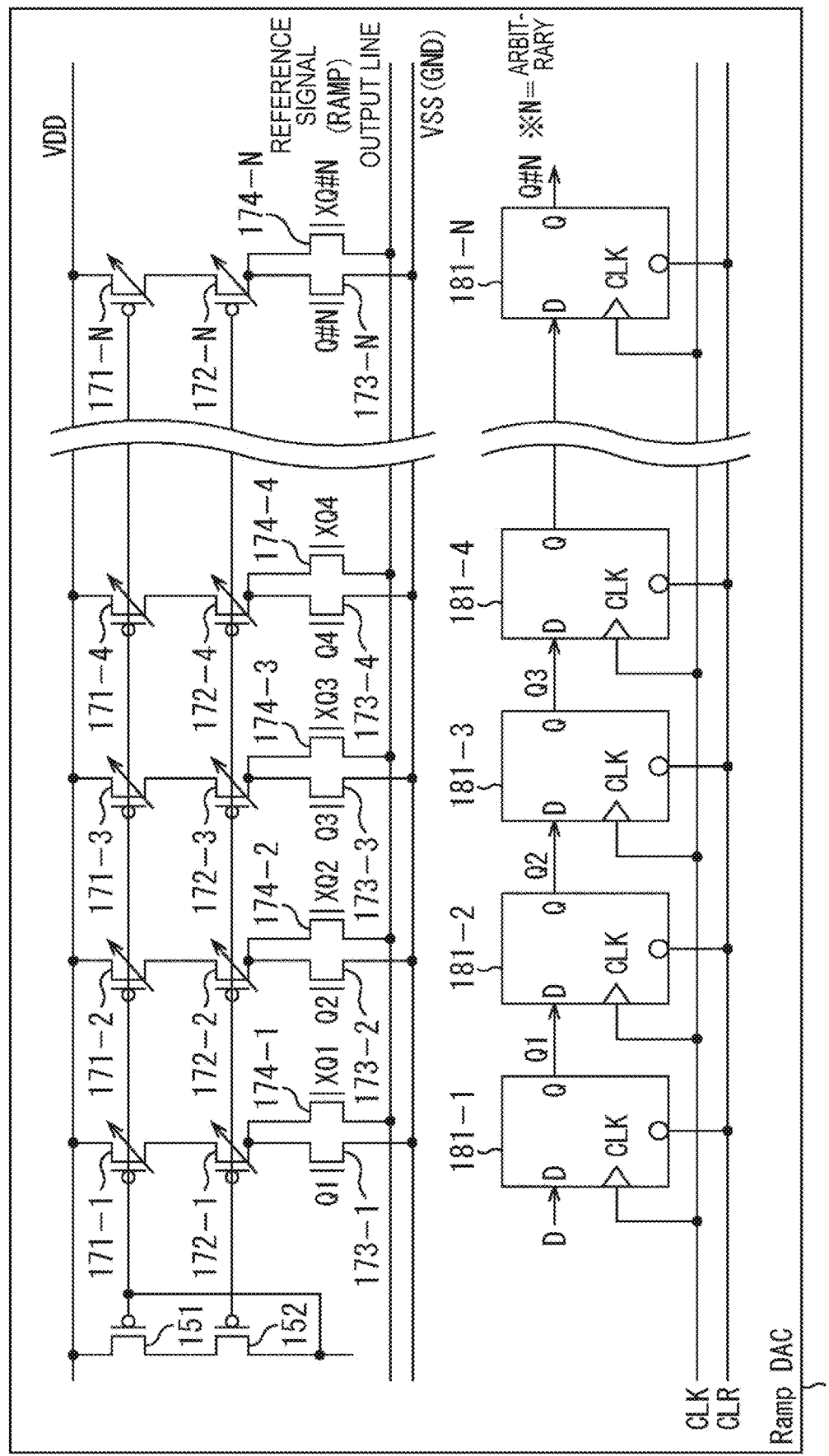
FIG. 13 is a circuit diagram illustrating a configuration example of a shift register that is included in a ramp DAC.

FIG. 13 illustrates a configuration example of a shift register that is included in the ramp DAC 34. In the ramp DAC 34, the shift register make Hi outputs in the order of Q1, Q2, Q3, . . . , and Q #N (where N is any integer) and the Hi outputs are combined with a current source of the ramp DAC 34 so that a ramp slope is generated. Additionally, when the ramp slope is set to be nonlinear (when the P-phase of the SP2 is subjected to the AD conversion) in regard to N of Q #N, N can be a larger value than N when the ramp slope is set to be linear (for example, the D-phase of the SP1 is subjected to the AD conversion).

That is, FIG. 13 is a circuit diagram showing a detailed configuration example of the ramp DAC 34 of FIG. 12.

In FIG. 13, the ramp DAC 34 has FETs 151 and 152, FETs 171-1 to 171-N and 172-1 to 172-N, FETs 173-1 to 173-N and 174-1 to 174-N, and D flip-flops (DFFs) 181-1 to 181-N.

Note that, in FIG. 12, in order to avoid drawing from becoming complicated, the DFFs 181-1 to 181-N are not shown in the figure.

The FETs 151 and 152 and the FETs 171-1 to 171-N and 172-1 to 172-N configure a current mirror.

As described with reference to FIG. 12, the FETs 151 and 152 configure a mirror source of the current mirror.

The FETs 171-1 to 171-N and 172-1 to 172-N are a plurality of FETs as the FETs 153 and 154 of mirror destinations of the current mirror of FIG. 12, respectively. That is, the FETs 171-1 to 171-N are a plurality of FETs as the FET 153 of FIG. 12, and the FETs 172-1 to 172-N are a plurality of FETs as the FET 154 of FIG. 12.

The FETs 171-$n$ and 172-$n$ ($n$=1, 2, . . . , N) of the mirror destination are connected to the power supply VSS such as GND through the FET 173-$n$ and connected to the reference signal output line through the FET 174-$n$.

The FETs 173-1 to 173-N are a plurality of switches as the switch 155 of FIG. 12, and the FETs 174-1 to 174-N are a plurality of switches as the switch 156 of FIG. 12.

An output signal Q #n of the DFF 181-$n$ ($n$=1, 2, . . . , N) is supplied to the gate of the FET 173-$n$. Therefore, the FET 173-$n$ is turned on or off according to the output signal Q #n.

An inverted signal XQ #n obtained by inverting the output signal Q #n of the DFF 181-$n$ is supplied to the gate of the FET 174-$n$. Therefore, the FET 174-$n$ is turned on or off according to the inverted signal XQ #n.

As described above, since the FET 173-$n$ is turned on or off according to the output signal Q #n and the FET 174-$n$ is turned on or off according to the inverted signal XQ #n, the FET 173-$n$ and 174-$n$ are exclusively turned on or off.

The DFFs 181-1 to 181-N are connected in series and configure a shift register.

A clock CLK and a clear signal CLR are supplied to the DFF 181-$n$, and an output signal Q #n−1 is supplied to the DFF 181-$n$ from the DFF 181-($n$−1) of the preceding stage.

The DFF 181-$n$ latches an input signal Q #n−1 using the output signal Q #n−1 supplied from the DFF 181-($n$−1) of the preceding stage as an input signal in synchronism with the clock CLK, and outputs the input signal Q #n−1 as the output signal Q #n.

Note that, for example, a predetermined driving signal D from the sensor controller 15 is supplied as an input signal to the DFF 181-1 of an initial stage among the DFFs 181-1 to 181-N. The shift register including the DFFs 181-1 to 181-N sequentially latches the driving signal D from the initial DFF 181-1 to the DFF 181-$n$ of the latter stage.

In addition, in a case in which the clear signal CLR (of the L level) is supplied to the DFF 181-$n$, the DFF 181-$n$ clears (resets) the inside and outputs the L level as the output signal Q #n. In this case, all of the inverted signal XQ #n become the H level, and all of the FETs 174-1 to 174-N as the switch 156 of FIG. 12 are turned on. As described above, turning on all the N FETs 174-1 to 174-N as all the switches 156 by supplying the clear signal CLR to the DFF 181-$n$ is also referred to as clear of the ramp DAC 34.

In the ramp DAC 34 configured as described above, in the shift register including the DFF 181-1 to 181-N, an output signal Q1 of the first DFF 181-1 becomes the H level, and then the output signal Q #n of the DFF 181-n of the latter stage is becoming the H level sequentially. Therefore, the inverted signal XQ #n is sequentially becoming the L level from n=1.

As a result, the FET 174-n as the switch 156 of FIG. 12 sequentially turns off from n=1 according to the inverted signal XQ #n, and the reference signal (voltage) decreases by decreasing the current flowing through the reference signal output line from the FET 174-n.

That is, in the DA converter 22, for example, by sequentially turning off the FETs 174-1 to 174-N/2 as the ½ switch 156 among the plurality of switches 156, the nonlinear reference signal (voltage) linearly decreases. Furthermore, the DA converter 22 is able to change the slope of the nonlinear reference signal before and after clearing by performing clearing the ramp DAC 34 that turns on all of N FETs 174-1 to 174-N as one switch 156, decreasing the current flowing through the FET 174-n as one switch 156, that is, the unit current to ½, and sequentially turn off, for example, the FETs 174-1 to 174-N/2, as ½ switch 156 among the plurality of switches 156, and linearly changing the nonlinear reference signal.

The clearance of the ramp DAC 34 is able to be performed by supplying the clear signal CLR to the DFF 181-1 to 181-N. The decrease of the unit current flowing through the FET 174-n as the switch 156 is able to be performed by turning off one or more of the switches 114 that are turned on in the PGC DAC 32 of FIG. 12.

<First Driving Example of DA Converter 22>

Figure 14:
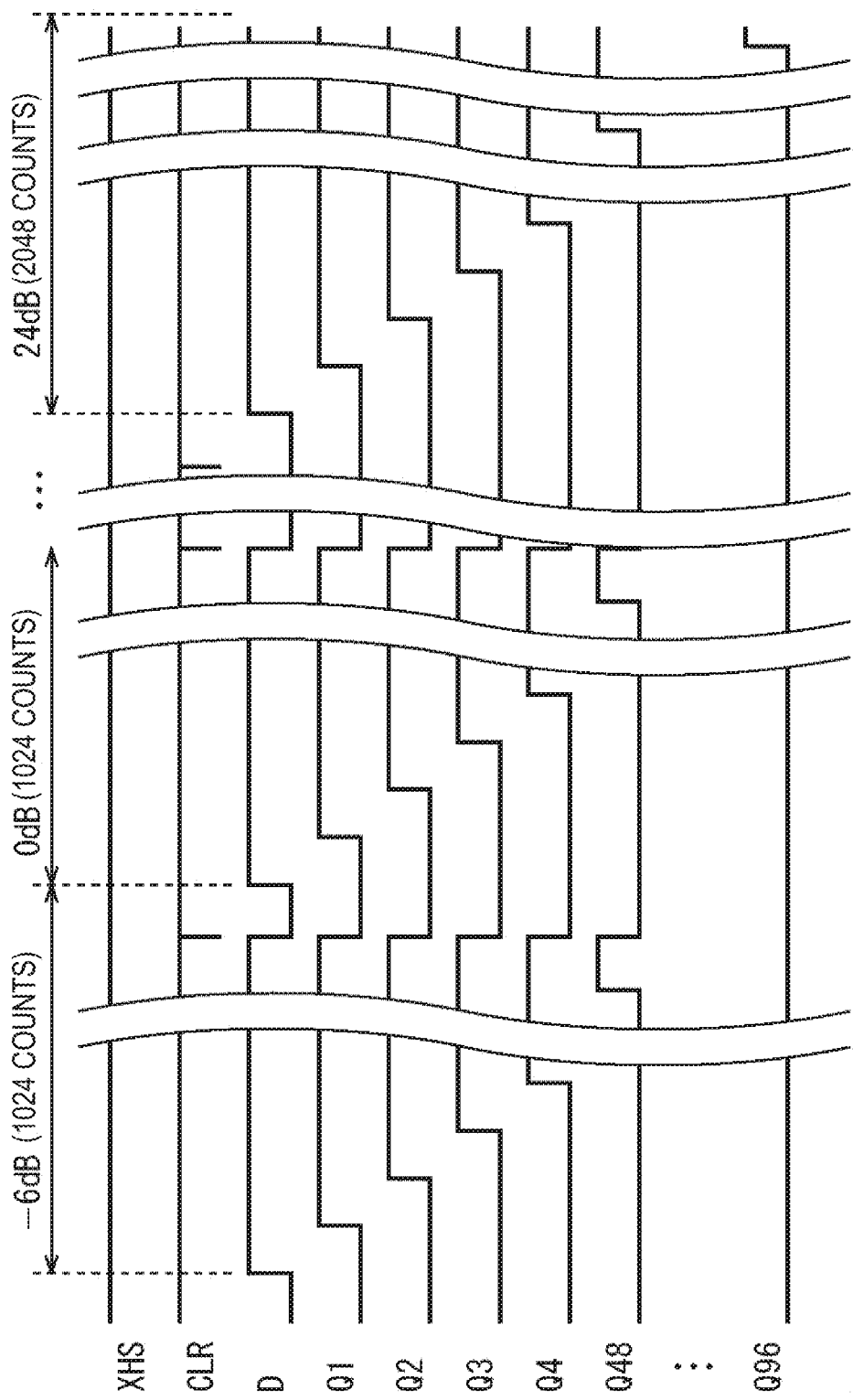
FIG. 14 is a diagram illustrating a level shifter output corresponding to a first driving example of the DA converter.
Figure 15:
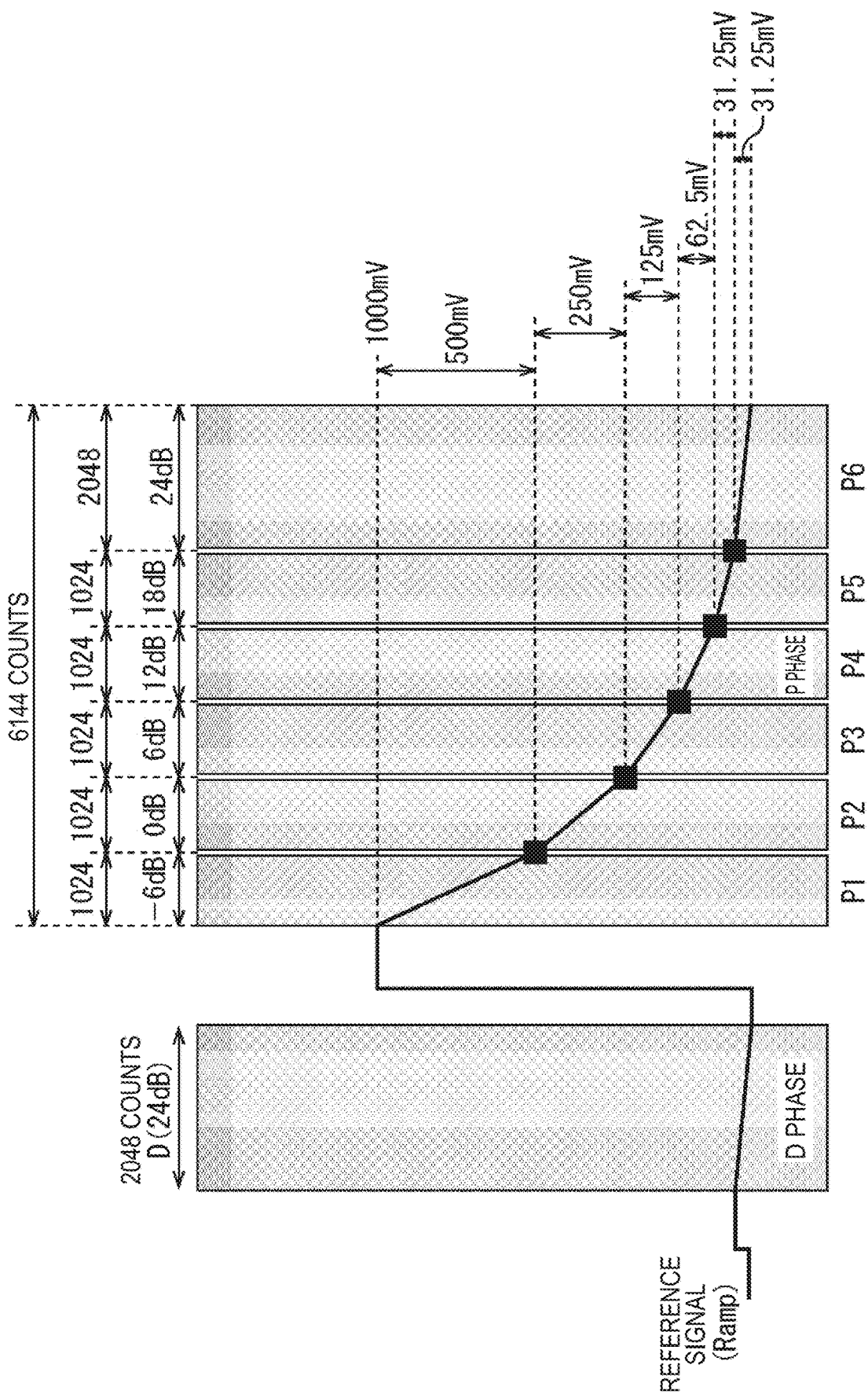
FIG. 15 is a diagram illustrating a ramp waveform corresponding to the level shifter output of FIG. 14.

FIG. 14 illustrates level shifter outputs corresponding to the first driving example of the DA converter 22. FIG. 15 illustrates a ramp waveform corresponding to the level shifter outputs illustrated in FIG. 14.

Outputs of the shift register illustrated in FIG. 13 are equivalent to Q1 to Q96 of FIG. 14. Q1 to Q96 become all Lo outputs since a CLR signal becomes the Lo output and the level shifters are reset. Accordingly, in order to set the ramp waveform to be nonlinear, the current source is reset by causing the CLR signal to become the Lo output at each gain switching time. In this way, the nonlinear ramp waveform illustrated in FIG. 15 can be obtained.

Accordingly, it is possible to improve Con Res. in a case in which the outputs of the SP1 and the SP2 are combined while maintaining a frame rate or a dynamic range.

However, in the case of the first driving example described above, an erroneous output (unintended output) may arise due to an influence of inversion delay or the like of the comparator 23 or the like at a gain switching point. Hereinafter, a second driving example will be described to prepare countermeasures of the erroneous output.

<Second Driving Example of DA Converter 22>

Figure 16:
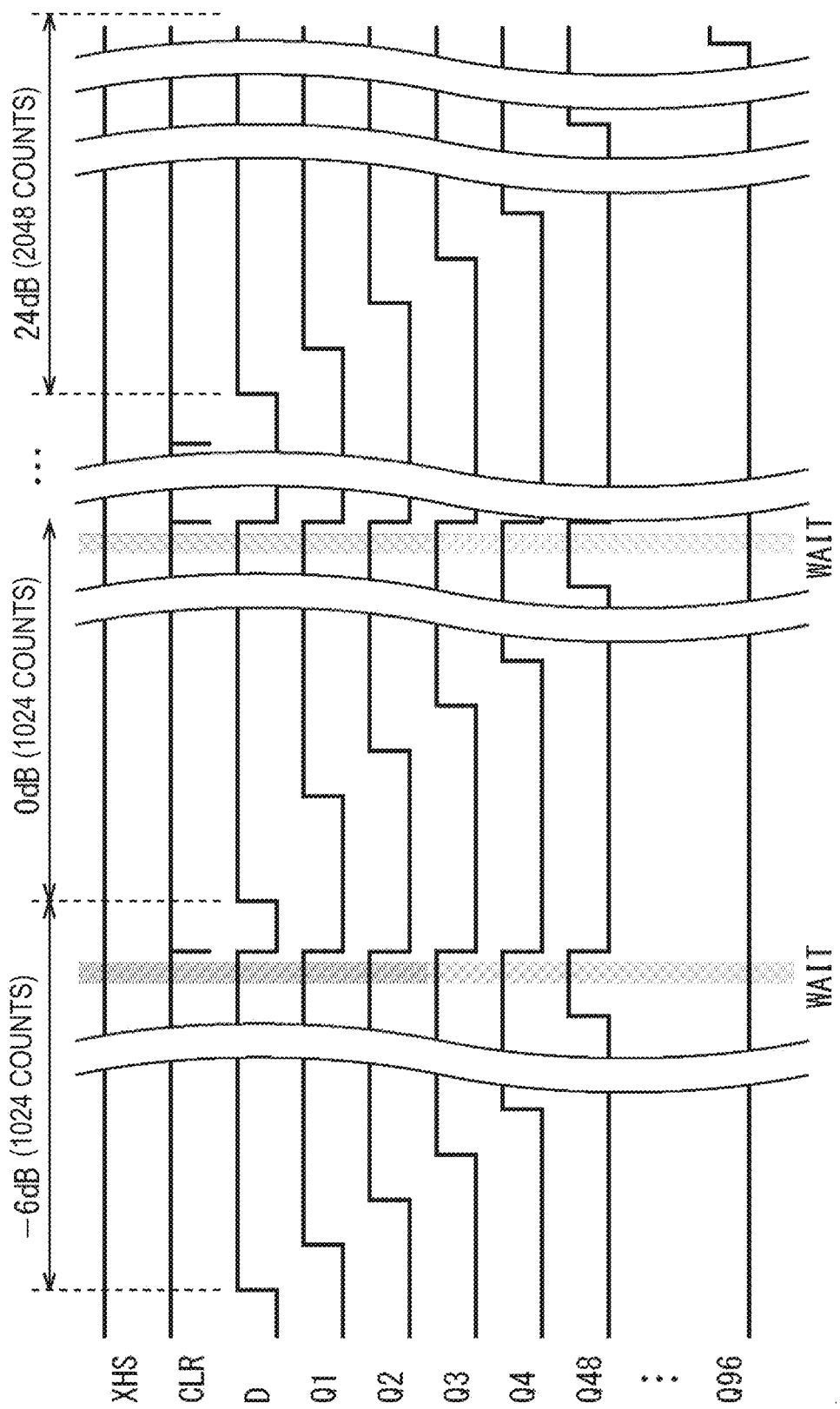
FIG. 16 is a diagram illustrating a level shifter output corresponding to a second driving example of the DA converter.
Figure 17:
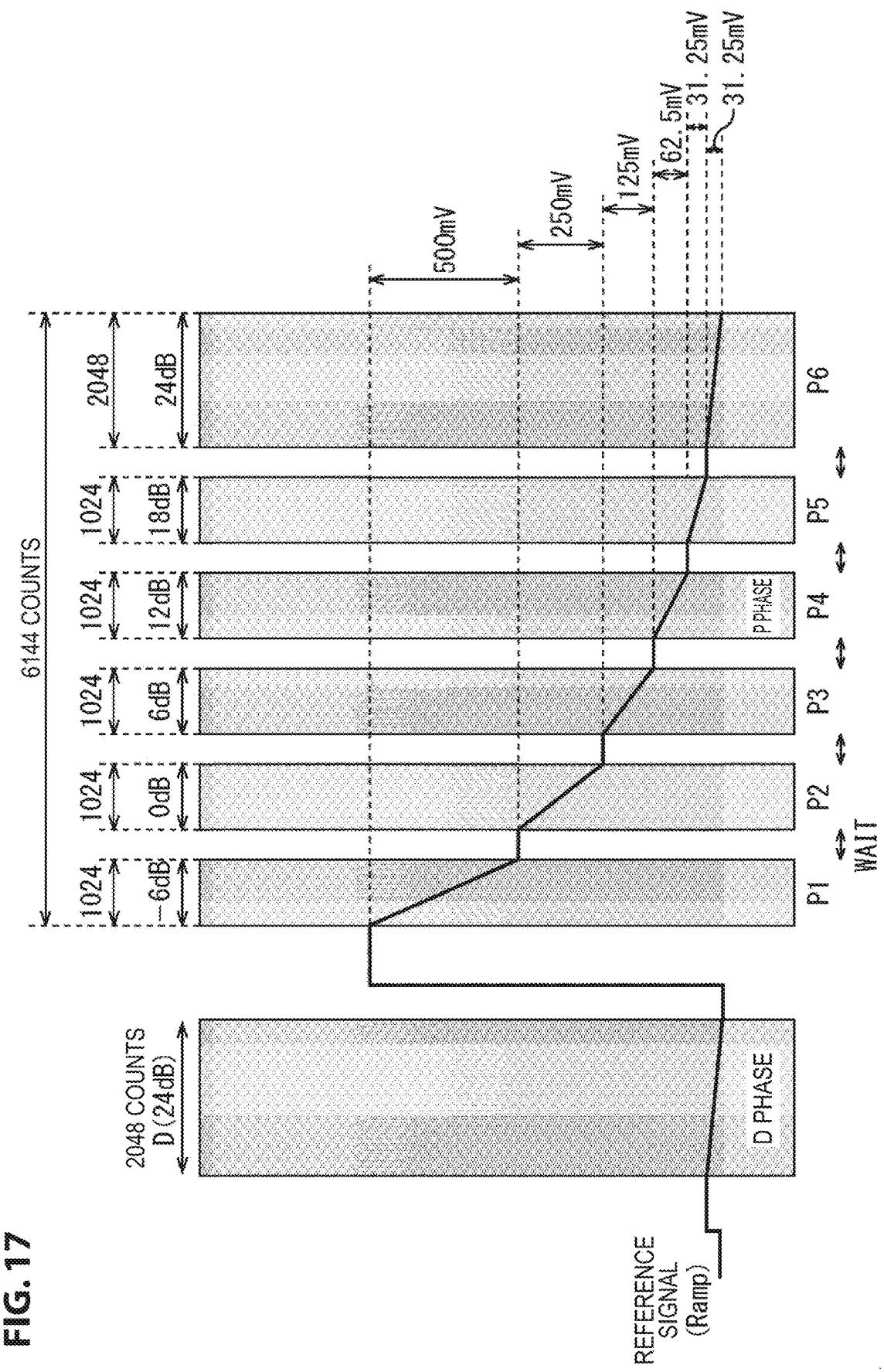
FIG. 17 is a diagram illustrating a ramp waveform corresponding to the level shifter output of FIG. 15.

FIG. 16 illustrates level shifter outputs corresponding to the second driving example of the DA converter 22. FIG. 17 illustrates a ramp waveform corresponding to the level shifter outputs illustrated in FIG. 16.

In the case of the second driving example, after a CLR signal is output as an Lo output at each gain switching time, WAIT (waiting time) is inserted. In this way, it is possible to obtain a normal output (intended output) even when inversion delay or the like arise in the comparator 23 or the like. Thus, it is possible to prevent a code error at the gain switching time.

<Third Driving Example of DA Converter 22>

In the first driving example illustrated in FIG. 14, the CLR signal is output as the Lo output at each gain switching time. In a third driving example, however, a time at which the CLR signal is output as the Lo output can be changed appropriately. In this way, since the gain switching point is variable, countermeasures can be taken in accordance with a situation (the amount of light or a variance)

<Driving Example of DA Converter 22>

A driving example of the DA converter 22 will be described again.

FIG. 14 is a timing chart showing a first example of the output signal Q #n (the inverted signal XQ #n supplied to the gate of the FET 174-n) of the DFF 181-n supplied to the gate of the FET 173-n when the DA converter 22 is driven.

FIG. 14 also shows the horizontal synchronization signal XHS, the clear signal CLR, and the driving signal D in addition to the output signal Q #n.

A driving signal D is a pulse that becomes the H level during a period of 1 (horizontal) line, the driving signal D sequentially latches, for example, the DFF 181-1 to DFF 181-N of FIG. 13 in synchronization with the clock CLK, and thus the output signals Q1 to Q #N sequentially change from the L level to the H level in synchronization with the clock CLK.

As described above, since the output signals Q1 to Q #N sequentially change from the L level to the H level, the FETs 173-1 to 173-N sequentially change from the off state to the on state in synchronization with the clock CLK, and the FETs 174-1 to 174-N sequentially change from the on state to the off state in synchronization with the clock CLK.

The FETs 173-1 to 173-N sequentially change from the off state to the on state and the FETs 174-1 to 174-N sequentially change from the on state to the off state, and thus the number of the FETs 171-n and 172-n that causes the current to flow through the reference signal output line decreases in synchronization with the clock CLK. As a result, the current flowing through the reference signal output line, and hence the reference signal (voltage) decreases in synchronization with the clock CLK.

In FIG. 14, after the count value to be counted in the P #i phase (FIG. 3) that is the sub period configuring the P phase has been counted, the clear signal CLR is temporarily changed from the H level to the L level before the start of the next P #i+1 phase. By the change of the clear signal CLR to the L level, the ramp DAC 34 is cleared as described with reference to FIG. 13.

The driving signal D becomes the H level during a period until the clear signal CLR becomes L level from the start of the P #i phase, and becomes L level until the start of the next P #i phase since the clear signal CLR becomes L level.

With respect to the driving signal D as described above, the output signal Q #n of the DFF 181-n is as shown in FIG. 14.

Now, for example, in a case in which it is assumed that N is 96, output signals Q1 to Q48 of ½ DFFs 181-1 to 181-48 among the DFFs 181-1 to 181-96 sequentially change from the L level to the H level in synchronization with the clock, in each of the P1 phase to P5 phase among the P1 phase to P6 phase that configure the P phase.

Therefore, the inverted signals XQ1 to XQ48 sequentially change from the H level to the L level in synchronization with the clock, and the FETs 174-1 to 174-48 as the switch 156 (FIG. 12) are sequentially turned off.

Thereafter, when the clear signal CLR becomes the L level and the next sub period P #i+1 phase starts, the PGC DAC 32 decreases the unit current flowing through the FET 174-n as one switch 156 to ½.

In addition, as described above, in the P #i+1 phase, the output signals Q1 to Q48 of ½ DFFs 181-1 to 181-48 among the DFFs 181-1 to 181-96 sequentially change from the L level to the H level in synchronization with the clock.

Note that, in the P6 phase, all of the output signals Q1 to Q96 of the DFFs 181-1 to 181-96 sequentially change from the L level to the H level in synchronization with the clock.

Therefore, the inverted signals XQ1 to XQ96 sequentially change from the H level to the L level in synchronization with the clock, and the FETs 174-1 to 174-96 as the switch 156 (FIG. 12) are sequentially turned off.

FIG. 15 is a waveform diagram showing the nonlinear reference signal in a case in which the output signal Q #n of the DFF 181-*n* (the inverted signal XQ #n supplied to the gate of the FET 174-*n*) is the signal described with reference to FIG. 14.

Note that, FIG. 15 is a diagram similar to that of FIG. 3.

Now, in the PGC DAC 32, it is assumed that the unit current of the P1 phase flows so that a voltage drop of the terminating resistance R when the FETs 174-1 to 174-96 as the switch 156 (FIG. 12) is turned on becomes 1000 mV. In addition, here, for simplification of explanation, it is assumed that the nonlinear reference signal (voltage) is equal to the voltage drop of the terminating resistor R.

In this case, in the P1 phase, the output signals Q1 to Q48 of ½ DFFs 181-1 to 181-48 among the DFFs 181-1 to 181-96 sequentially change from the L level to the H level in synchronization with the clock, that is, the inverted signals XQ1 to XQ48 sequentially change from the H level to the L level in synchronization with the clock, and the FETs 174-1 to 174-48 as the switch 156 (FIG. 12) are sequentially turned off.

In a case in which one FET 174-*n* is turned off, since the current flowing through the terminating resistor R is reduced by the unit current, the nonlinear reference signal decreases in units of the unit current by sequentially turning off the FET 174-1 to 174-48.

Since the voltage drop of the terminating resistor R when all the FETs 174-1 to 174-96 are turned on is a 1000 mV, in a case in which ½ FETs 174-1 to 174-48 among the FETs 174-1 to 174-96 are turned off, the nonlinear reference signal is decreased by 500 mV and becomes 500 mV.

Thereafter, before the start of the P2 phase, ramp DAC 34 is cleared, therefore, all of the output signals Q1 to Q96 of the DFFs 181-1 to 181-96 become the L level, that is, all of the inverted signals XQ1 to XQ96 become H level, and all of the FETs 174-1 to 174-96 as the switch 156 (FIG. 12) are turned on.

At the same time, the PGC DAC 32 (FIG. 12) decreases the unit current flowing through the FET 174-*n* as one switch 156 to ½.

Since the voltage drop of the terminating resistor R when all of the FETs 174-1 to 174-96 is turned on is 1000 mV before the unit current is decreased to ½, after the unit current is decreased to ½, the voltage drop of the terminating resistor R when all of the FETs 174-1 to 174-96 are turned on is 500 mV=1000 mV/2.

Therefore, in the P1 phase, the nonlinear reference signal that has become 500 mV by decreasing from 1000 mV by 500 mV maintains the decreased value by the 500 mV after the clearance of the ramp DAC 34 and the decrease of the unit current.

Then, when the P2 phase is started, the output signals Q1 to Q48 of ½ DFFs 181-1 to 181-48 among the DFFs 181-1 to 181-96 sequentially change from the L level to the H level in synchronization with the clock, that is, the inverted signals XQ1 to XQ48 sequentially change from the H level to the L level in synchronization with the clock, and the FETs 174-1 to 174-48 as the switch 156 (FIG. 12) are sequentially turned off.

In a case in which one FET 174-*n* is turned off, since the current flowing through the terminating resistor R is reduced by the unit current, the nonlinear reference signal decreases in units of the unit current by sequentially turning off the FET 174-1 to 174-48.

Note that, in the P2 phase, since the unit current is decreased to ½ as compared with the P1 phase, (magnitude of) the slope of the nonlinear reference signal becomes ½. That is, in the P2 phase, the gain of the AD conversion is twice (6 dB) that of a case of the P1 phase.

At the start of the P2 phase, since the voltage drop of the terminating resistor R when all the FETs 174-1 to 174-96 are turned on is a 500 mV, in a case in which ½ FETs 174-1 to 174-48 among the FETs 174-1 to 174-96 are turned off, the nonlinear reference signal is decreased by 250 mV and becomes 250 mV.

Thereafter, before the start of the P2 phase, ramp DAC 34 is cleared, therefore, all of the output signals Q1 to Q96 of the DFFs 181-1 to 181-96 become the L level, that is, all of the inverted signals XQ1 to XQ96 become H level, and all of the FETs 174-1 to 174-96 as the switch 156 (FIG. 12) are turned on.

At the same time, the PGC DAC 32 decreases the unit current flowing through the FET 174-*n* as one switch 156 to ½.

Since the voltage drop of the terminating resistor R when all of the FETs 174-1 to 174-96 is turned on is 500 mV before the unit current is decreased to ½, after the unit current is decreased to ½, the voltage drop of the terminating resistor R when all of the FETs 174-1 to 174-96 are turned on is 250 mV=500 mV/2.

Therefore, in the P2 phase, the nonlinear reference signal that has become 250 mV by decreasing from 500 mV by 250 mV maintains the decreased value after the clearance of the ramp DAC 34 and the decrease of the unit current.

Then, when the P3 phase is started, the output signals Q1 to Q48 of ½ DFFs 181-1 to 181-48 among the DFFs 181-1 to 181-96 sequentially change from the L level to the H level in synchronization with the clock, that is, the inverted signals XQ1 to XQ48 sequentially change from the H level to the L level in synchronization with the clock, and the FETs 174-1 to 174-48 as the switch 156 (FIG. 12) are sequentially turned off.

In a case in which one FET 174-*n* is turned off, since the current flowing through the terminating resistor R is reduced by the unit current, the nonlinear reference signal decreases in units of the unit current by sequentially turning off the FET 174-1 to 174-48.

Note that, in the P3 phase, since the unit current is decreased to ½ as compared with the P2 phase, the slope of the nonlinear reference signal becomes ½. That is, in the P3 phase, the gain of the AD conversion is twice (6 dB) that of a case of the P2 phase.

Hereinafter, in the same manner, the nonlinear reference signal changes nonlinearly so as to decrease the slope with half of the immediately before sub period in each sub period of the P1 phase to the P6 phase.

Note that, in the last P6 phase, all of the output signals Q1 to Q96 of the DFFs 181-1 to 181-96 sequentially change from the L level to the H level in synchronization with the clock, that is, the inverted signal XQ1 to XQ96 sequentially change from the H level to the L level in synchronization with the clock, and the FETs 174-1 to 174-96 as the switch 156 (FIG. 12) are sequentially turned off.

FIG. 16 is a timing chart showing a second example of the output signal Q #n (the inverted signal XQ #n supplied to the gate of the FET 174-n) of the DFF 181-n supplied to the gate of the FET 173-n when the DA converter 22 is driven.

Similar to FIG. 14, FIG. 16 also shows the horizontal synchronization signal XHS, the clear signal CLR, and the driving signal D in addition to the output signal Q #n.

In FIG. 16, the output signal Q #n, the horizontal synchronization signal XHS, the clear signal CLR, and the driving signal D are similar to those in a case of FIG. 14.

However, in FIG. 16, in the P1 phase to the P5 phase except for the last P6 phase among the P1 phase to the P6 phase, after all of the output signals Q1 to Q48 of ½ DFFs 181-1 to 181-48 among the DFFs 181-1 to 181-96 change from the L level to the H level, that is after all of the FETs 174-1 to 174-48 as the switch 156 (FIG. 12) are turned off, and a waiting time (standby time) is provided before the clear signal CLR becomes the L level and PGC DAC 32 decreases the unit current to ½.

Specifically, a state in which all of the output signals Q1 to Q48 of ½ DFFs 181-1 to 181-48 among the DFFs 181-1 to 181-96 change to the H level, that is, a state in which all of the FETs 174-1 to 174-48 as the switch 156 (FIG. 12) are turned off is maintained for a predetermined waiting time WAIT, and then setting the clear signal CLR to the L level and decreasing the unit current to ½ are performed.

FIG. 17 is a waveform diagram showing the nonlinear reference signal in a case in which the output signal Q #n of the DFF 181-n (the inverted signal XQ #n supplied to the gate of the FET 174-n) is the signal described with reference to FIG. 16.

As described with reference to FIG. 16, by setting the wait time WAIT, between the end of the P #i phase that is a certain sub period and the start of the P #i+1 phase that is the next sub period, a waiting time WAIT in which the nonlinear reference signal is maintained at the voltage at the end of the P #i phase is inserted.

According to the insertion of the waiting time WAIT as described above, in a case in which the magnitude relationship between the nonlinear reference signal and the VSL voltage is inversed just before the end of the P #i phase due to the influence of a delay of the inversion of the comparator output VCO of the comparator 23 or the like, it is possible to suppress the occurrence of a large error in the AD conversion result of the VSL voltage due to deviation between a timing of the inversion and a timing of the inversion of the comparator output VCO.

Note that, in the waiting time WAIT, the count of the count value by the counter 24 is stopped.

In addition, the DA converter 22 is able to change a point (gain switch point) at which the slope of the nonlinear reference signal is changed, that is, a start position and an end position of the sub period configuring the P phase, by changing a timing at which the ramp DAC 34 is cleared (the clear signal CLR is set to be the L level) and the current flowing through the switch 156 is decreased.

For example, in an environment in which the amount of light is not so large, that is, for example, in an environment in which the output of the SP1 is just saturated and the amount of light of the SP2 is adopted as the combined pixel value, by setting the P6 phase that is the sub period of the nonlinear reference signal of 24 dB to be a longer period, a gain of the AD conversion of 24 dB is multiplied, and it is possible to expand a range of the amount of light capable of obtaining a combined pixel value with improved gray scale.

In addition, it is possible to suitably adjust the length of each P #i phase that is the sub period according to variations in the amount of light and the like.

<Countermeasure for Settling Shortage of Ramp Wave>

In a case in which a nonlinear ramp wave is output from the DA converter 22, settling shortage of a ramp wave can occur at the time of achievement of −6 dB.

Figure 18:
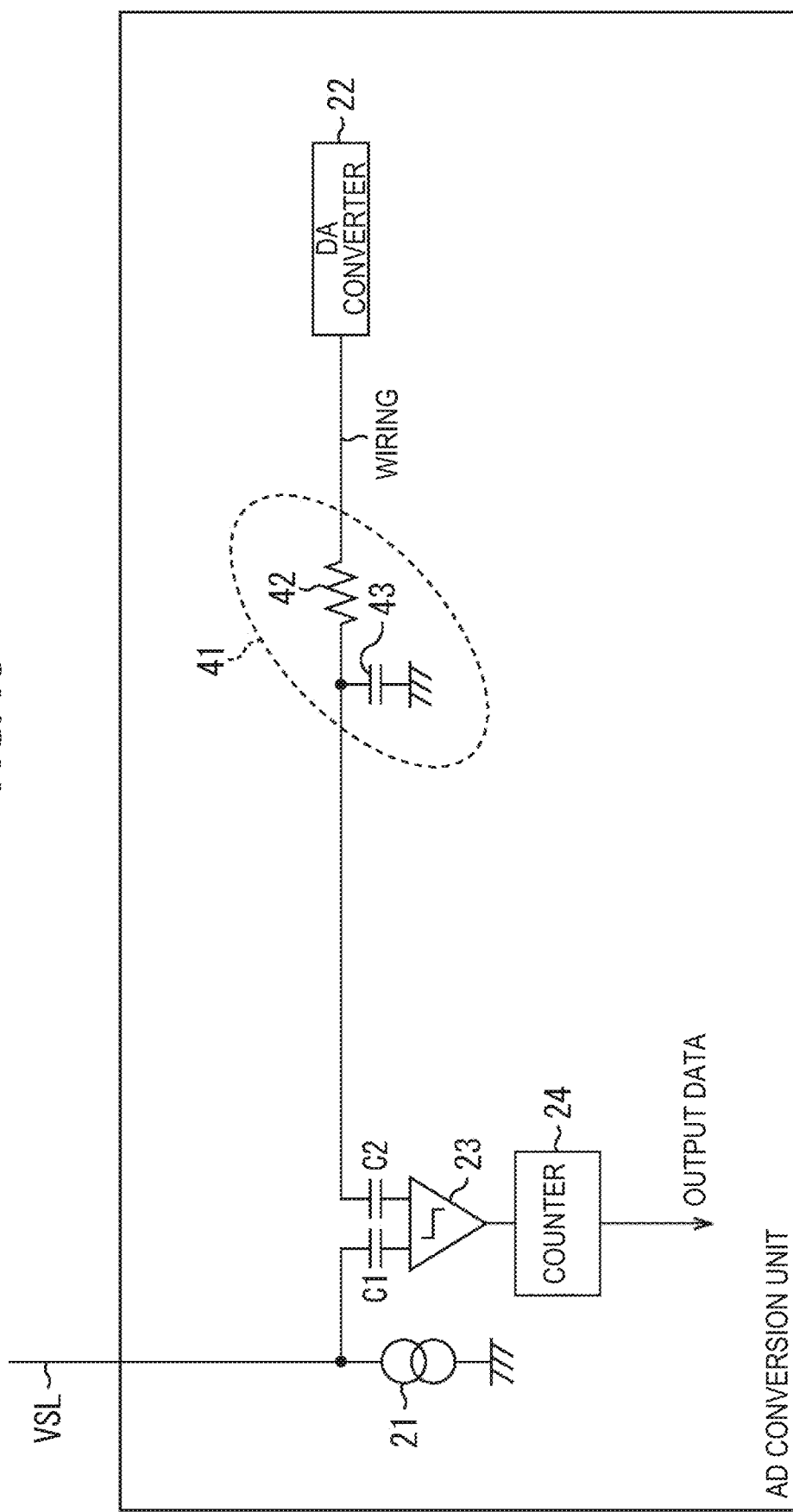
FIG. 18 is an explanatory diagram illustrating settling shortage of a ramp wave.
Figure 19:
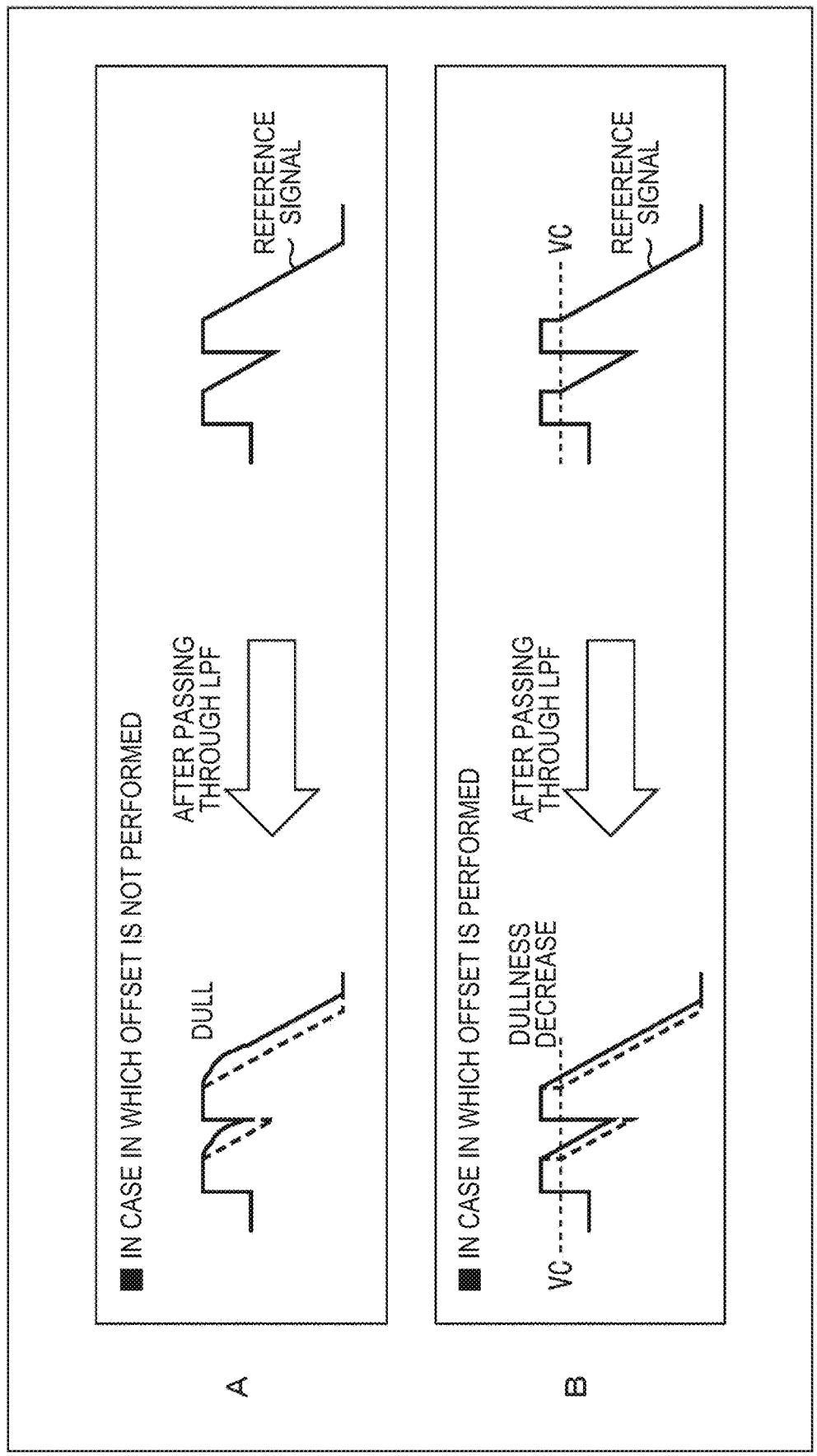
FIG. 19 is an explanatory diagram illustrating the settling shortage of a ramp wave.

FIGS. 18 and 19 are explanatory diagrams illustrating a cause of the settling shortage of the ramp wave. In the AD conversion unit 14, as illustrated in FIG. 18, a parasitic capacitor 42 and a parasitic resistor 43 which can occur between the DA converter 22 and the comparator 23 may operate as an LPF 41. In this way, as illustrated in A of FIG. 19, after the waveform of a ramp wave from the DA converter 22 passes through the LPF 41, the waveform of the ramp wave can be rounded and settling shortage can occur at last.

As the countermeasure, an offset (hereinafter referred to as Ramp Stable) is provided in a ramp potential immediately before the ramp slope of the nonlinear ramp wave output from the DA converter 22. In this way, as illustrated in B of FIG. 19, after the offset waveform of the ramp wave from the DA converter 22 passes through the LPF 41, the rounding of the waveform of the ramp wave is reduced, and thus the settling shortage is suppressed.

That is, FIG. 18 is a diagram showing as aspect in which the reference signal is supplied from the DA converter 22 to the comparators 23 of each column of the pixels 11P.

The reference signal is supplied from the DA converter 22 to the comparators 23 in each column through wiring. A parasitic resistance 42 and a parasitic capacitance 43 are present in the wiring through which the reference signal is supplied, and the parasitic resistance 42 and the parasitic capacitance 43 function as a low pass filter (LPF) 41.

FIG. 19 is a diagram for explaining the influence of the LPF 41 and a countermeasure against the influence.

A of FIG. 19 is a diagram for explaining the influence of the LPF 41.

Although the reference signal (the nonlinear reference signal and the linear reference signal) decreases in the P phase and the D phase, at the beginning of the decrease, a settling short in which the waveform of the reference signal is dull due to the influence of the LPF 41 from an original waveform (indicated by a dotted line in the figure) according to a time constant determined by the parasitic resistance 42 and the parasitic capacitance 43 occurs.

The nonlinear reference signal used in the P phase of the DDS driving becomes a reference signal of −6 dB in which the initial P1 phase has the steepest slope among the P1 phase to the P6 phase, and a degree of the dullness of the waveform becomes large.

B of FIG. 19 is a diagram for explaining the countermeasure against the influence of the LPF 41.

Now, in the P phase or the D phase, it is assumed that an original voltage when the decrease of the reference signal is started is expressed as a voltage (a predetermined voltage) VC.

As the countermeasure against the influence of the LPF 41, there is a method of performing a stable offset (Ramp Stable) that performs an offset so that the reference signal is increased to a voltage greater than the voltage VC before the start of the P phase or the D phase and is decreased to the voltage VC at the time of the start of the P phase or the D phase rather than starting the decrease of the reference signal from the voltage VC, in the P phase or the D phase.

The DA converter 22 is able to output the reference signal on which the stable offset is performed.

According to the stable offset, the reference signal steeply decreases to the voltage VC at the start of the P phase or the D phase, and then the reference signal decreases by a predetermined slope. As described above, when the reference signal steeply decreases to the voltage VC at the start of the P phase or the D phase, the degree of the decrease is dull due to the influence of the LPF 41, but the reference signal that decreases in the predetermined slope thereafter is able to decrease the degree of the dullness due to the influence of the LPF 41.

Here, in the stable offset, sizes of an offset amount for increasing the reference signal to the voltage greater than the voltage VC before the start of the P phase or the D phase and an offset amount for decreasing the reference signal to the voltage VC at the start of the P phase or the D phase are also referred to as offset amounts of the stable offset.

In addition, hereinafter, a portion of the P phase and the D phase (a waveform portion in which the voltage decreases) of the reference signal is also referred to as a slope.

According to the stable offset, it is possible to suppress the degree of the dullness from the original waveform of the slope of the reference signal.

Figure 20:
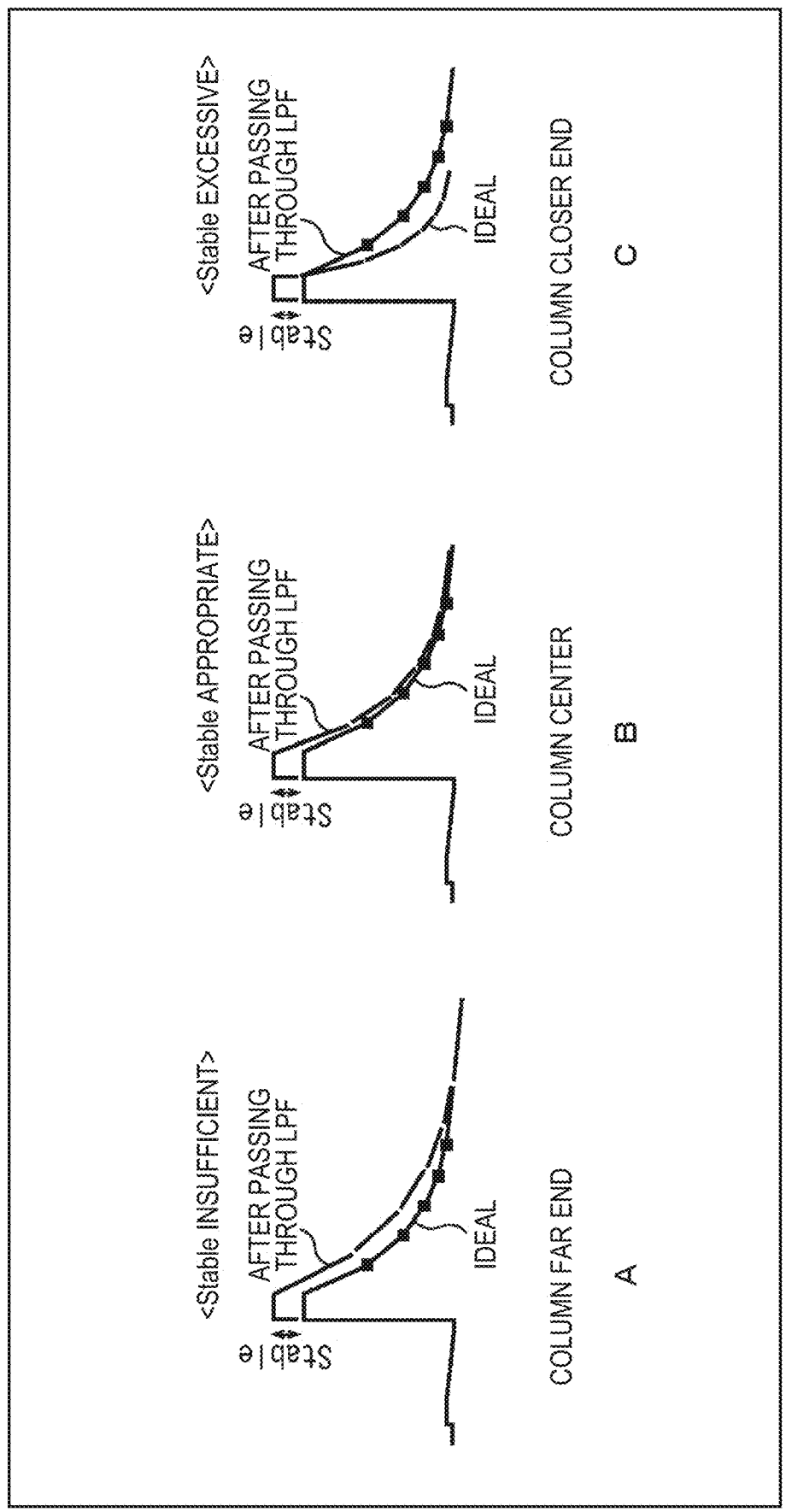
FIG. 20 is a diagram illustrating different Ramp Stables in accordance with a position of a column.

FIG. 20 illustrates a difference in an effect of Ramp Stable in pixels of which column positions are different, that is, in pixels of which distances from the DA converter 22 are different.

A of FIG. 20 illustrates the waveform of a ramp wave after the ramp wave passes through the LPF 41 in a pixel at a column far-end at which the distance from the DA converter 22 is farthest. B of FIG. 20 illustrates the waveform of a ramp wave after the ramp wave passes through the LPF 41 in a pixel at a column middle at which the distance from the DA converter 22 is closer than the case of A of FIG. 20. C of FIG. 20 illustrates the waveform of a ramp wave after the ramp wave passes through the LPF 41 in a pixel at a column near-end at which the distance from the DA converter 22 is closest.

In the case of A of FIG. 20, the slope of the waveform of the ramp wave after the ramp wave passes through the LPF 41 is less than that of an ideal form. Therefore, Ramp Stable is deficient. In the case of B of FIG. 20, the waveform of the ramp wave after the ramp wave passes through the LPF 41 is close to the ideal form. Therefore, Ramp Stable is appropriate. In the case of C of FIG. 20, the slope of the waveform of the ramp wave after the ramp wave passes through the LPF 41 is greater than that of the ideal form. Therefore, Ramp Stable is excessive.

As apparent from A, B and C of FIG. 20, the effect of Ramp Stable differs depending on the column position. Therefore, Ramp Stable may be set to a value at which the maximum effect can be obtained in the entire column.

That is, FIG. 20 is a diagram showing an example of the reference signal supplied from the DA converter 22 to the comparator 23 of each column of the pixel 11P in a case in which the stable offset of the reference signal is performed.

The offset amount of the stable offset of the reference signal is able to be determined so that the slope of the reference signal supplied to the comparator 23 in the center column (column center) of the pixel 11P is closer to the original (ideal) waveform.

FIG. 20 shows the reference signal supplied from the DA converter 22 to the comparator 23 in a case in which the offset amount of the stable offset is determined so that the slope of the reference signal supplied to the comparator 23 in the center column is closer to the original waveform.

That is, A of FIG. 20 shows the reference signal supplied from the DA converter 22 to the comparator 23 in a column (column far end) farther than the center column, and B of FIG. 20 shows the reference signal supplied to the comparator 23 in the center column (column center). C of FIG. 20 shows the reference signal supplied from the DA converter 22 to the comparator 23 in a column (column closer end) closer than the center column.

In a case in which the offset amount of the stable offset is determined so that the slope of the reference signal supplied to the comparator 23 in the center column is closer to the original waveform, as shown in B of FIG. 20, the slope of the reference signal supplied to the comparator 23 in the center column becomes a slope close to the original (ideal) waveform.

On the other hand, in a case in which the offset amount of the stable offset is determined so that the slope of the reference signal supplied to the comparator 23 in the center column is closer to the original waveform, the offset amount of the stable offset is insufficient (small) for the reference signal supplied to the comparator 23 in the column farther than the center column. Therefore, as shown in A of FIG. 20, the slope of the reference signal supplied to the comparator 23 in the column farther than the center column is a slope of which the slope is gentler than the original (ideal) waveform.

In addition, the offset amount of the stable offset is excessive (larger) for the reference signal supplied to the comparator 23 in the column closer than the center column. Therefore, as shown in C of FIG. 20, the slope of the reference signal supplied to the comparator 23 in the column closer than the center column becomes a slope of which the slope is gentler than the original waveform.

Since the nonlinear reference signal the most steeply decreases in the P1 phase where the P phase is started among the P1 phase to the P6 phase configuring the P phase, in a case in which the stable offset is not performed, the degree of dullness of the slope of the P1 phase due to the influence of the LPF 41 becomes large. Therefore, it is useful to perform the stable offset on the nonlinear reference signal.

<Application to Vertical Column Type Image Sensor>

The above-described DA converter 22 can also be applied to a vertical column type image sensor.

Figure 21:
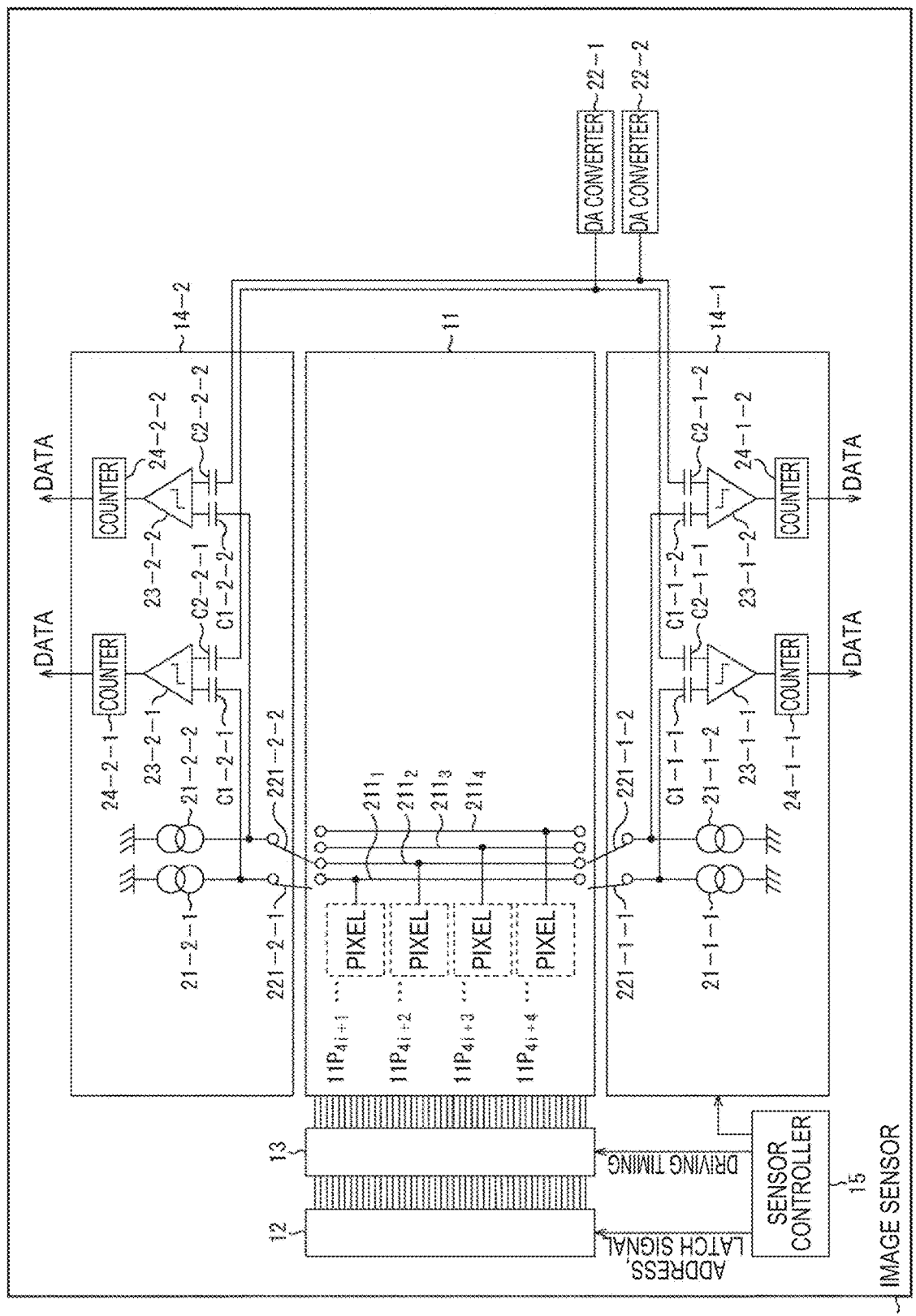
FIG. 21 is a block diagram illustrating an application example of a vertical column type image sensor.

FIG. 21 illustrates a configuration example of a vertical column type image sensor to which the DA converter 22 is applied. In the case of the configuration example, two DA converters 22-1 and 22-2 are adopted. For example, when the value of Ramp Stables described above is set to different values between the DA converter 22-1 and the DA converter 22-2, it is possible to obtain a noise reduction effect.

That is, FIG. 21 is a diagram showing a configuration example of another embodiment of the image sensor to which the present technology is applied.

In the figure, parts corresponding to those in FIG. 6 are denoted by the same reference numerals, and hereinafter, description thereof will be omitted as appropriate.

In FIG. 21, the image sensor 50 has a pixel array unit 11, an address decoder 12, a pixel timing driving unit 13, AD conversion units 14-1 and 14-2, a sensor controller 15, and DA converters 22-1 and 22-2.

Therefore, the image sensor 50 is common to the image sensor 10 of FIG. 6 in that the image sensor 50 has the pixel array unit 11, the address decoder 12, the pixel timing driving unit 13, and the sensor controller 15.

However, the image sensor 50 is different from the image sensor 10 in that the image sensor 50 has the AD conversion units 14-1 and 14-2 instead of the AD conversion unit 14 and has the DA converters 22-1 and 22-2 instead of the DA converter 22.

In addition, the image sensor 50 has a plurality of, for example, four vertical signal lines $211_1$, $211_2$, $211_3$, and $211_4$ with respect to one column of the pixels 11P configuring the pixel array unit 11. In the pixel array unit 11, a pixel $11P_{4i+1}$ that is a pixel 11P of a 4i+1th row (i=0, 1, ...) is connected to the vertical signal line $211_1$ and a pixel $11P_{4i+2}$ that is a pixel 11P of a 4i+2th row is connected to the vertical signal line $211_2$. In addition, a pixel $11P_{4i+3}$ that is a pixel 11P of a 4i+3th row is connected to the vertical signal line $211_3$ and a pixel $11P_{4i+4}$ that is a pixel 11P of a 4i+4th row is connected to the vertical signal line $211_4$.

The AD conversion unit 14-1 has constant current circuits 21-1-1 and 21-1-2, comparators 23-1-1 and 23-1-2, counters 24-1-1 and 24-1-2, condensers C1-1-1 and C2-1-1, condensers C1-1-2 and C2-1-2, and switches 221-1-1 and 221-1-2 for each one column of the pixels 11P configuring the pixel array unit 11.

In the AD conversion unit 14-1, the constant current circuit 21-1-1, the comparator 23-1-1, the counter 24-1-1, and the condensers C1-1-1 and C2-1-1 are correspond to the constant current circuit 21, the comparator 23, the counter 24, and the condensers C1 and C2 of the AD conversion unit 14 (FIG. 10), respectively. Similarly, the constant current circuit 21-1-2, the comparator 23-1-2, the counter 24-1-2, and the condensers C1-1-2 and C2-1-2 correspond to the constant current circuit 21, the comparator 23, the counter 24, and the condensers C1 and C2 of the AD conversion unit 14, respectively.

Therefore, the AD conversion unit 14-1 has two systems of a configuration similar to the constant current circuit 21, the comparator 23, the counter 24, and the condenser C1 and C2 of the AD conversion unit 14, and the AD conversion unit 14-1 is able to perform the AD conversion performed by the AD conversion unit 14 simultaneously by the two systems.

The switch 221-1-1 selects one of the four vertical signal lines $211_1$ to $211_4$ and supplies a VSL voltage as an electric signal output from a pixel $11_{P4+j}$ on the selected vertical signal line $211_j$ to the comparator 23-1-1.

Similarly, the switch 221-1-2 selects one of the four vertical signal lines $211_1$ to $211_4$ and supplies a VSL voltage as an electric signal output from a pixel $11_{P4+Fj}$ on the selected vertical signal line $211_j$ to the comparator 23-1-2.

The AD conversion unit 14-2 has constant current circuits 21-2-1 and 21-2-2, comparators 23-2-1 and 23-2-2, counters 24-2-1 and 24-2-2, condensers C1-2-1 and C2-2-1, condensers C1-2-2 and C2-2-2, and switches 221-2-1 and 221-2-2 for each one column of the pixels 11P configuring the pixel array unit 11.

In the AD conversion unit 14-2, the constant current circuits 21-2-1 and 21-2-2, the comparators 23-2-1 and 23-2-2, the counters 24-2-1 and 24-2-2, the condensers C1-2-1 and C2-2-1, the condensers C1-2-2 and C2-2-2, and the switches 221-2-1 and 221-2-2 correspond to the constant current circuits 21-1-1 and 21-1-2, the comparators 23-1-1 and 23-1-2, the counters 24-1-1 and 24-1-2, the condensers C1-1-1 and C2-1-1, the condensers C1-1-2 and C2-1-2, and the switches 221-1-1 and 221-1-2 of the AD conversion unit 14-1, respectively.

Therefore, since the AD conversion unit 14-2 is configured similarly to the AD conversion unit 14-1, hereinafter, description thereof will be omitted.

The image sensor 50 has the DA converters 22-1 and 22-2 instead of the DA converter 22 of the image sensor 10 of FIG. 6. The DA converters 22-1 and 22-2 are configured similarly to the DA converter 22, and output the reference signal. The reference signals output from the DA converters 22-1 and 22-2 are both supplied to both of the AD conversion units 14-1 and 14-2.

In the AD conversion unit 14-1, the reference signal output from the DA converter 22-1 is supplied to the comparator 23-1-1, and the reference signal output from the DA converter 22-2 is supplied to the comparator 23-1-2.

Therefore, the AD conversion unit 14-1 is able to perform the AD conversion of the VSL voltage supplied from the switch 221-1-1 using the reference signal output from the DA converter 22-1 in the constant current circuit 21-1-1, the comparator 23-1-1, the counter 24-1-1, and the condensers C1-1-1 and C2-1-1 (hereinafter, also referred to as a first AD conversion system).

Furthermore, the AD conversion unit 14-1, simultaneously, is able to perform the AD conversion of the VSL voltage supplied from the switch 221-1-2 using the reference signal output from the DA converter 22-1 in the constant current circuit 21-1-2, the comparator 23-1-2, the counter 24-1-2, and the condensers C1-1-2 and C2-1-2 (hereinafter, also referred to as a second AD conversion system).

For example, now, the switches 221-1-1 and 221-1-2 select the same vertical signal line $211_j$, and it is possible to obtain a pixel value with reduced noise by performing the AD conversions by each of the first and second AD conversion systems on the VSL voltage as the electric signals output from the same pixel $11P_{4i+j}$ on the vertical signal line $211_j$.

That is, the DA converters 22-1 and 22-2 generates the reference signal so that an offset is provided between the reference signal output from the DA converter 22-1 and the reference signal output from the DA converter 22-2.

As a result, in the first AD conversion system to which the reference signal output from the DA converter 22-1 is supplied and the second AD conversion system to which the reference signal output from the DA converter 22-2 is supplied, a timing at which the magnitude relationship between the VSL voltage and the reference signal is inverted with respect to the same VSL voltage is shifted according to the offset and values at different time points of the VSL voltage are so-called sampled as the AD conversion result.

As described above, in the first AD conversion system and the second AD conversion system, the values at the different time points of the same VSL voltage are sampled. Therefore, it is possible to suppress noise included in the sampled values by adding the sampled values.

Here, in a case in which the constant current circuit 21, the comparator 23, the counter 24, and the condensers C1 and C2 of the AD conversion unit 14 (FIG. 10) is referred to as an AD conversion unit, the image sensor 50 has two AD conversion units on an upper side and a lower side of one column of the pixels 11P, respectively.

As described above, an image sensor having a plurality of AD conversion units on at least one of the top or bottom of one column is referred to as a column type (image sensor).

<Method of Correcting Nonlinear Data>

An output from the AD conversion unit 14 of the image sensor 10 according to the embodiment is nonlinear data. In order to use the nonlinear data as image data, it is necessary to correct the nonlinear data to linear data.

Figure 22:
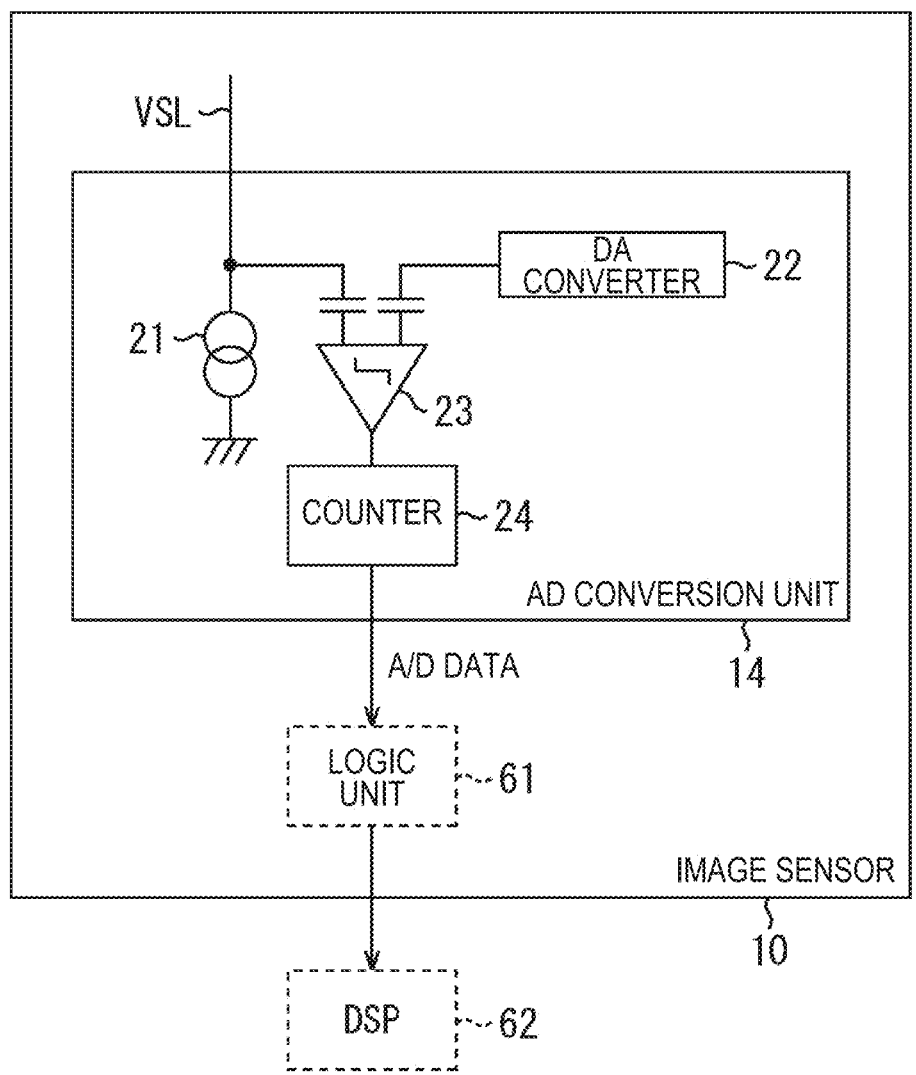
FIG. 22 is a block diagram illustrating a disposition example of a correction unit that corrects an output of the AD conversion unit.

FIG. 22 illustrates a disposition example of a correction unit that corrects an output (nonlinear data) from the AD conversion unit 14 to linear data.

As shown in the figure, as the correction unit, a logic unit 61 is able to be provided in the image sensor 10 at the subsequent stage of the AD conversion unit 14, or a digital signal processor (DSP) 62 is able to be provided outside the image sensor 10.

Figure 23:
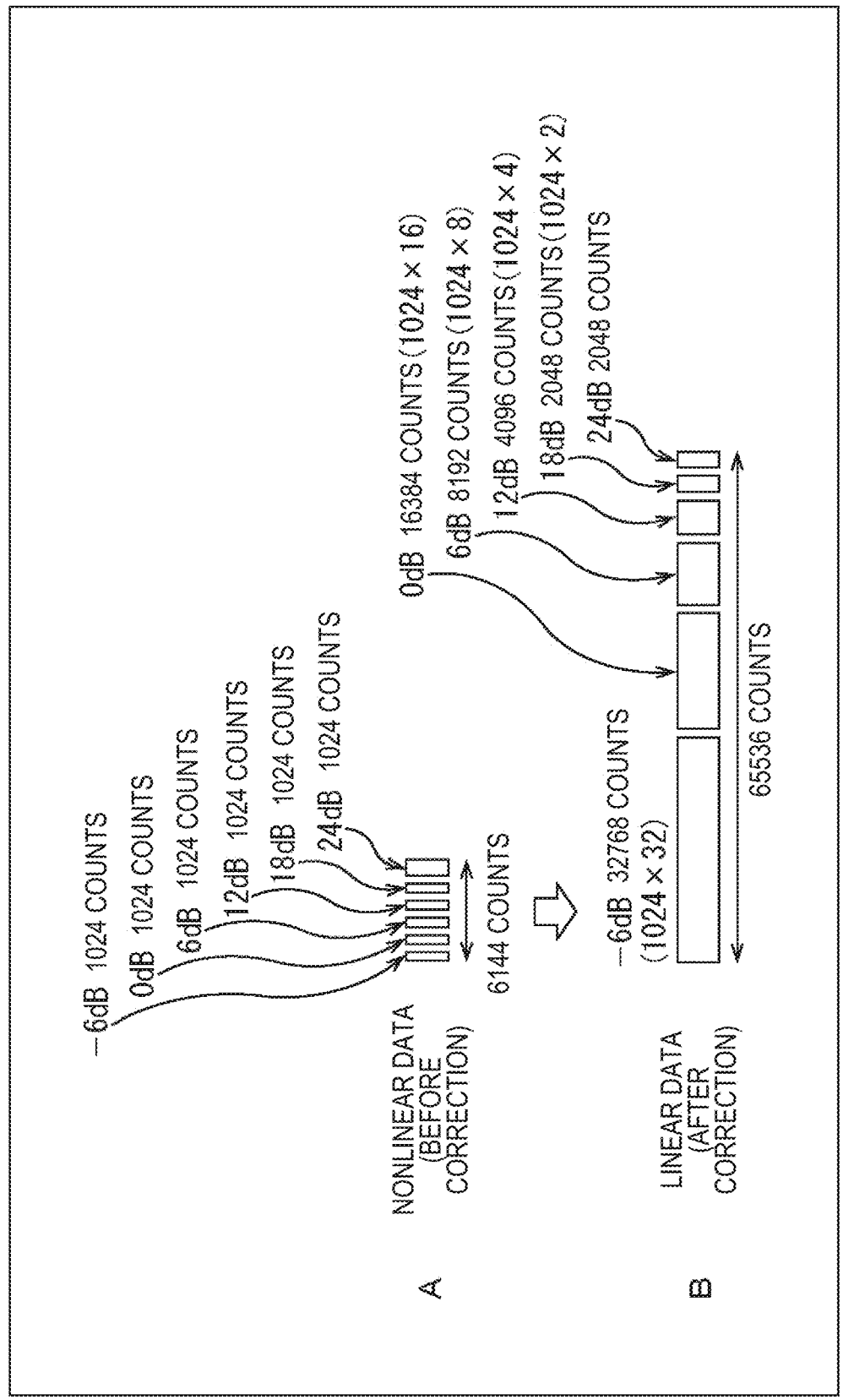
FIG. 23 is a diagram illustrating a form of correction of nonlinear data into linear data.

FIG. 23 shows an aspect in which the correction unit (the logic unit 61 or the DSP 62) corrects nonlinear data to linear data.

In a case in which the nonlinear data is 6144 counts (1024 counts of −6 dB, 1024 counts of 0 dB, 1024 counts of 6 dB, 1024 counts of 12 dB, 1024 counts of 18 dB, 2048 counts of 24 dB) and the respective counts are multiplied by 32, 16, 8, 4, 2, and 1, linear data of 65536 counts can be obtained.

That is, FIG. 23 is a diagram showing an example of a method of correcting (converting) the nonlinear data as the AD conversion result obtained by the AD conversion using the nonlinear reference signal to the linear data similar to the AD conversion result obtained by the AD conversion using the linear reference signal, in the AD conversion unit 14.

A of FIG. 23 shows the nonlinear data as the AD conversion result obtained in a case in which the AD conversion of the DDS driving (of the P phase) is performed using the nonlinear reference signal of FIG. 3.

With respect to the nonlinear reference signal of FIG. 3, the reference signals of the P1 phase, the P2 phase, the P3 phase, the P4 phase, the P5 phase, and the P6 phase include a reference signal of −6 dB, a reference signal of 0 dB, a reference signal of 6 dB, a reference signal of 12 dB, a reference signal of 18 dB, and a reference signal of 24 dB, respectively.

In addition, the P1 phase, the P2 phase, the P3 phase, the P4 phase, the P5 phase, and the P6 phase include a period of 1024 counts from the beginning, a period of the next 1024 counts, a period of the next 1024 counts, a period of the next 1024 counts, a period of the next 1024 counts, and a period of the last 2048 counts, respectively.

Therefore, in the P phase of the DDS driving, a maximum of 1024 counts is performed on the reference signal of −6 dB in the P1 phase, a maximum of 1024 counts is performed on the reference signal of 0 dB in the P2 phase, a maximum of 1024 counts is performed on the reference signal of 6 dB in the P3 phase, a maximum of 1024 counts is performed on the reference signal of 12 dB in the P4 phase, a maximum of 1024 counts is performed on the reference signal of 18 dB in the P5 phase, and a maximum of 2048 counts is performed on the reference signal of 24 dB in the P6 phase, respectively.

Therefore, in the P phase of the DDS driving, at most 6144 counts are able to be performed.

B of FIG. 23 shows the linear data obtained by correcting the nonlinear data as the AD conversion result of A of FIG. 23.

In B of FIG. 23, the count value of the nonlinear data is corrected to the count value of the linear data by converting the respective count values of the P1 phase to the P6 phase configuring the P phase of the DDS driving to the count value for the reference signal of 24 dB of which the gain is the largest among the reference signals of the P1 phase to the P6 phase.

In the conversion to the count value for the reference signal of 24 dB, the count value for the reference signal of −6 dB of the P1 phase is 32 times ($\approx$24 dB−(−6 dB)), and the count value for the reference signal of 0 dB of the P2 phase is 16 times ($\approx$24 dB−0 dB). In addition, the count value for the reference signal of 6 dB of the P3 phase is 8 times ($\approx$24 dB−6 dB)), and the count value for the reference signal of 12 dB of the P4 phase is 4 times ($\approx$24 dB−12 dB). Furthermore, the count value for the reference signal of 18 dB of the P5 phase is 2 times ($\approx$24 dB−18 dB)), and the count value for the reference signal of 24 dB of the P6 phase is as it is.

Therefore, in the linear data, the count value for the reference signal of −6 dB of the P1 phase is 32768=1024×32 counts at the maximum, and the count value for the reference signal of 0 dB of the P2 phase is 16384=1024×16 counts at the maximum. Furthermore, the count value for the reference signal of 6 dB of the P3 phase is 8192=1024×8 counts at the maximum, and the count value for the reference signal of 12 dB of the P4 phase is 4096=1024×4 counts at the maximum. In addition, the count value for the reference signal of 18 dB of the P5 phase is 2048=1024×2 counts at the maximum, and the count value for the reference signal of 24 dB of the P6 phase is 2048 counts at the maximum.

Therefore, the linear data has a maximum of 65536=32768+16384+8192+4096+2048+2048 counts.

As described above, the nonlinear data is corrected (converted) to linear data by converting the count value obtained in the P1 phase to the P6 phase into the count value for the reference signal of 24 dB and adding the count value.

Since the linear data as described above has been converted to the count value for the reference signal of 24 dB, the linear data becomes a so-called fine only 24 dB fine granularity value as compared with the count value for the reference signal of 0 dB.

As a result, the Con Res. in a case in which the nonlinear reference signal is used is able to enhance the Con Res. in a case in which the linear reference signal of 0 dB is used by 24 dB ($\approx$16 times). That is, it is possible to enhance the Con Res. of 5.85% as described with reference to FIG. 1 to 0.36%$\approx$5.85%/16.

Note that, the linear data obtained as described above is data to which a gain of 24 dB is applied, is 16 times ($\approx$47 dB−24 dB) so as to be data to which a gain of (about) 240 times (47 dB) that is the ratio of the light receiving sensitivities of the SP1 and the SP2 is applied, and is used as the digital code of the SP2 as described with reference to FIG. 1.

First Modification Example

In the above description, the nonlinear ramp wave is output by switching the gain from the DA converter 22 of the AD conversion unit 14. In a first modification example, a linear ramp wave can be output from the DA converter 22 by causing a gain to be constant, and nonlinear AD conversion can be performed by causing a driving frequency of the counter 24 to be variable.

Figure 24:
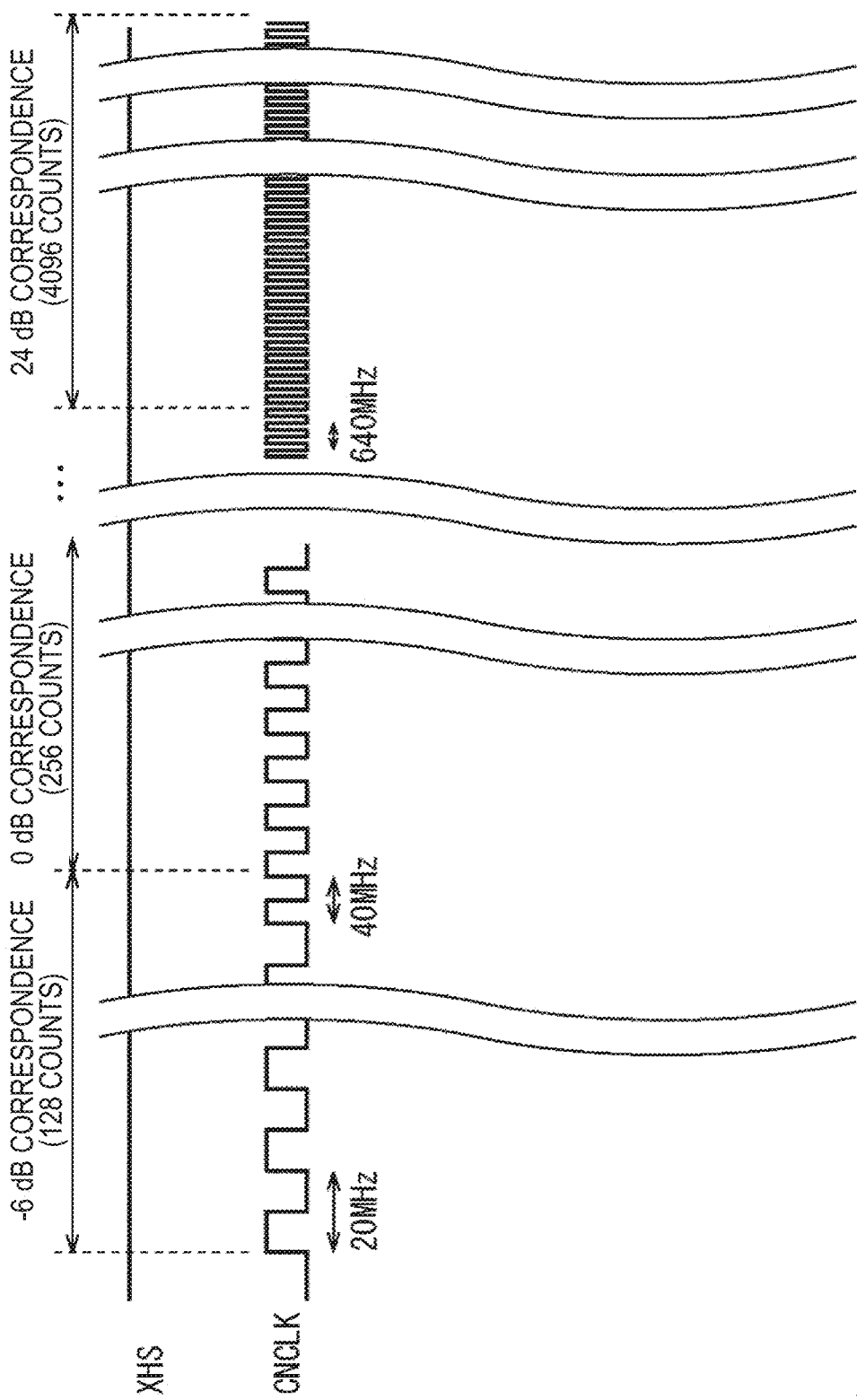
FIG. 24 is a diagram illustrating a change in a driving frequency of a counter according to a first modification example.
Figure 25:
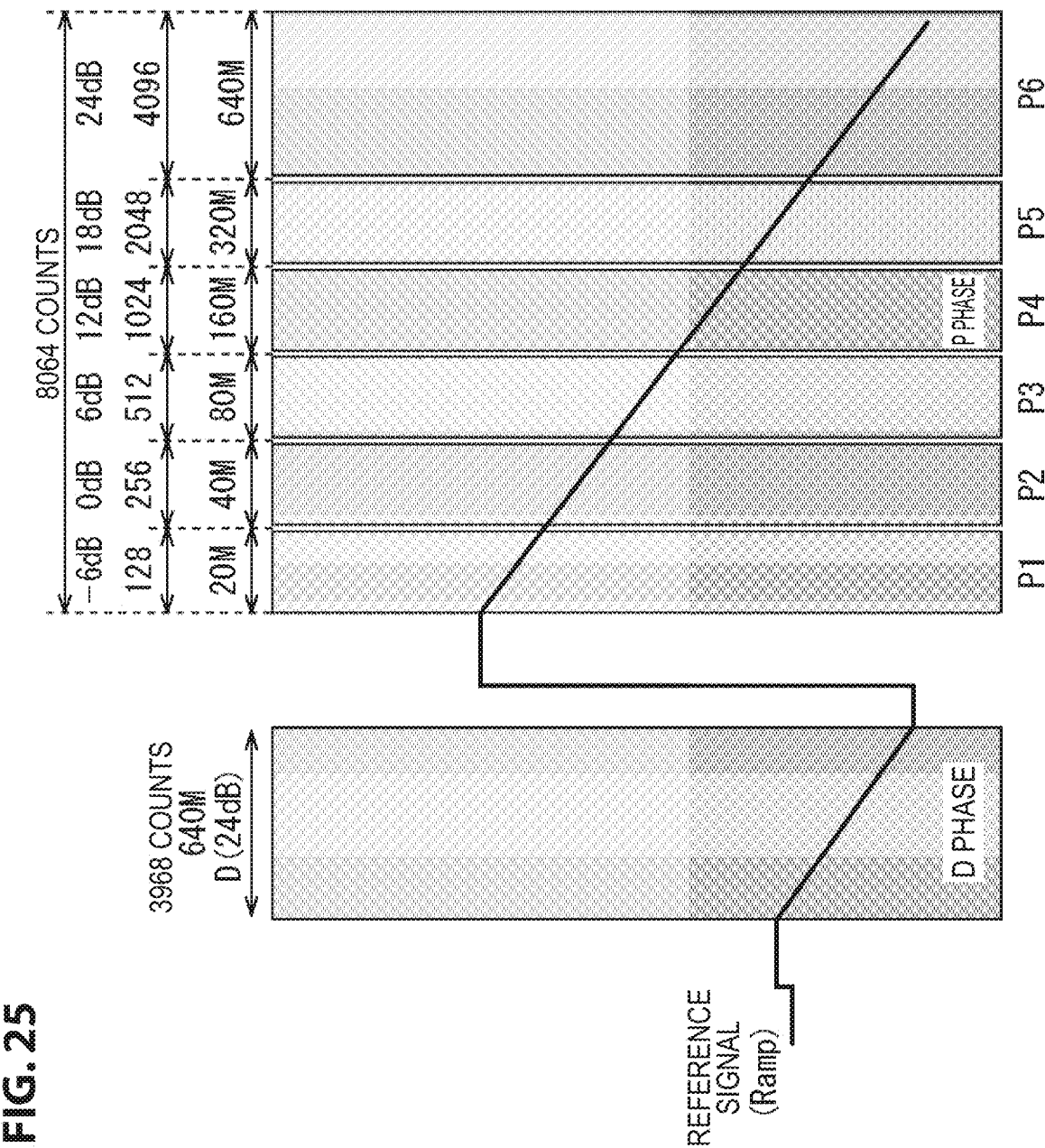
FIG. 25 is a diagram illustrating a ramp waveform according to the first modification example.

FIG. 24 illustrates a change in a driving frequency of the counter 24 according to the first modification example. FIG. 25 illustrates a ramp wave according to the first modification example.

As illustrated in FIG. 24, when a driving frequency of the counter 24 is set to 20 MHz for a period equivalent to −6 dB, is set to 40 MHz for a period equivalent to 0 dB, is set to 80 MHz for a period equivalent to 6 dB, is set to 160 MHz for a period equivalent to 12 dB, is set to 320 MHz for a period equivalent to 18 dB, and is set to 640 MHz for a period equivalent to 24 dB, the nonlinear AD conversion as the case of the nonlinear ramp wave output from the DA converter 22 can be performed.

That is, FIG. 24 is a diagram for explaining a second AD conversion method of nonlinearly AD converting the VSL voltage.

In the reference signal comparison type AD conversion, as a method of nonlinearly AD converting the VSL voltage, that is, a method of AD converting the VSL voltage with a nonlinear quantization width, there is a second AD conversion method using the linearly reference signal in addition to the first AD conversion method using the nonlinear reference signal as described with reference to FIG. 3.

In the second AD conversion method, the linear reference signal is used, but the frequency of the clock CNCLK used (synchronized) when the counter 24 counts the count value is changed.

Therefore, in the second AD conversion method, the counter 24 counts the count value according to (in synchronization with) the clock CNCLK of which the frequency changes.

FIG. 24 shows an aspect in which the frequency of the clock CNCLK is gradually increased in the P phase of the DDS driving.

FIG. 25 is a diagram showing an example of the reference signal in a case in which the VSL voltage is nonlinearly AD converted by the second AD conversion method and the frequency of the clock CNCLK.

In the second AD conversion method, the linear reference signal is used as the reference signal.

The reference signal of FIG. 25 is a reference signal used for the DDS driving (of the D phase and the P phase) in the second AD conversion method, and is, for example, a linear reference signal similar to the reference signal of FIG. 2.

In the second AD conversion method, the frequency of the clock CNCLK of the counter 24 changes for each sub period (P #i phase) configuring the P phase.

In FIG. 25, the frequency of the clock CNCLK in the D phase of the DDS driving is 640 MHz.

Now, for example, in a case in which it is assumed that a gain of the AD conversion of a case in which the count of the count value at a clock CNCLK of 40 MHz is performed is 0 dB, the gain of the AD conversion of a case in which the count of the count value at a clock CNCLK of 640 MHz is performed is 24 dB (≈640/40 times).

In FIG. 25, the frequencies of the clocks CNCLK of the P1 phase to the P6 phase configuring the P phase of the DDS driving are 20 MHz, 40 MHz, 80 MHz, 160 MHz, 320 MHz, and 640 MHz, respectively.

By changing the frequency of the clock CNCLK as described above, it is possible to perform the nonlinear AD conversion similar to a case in which the nonlinear reference signal of FIG. 3 is used.

Note that, in FIG. 25, the P1 phase to the P6 phase include a sub period of 128 counts, a sub period of 256 counts, a sub period of 512 counts, a sub period of 1024 counts, a sub period of 2048 counts, and a sub period of 4096 counts, respectively.

In addition, the gains of the AD conversion of the P1 phase to the P6 phase are −6 dB, 0 dB, 6 dB, 12 dB, 18 dB, and 24 dB, respectively.

Furthermore, in FIG. 25, since the count value of the P phase of the DDS driving is 8064 (=128+256+512+1024+2048+4096) counts at the maximum, as described with reference to FIG. 1, in a case in which an AD conversion of 12 bits is performed, the D phase of the DDS driving becomes a period of 3968 (=8094−4096 (12 bits)) counts.

Second Modification Example

In the above description, the nonlinear ramp wave is output by switching the gain from the DA converter 22 of the AD conversion unit 14. In a second modification example, a nonlinear ramp wave can be output from the DA converter 22 by causing a gain of the DA converter 22 to be constant and causing a driving frequency of the DA converter 22 to be variable.

Figure 26:
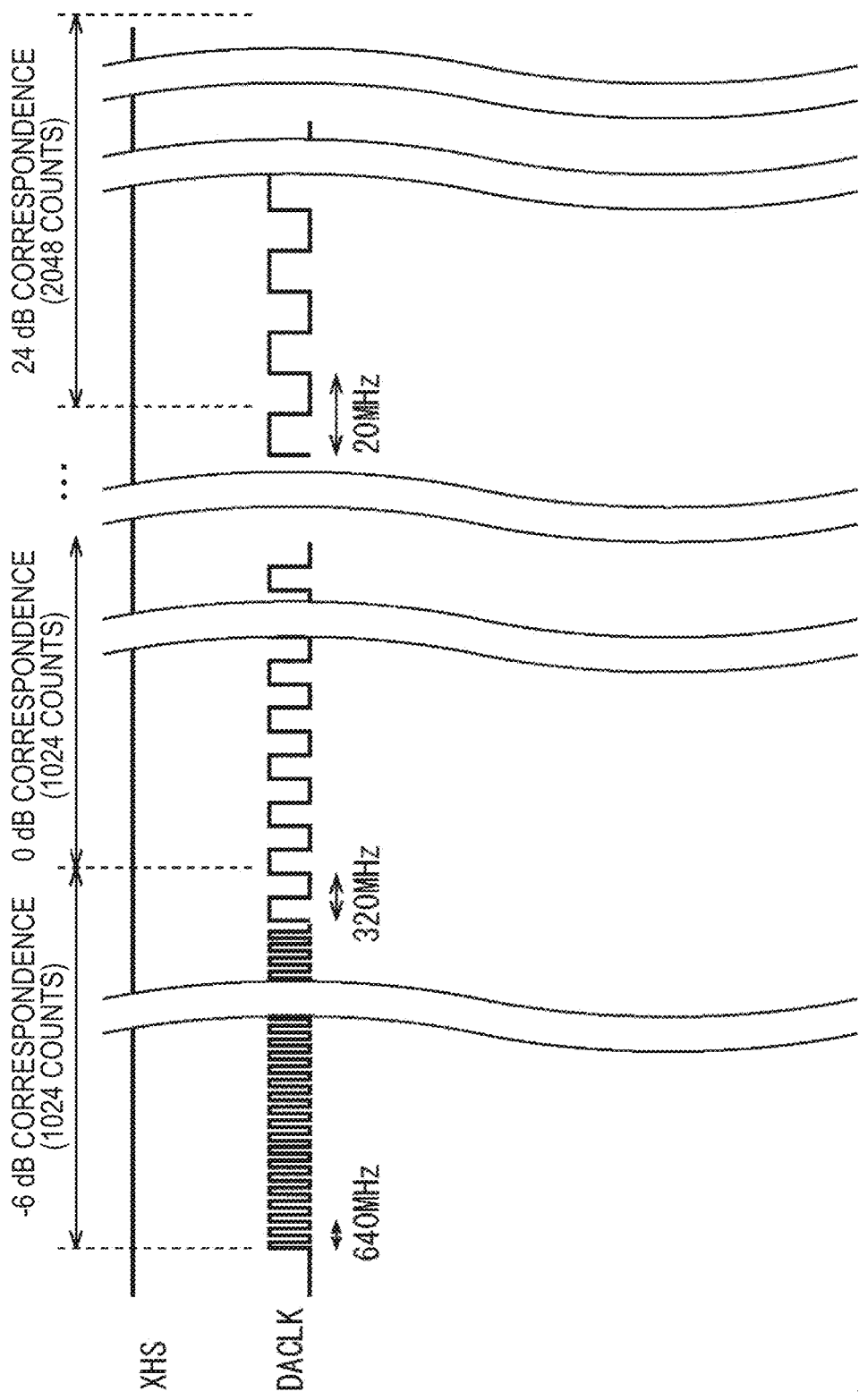
FIG. 26 is a diagram illustrating a change in a driving frequency of the DA converter according to a second modification example.
Figure 27:
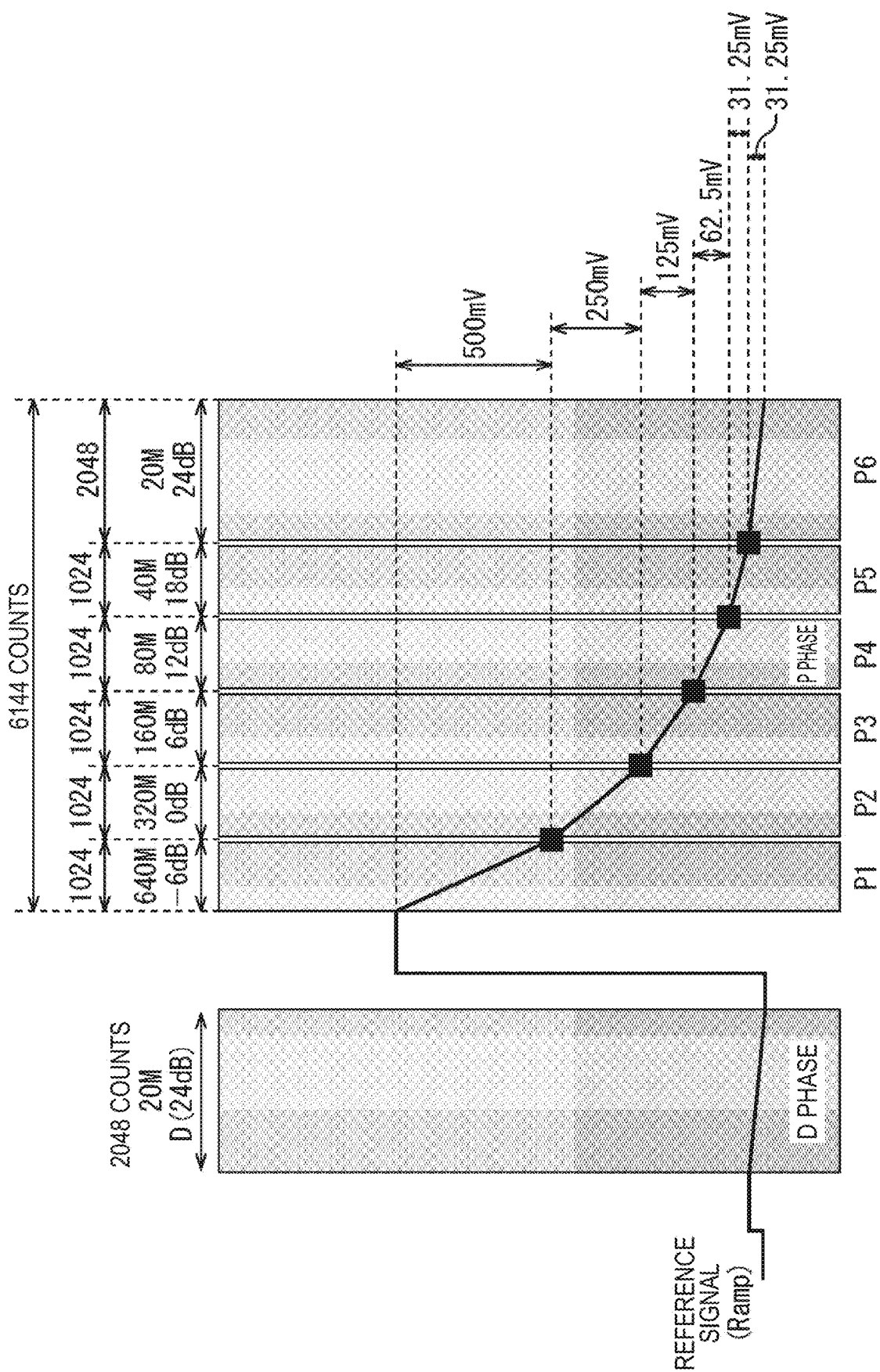
FIG. 27 is a diagram illustrating a ramp waveform according to a second modification example.

FIG. 26 illustrates a change in a driving frequency of the DA converter 22 according to the second modification example. FIG. 27 illustrates a ramp wave according to the second modification example.

As illustrated in FIG. 26, a driving frequency of the DA converter 22 is set to 640 MHz for a period equivalent to −6 dB, is set to 320 MHz for a period equivalent to 0 dB, is set to 160 MHz for a period equivalent to 6 dB, is set to 80 MHz for a period equivalent to 12 dB, is set to 40 MHz for a period equivalent to 18 dB, and is set to 20 MHz for a period equivalent to 24 dB. Thus, as illustrated in FIG. 27, the same nonlinear ramp wave as the case of the switching of the gain can be output from the DA converter 22.

That is, FIG. 26 is a diagram for explaining a second generation method of generating the nonlinear reference signal used in the first AD conversion method.

As a method of generating the nonlinear reference signal used in the first AD conversion method, there is a second generation method of generating the nonlinear reference signal by changing the frequency of the clock DACLK for driving the DA converter 22 in addition to the first generation method of generating the nonlinear reference signal by changing the unit current flowing through the FET 174-*n* as the switch 156 in the ramp DAC 34 as described with referenced to FIGS. 12 to 15.

FIG. 26 shows an aspect in which the frequency of the clock DACLK of the DA converter 22 is gradually decreased in the P phase of the DDS driving.

Here, the clock CLK supplied to the DFF 181-*n* of FIG. 13 corresponds to the clock DACLK.

FIG. 27 is a diagram showing an example of the nonlinear reference signal generated by the second generation method and the frequency of the clock DACLK.

In the second generation method, the frequency of the clock DACLK of the DA converter 22 changes for each sub period (P #i phase) configuring the P phase.

In FIG. 27, the frequency of the clock DACLK in the D phase of the DDS driving is 20 MHz.

Now, for example, in a case in which it is assumed that a gain of the AD conversion of a case in which the DA converter 22 is operated at a clock DACLK of 320 MHz is 0 dB, the gain of the AD conversion of a case in which the count of the count value is performed at a clock DACLK of 20 MHz is 24 dB (≈320/20 times).

In FIG. 27, the frequencies of the clocks DACLK of the P1 phase to the P6 phase configuring the P phase of the DDS driving are 640 MHz, 320 MHz, 160 MHz, 80 MHz, 40 MHz, and 20 MHz, respectively.

By changing the frequency of the clock DACLK as described above, it is possible to generate the nonlinear reference signal that nonlinearly changes similarly to a case of the nonlinear reference signal of FIG. 3.

In FIG. 27, the P1 phase to the P6 phase include a sub period of 1024 counts, a sub period of 1024 counts, a sub period of 1024 counts, a sub period of 1024 counts, a sub period of 1024 counts, and a sub period of 2048 counts, respectively, similarly to a case of FIG. 3. Furthermore, the D phase includes a period of 2048 counts also similarly to a case of FIG. 3.

In addition, the gains of the AD conversion of the P1 phase to the P6 phase are −6 dB, 0 dB, 6 dB, 12 dB, 18 dB, and 24 dB, respectively.

Application Examples

In the embodiment, the SP1 and the SP2 with the different sizes are included in one pixel cell and a wide dynamic range of a pixel value is achieved by combining outputs of the SP1 and the SP2 are combined. Technologies for causing a pixel value to have a wide dynamic range through multi-line exposure (MLE) are also known.

Even in MLE, since pixel values are generally combined by multiplying an exposure ratio gain of a factor of 16 to 24, there is concern of a stepped difference occurring in joints when the pixel values are combined. Therefore, the DA converter 22 to which an embodiment of the present technology is applied can also have an advantage even in the case of MLE.

That is, as a wide dynamic range (WD) technology, there is the MLE in addition to the above-described technology of combining the outputs of the SP1 and the SP2 as a plurality of PDs having different light receiving sensitivities.

In the MLE, imaging is performed by applying a different exposure time, for example, a long exposure time, a medium exposure time, or a short exposure time to pixels of each (horizontal) line. In addition, a long accumulated image Long including lines of pixels to which the long exposure time is applied, a medium accumulated image Middle including lines of pixels to which the medium exposure time is applied, a short accumulated image Short including lines of pixels to which the short exposure time is applied, which are obtained as a result of the imaging, are combined, for example, similarly to a case in which the outputs of the SP1 and the SP2 are combined, and the combined image with the wide dynamic range is generated.

That is, in combining the long accumulated image Long, the medium accumulated image Middle, and the short accumulated image Short, with respect to a pixel in which the long accumulated image Long is not saturated, a pixel value of the long accumulated image Long is selected as the pixel value of the combined pixel. In addition, with respect to a pixel in which the long accumulated image Long is saturated but the medium accumulated image Middle is not saturated, a pixel value of the medium accumulated image Middle is selected as the pixel value of the combined pixel. Furthermore, with respect to a pixel in which the long accumulated image Long and the medium accumulated image Middle are saturated, a pixel value of the accumulated image Short is selected as the pixel value of the combined pixel.

In combining the long accumulated image Long, the medium accumulated image Middle, and the short accumulated image Short, a gain (exposure ratio gain), for example, about 16 to 24 times is multiplied to the pixel value of the medium accumulated image Middle, according to the exposure time of the medium accumulated image Middle for the exposure time of the long accumulated image Long. The same applies to the short accumulated image Short.

Therefore, in the combined image, there is a concern that a large step difference of a pixel value occurs between a pixel in which a pixel value of any image among the long accumulated image Long, the medium accumulated image Middle, and the short accumulated image Short is selected and a pixel in which a pixel value of another image is selected.

Therefore, it is possible to suppress the occurrence of the large step difference of the pixel value as described above and enhance the gray scale of the combined image, by adopting the nonlinear AD conversion to the AD conversion of (the VSL voltage to be the pixel value of) the medium accumulated image Middle or the short accumulated image Short.

Note that, in the MLE, in a case in which the AD conversions of two images among the long accumulated image Long, the medium accumulated image Middle, and the short accumulated image Short are performed at the same time, two DA converters that generate the reference signal may be required in each of the AD conversions of the two images. In addition, in a case in which the AD conversions of three images among the long accumulated image Long, the medium accumulated image Middle, and the short accumulated image Shor+ are performed at the same time, three DA converters that generate the reference signal may be required in each of the AD conversions of the three images.

<Application Example to In-Vivo Information Acquisition System>

The present disclosure technology (this technology) can be applied to various products. For example, the present disclosure technology may be applied to the endoscopic surgery system.

Figure 28:
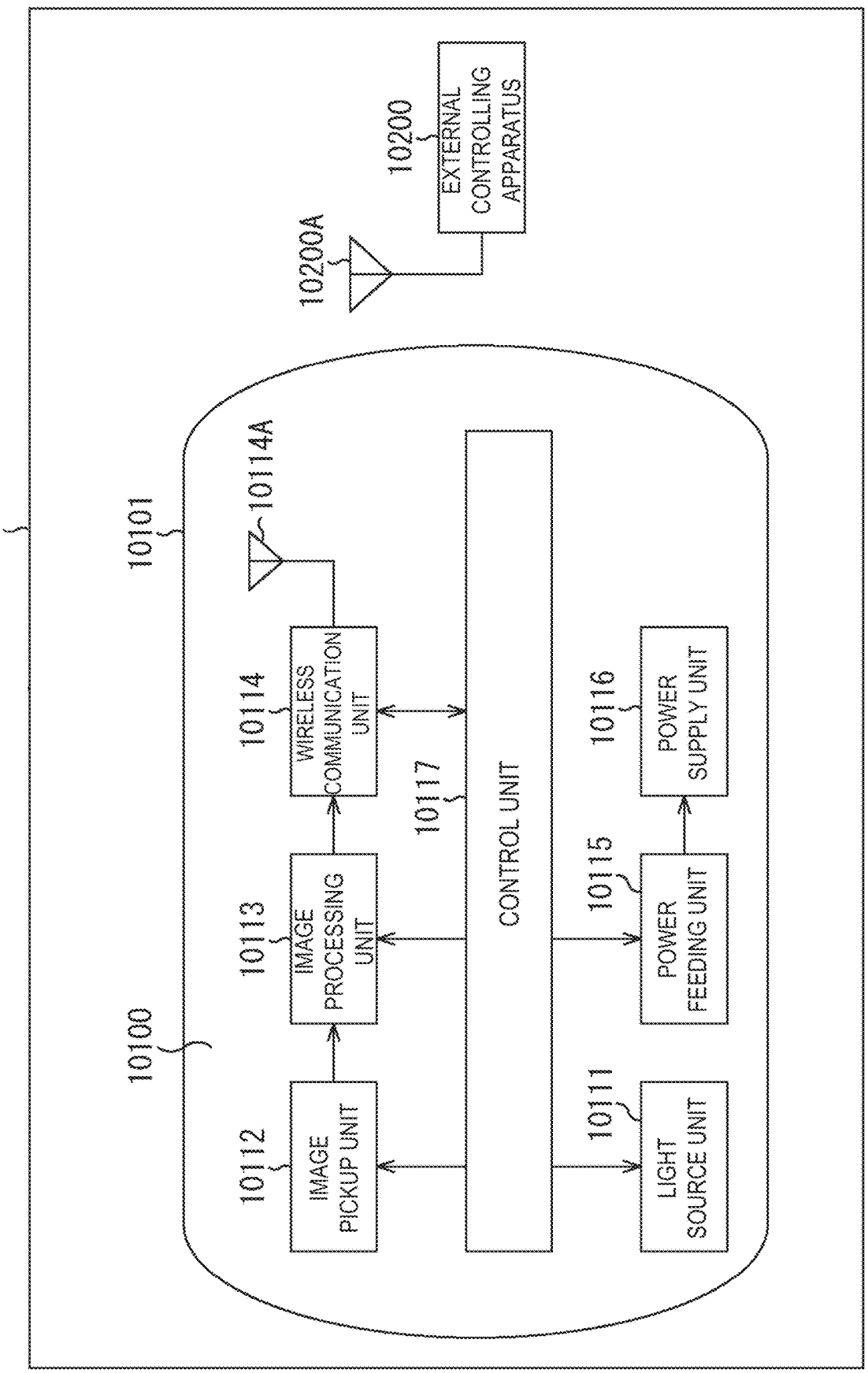
FIG. 28 is a block diagram depicting an example of a schematic configuration of an in-vivo information acquisition system.

FIG. 28 is a block diagram depicting an example of a schematic configuration of an in-vivo information acquisition system of a patient using a capsule type endoscope, to which the technology according to an embodiment of the present disclosure (present technology) can be applied.

The in-vivo information acquisition system 10001 includes a capsule type endoscope 10100 and an external controlling apparatus 10200.

The capsule type endoscope 10100 is swallowed by a patient at the time of inspection. The capsule type endoscope 10100 has an image pickup function and a wireless communication function and successively picks up an image of the inside of an organ such as the stomach or an intestine (hereinafter referred to as in-vivo image) at predetermined intervals while it moves inside of the organ by peristaltic motion for a period of time until it is naturally discharged from the patient. Then, the capsule type endoscope 10100 successively transmits information of the in-vivo image to the external controlling apparatus 10200 outside the body by wireless transmission.

The external controlling apparatus 10200 integrally controls operation of the in-vivo information acquisition system 10001. Further, the external controlling apparatus 10200 receives information of an in-vivo image transmitted thereto from the capsule type endoscope 10100 and generates image data for displaying the in-vivo image on a display apparatus (not depicted) on the basis of the received information of the in-vivo image.

In the in-vivo information acquisition system 10001, an in-vivo image imaged a state of the inside of the body of a patient can be acquired at any time in this manner for a period of time until the capsule type endoscope 10100 is discharged after it is swallowed.

A configuration and functions of the capsule type endoscope 10100 and the external controlling apparatus 10200 are described in more detail below.

The capsule type endoscope 10100 includes a housing 10101 of the capsule type, in which a light source unit 10111, an image pickup unit 10112, an image processing unit 10113, a wireless communication unit 10114, a power feeding unit 10115, a power supply unit 10116 and a control unit 10117 are accommodated.

The light source unit 10111 includes a light source such as, for example, a light emitting diode (LED) and irradiates light on an image pickup field-of-view of the image pickup unit 10112.

The image pickup unit 10112 includes an image pickup element and an optical system including a plurality of lenses provided at a preceding stage to the image pickup element. Reflected light (hereinafter referred to as observation light) of light irradiated on a body tissue which is an observation target is condensed by the optical system and introduced into the image pickup element. In the image pickup unit 10112, the incident observation light is photoelectrically converted by the image pickup element, by which an image signal corresponding to the observation light is generated. The image signal generated by the image pickup unit 10112 is provided to the image processing unit 10113.

The image processing unit 10113 includes a processor such as a central processing unit (CPU) or a graphics processing unit (GPU) and performs various signal processes for an image signal generated by the image pickup unit 10112. The image processing unit 10113 provides the image signal for which the signal processes have been performed thereby as RAW data to the wireless communication unit 10114.

The wireless communication unit 10114 performs a predetermined process such as a modulation process for the image signal for which the signal processes have been performed by the image processing unit 10113 and transmits the resulting image signal to the external controlling apparatus 10200 through an antenna 10114A. Further, the wireless communication unit 10114 receives a control signal relating to driving control of the capsule type endoscope 10100 from the external controlling apparatus 10200 through the antenna 10114A. The wireless communication unit 10114 provides the control signal received from the external controlling apparatus 10200 to the control unit 10117.

The power feeding unit 10115 includes an antenna coil for power reception, a power regeneration circuit for regenerating electric power from current generated in the antenna coil, a voltage booster circuit and so forth. The power feeding unit 10115 generates electric power using the principle of non-contact charging.

The power supply unit 10116 includes a secondary battery and stores electric power generated by the power feeding unit 10115. In FIG. 28, in order to avoid complicated illustration, an arrow mark indicative of a supply destination of electric power from the power supply unit 10116 and so forth are omitted. However, electric power stored in the power supply unit 10116 is supplied to and can be used to drive the light source unit 10111, the image pickup unit 10112, the image processing unit 10113, the wireless communication unit 10114 and the control unit 10117.

The control unit 10117 includes a processor such as a CPU and suitably controls driving of the light source unit 10111, the image pickup unit 10112, the image processing unit 10113, the wireless communication unit 10114 and the power feeding unit 10115 in accordance with a control signal transmitted thereto from the external controlling apparatus 10200.

The external controlling apparatus 10200 includes a processor such as a CPU or a GPU, a microcomputer, a control board or the like in which a processor and a storage element such as a memory are mixedly incorporated. The external controlling apparatus 10200 transmits a control signal to the control unit 10117 of the capsule type endoscope 10100 through an antenna 10200A to control operation of the capsule type endoscope 10100. In the capsule type endoscope 10100, an irradiation condition of light upon an observation target of the light source unit 10111 can be changed, for example, in accordance with a control signal from the external controlling apparatus 10200. Further, an image pickup condition (for example, a frame rate, an exposure value or the like of the image pickup unit 10112) can be changed in accordance with a control signal from the external controlling apparatus 10200. Further, the substance of processing by the image processing unit 10113 or a condition for transmitting an image signal from the wireless communication unit 10114 (for example, a transmission interval, a transmission image number or the like) may be changed in accordance with a control signal from the external controlling apparatus 10200.

Further, the external controlling apparatus 10200 performs various image processes for an image signal transmitted thereto from the capsule type endoscope 10100 to generate image data for displaying a picked up in-vivo image on the display apparatus. As the image processes, various signal processes can be performed such as, for example, a development process (demosaic process), an image quality improving process (bandwidth enhancement process, a super-resolution process, a noise reduction (NR) process and/or image stabilization process) and/or an enlargement process (electronic zooming process). The external controlling apparatus 10200 controls driving of the display apparatus to cause the display apparatus to display a picked up in-vivo image on the basis of generated image data. Alternatively, the external controlling apparatus 10200 may also control a recording apparatus (not depicted) to record generated image data or control a printing apparatus (not depicted) to output generated image data by printing.

The example of the in-vivo information acquisition system to which the technology according to an embodiment of the present disclosure is applied has been described above. For example, by applying the image sensor 10 or 50 to the image pickup unit 10112, an in-vivo image with enhanced gray scale is able to be provided.

<Application Example to Mobile Body>

A technology (the present technology) according to the present disclosure can be applied to various products. For example, the technology according to the present disclosure may also be realized as a device mounted in a mobile body of any type such as automobile, electric vehicle, hybrid electric vehicle, motorcycle, bicycle, personal mobility, airplane, drone, ship, or robot.

Figure 29:
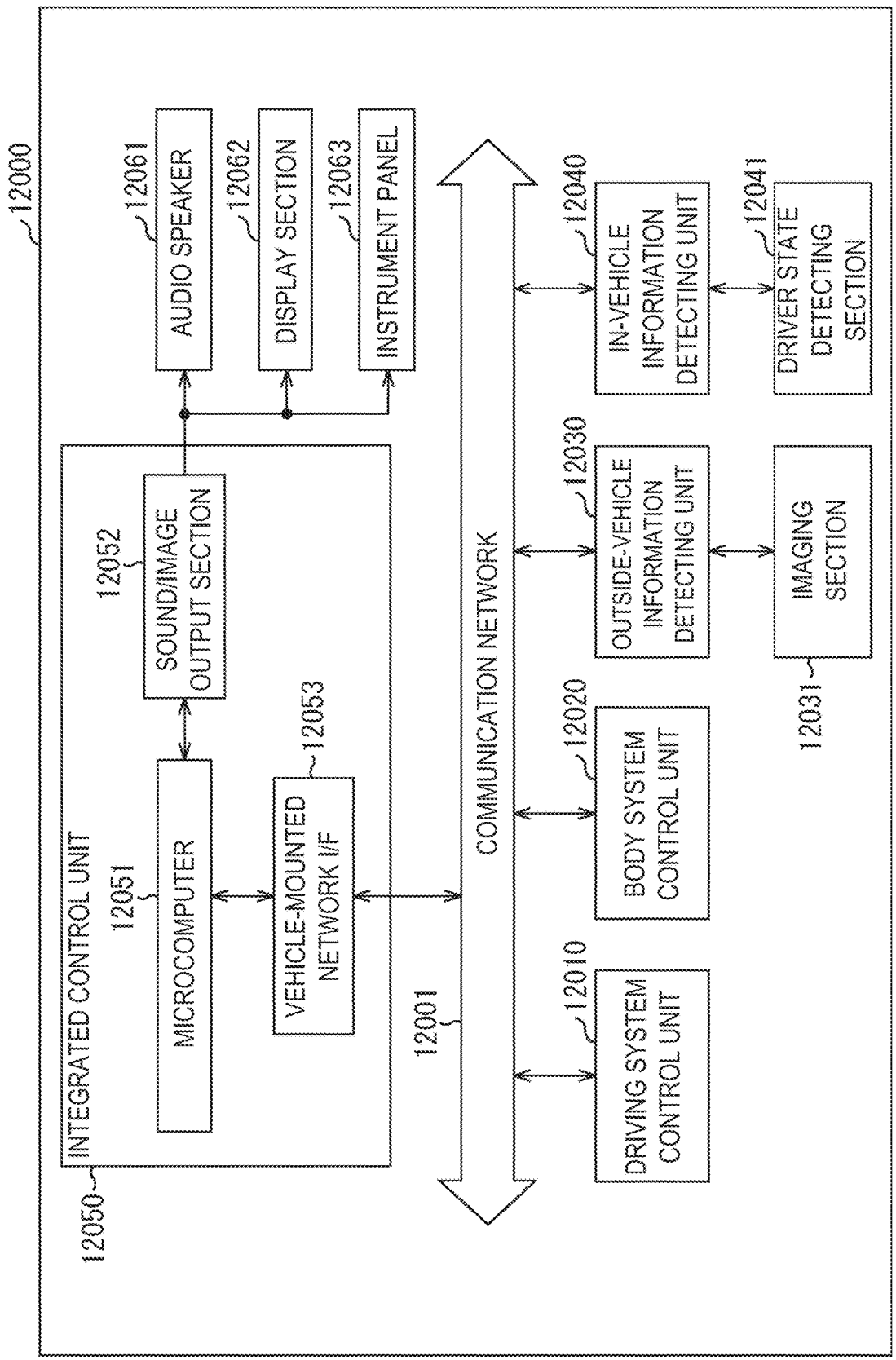
FIG. 29 is a block diagram depicting an example of schematic configuration of a vehicle control system.

FIG. 29 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 29, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or auditorily notifying information to an occupant of the vehicle or the outside of the vehicle. In the example of FIG. 29, an audio speaker 12061, a display section 12062, and an instrument panel 12063 are illustrated as the output device. The display section 12062 may, for example, include at least one of an on-board display or a head-up display.

Figure 30:
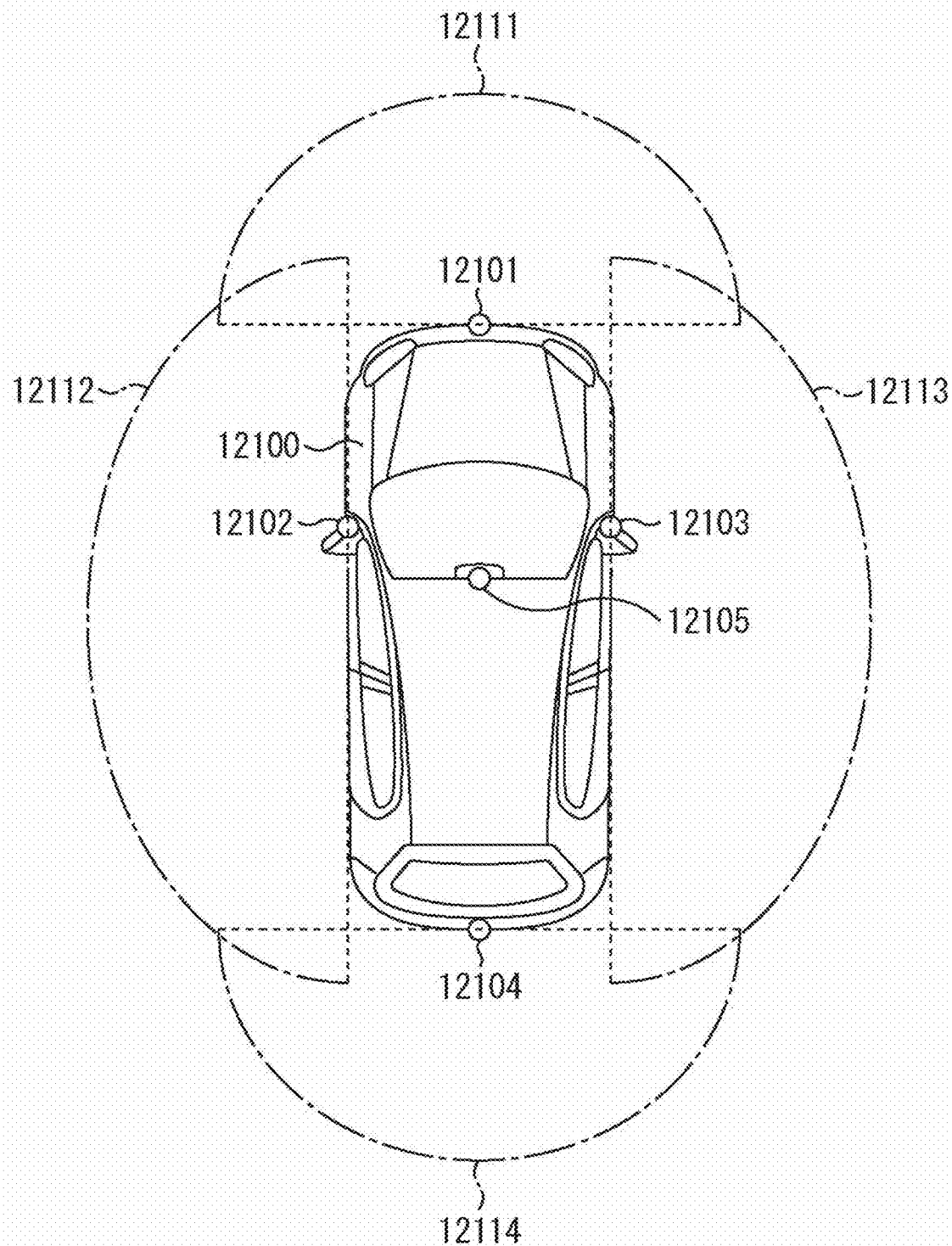
FIG. 30 is a diagram of assistance in explaining an example of installation positions of an outside-vehicle information detecting section and an imaging section.

FIG. 30 is a diagram depicting an example of the installation position of the imaging section 12031.

In FIG. 30, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 30 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to an embodiment of the present disclosure is applicable has been described above. For example, by applying the image sensor 10 or 50 to the imaging section 12031, it is possible to perform suitable driving support by obtaining a photographed image with a gray scale sufficient for driving support.

Additionally, embodiments of the present technology are not limited to the above-described embodiments, but various changes can be made within the scope of the present technology without departing from the gist of the present technology.

Additionally, the present technology may also be configured as below.

<1> A solid-state imaging device including:
a pixel array unit in which a pixel including a plurality of photoelectric conversion units having different light receiving sensitivities is disposed; and
an analog to digital (AD) conversion unit that compares an electric signal corresponding to a charge of the photoelectric conversion unit having a low light receiving sensitivity among the plurality of photoelectric conversion units included in the pixel of the pixel array unit with a nonlinear reference signal that changes nonlinearly to perform AD conversion on the electric signal.

<2> The solid-state imaging device according to <1>, further including:
a digital to analog (DA) converter that outputs the nonlinear reference signal,
in which the AD conversion unit includes:
a comparator that compares the electric signal with the nonlinear reference signal; and
a counter that outputs a count value obtained by counting a time required for a change of the nonlinear reference signal until the electrical signal and the nonlinear reference signal match according to a result of the comparison between the electrical signal and the nonlinear reference signal.

<3> The solid-state imaging device according to <2>, in which the comparator compares a noise signal of the electric signal with the nonlinear reference signal.

<4> The solid-state imaging device according to <3>, in which the DA converter outputs the nonlinear reference signal changing in a concave shape.

<5> The solid-state imaging device according to <4>, in which the DA converter increases the nonlinear reference signal to a voltage greater than a predetermined voltage, decreases the nonlinear reference signal to the predetermined voltage, and then changes the reference signal nonlinearly.

<6> The solid-state imaging device according to <4> or <5>, in which the DA converter further outputs the nonlinear reference signal changing in a convex shape, and the comparator compares a data signal among electric signals corresponding to a charge of the photoelectric conversion units having a high light receiving sensitivity among the plurality of photoelectric conversion units included in the pixel with the nonlinear reference signal.

<7> The solid-state imaging device according to any of <2> to <6>, in which the DA converter has a plurality of switches connected in parallel through which a current flowing through a resistance causing a voltage drop serving as the nonlinear reference signal flows, reduces a voltage as the nonlinear reference signal by sequentially turning off ½ switches among the plurality of switches, performs clearing for turning the plurality of switches, reduces a current flowing through the switches to ½, reduces the voltage as the nonlinear reference signal by sequentially turning off the ½ switches among the plurality of switches, and thus generates the nonlinear reference signal of which slope before and after the clearing changes.

<8> The solid-state imaging device according to <7>, in which a predetermined waiting time is provided before the clearing and the reduction of the current flowing through the switches.

<9> The solid-state imaging device according to <7>, in which a timing of the clearing and the reduction of the current flowing through the switches is changed.

<10> The solid-state imaging device according to <2>, in which the DA converter generates the nonlinear reference signal by changing a frequency of a clock driving the DA converter.

<11> The solid-state imaging device according to any of <2> to <10>, further including:
a correction unit that corrects nonlinear data that is the AD conversion result of the electric signal using the nonlinear reference signal to linear data that is the AD conversion result using a linear reference signal that changes linearly.

<12> A driving method including:
comparing an electric signal corresponding to a charge of a photoelectric conversion unit having a low light receiving sensitivity among a plurality of photoelectric conversion units included in a pixel of a pixel array unit in which the pixel including the plurality of photoelectric conversion units having different light receiving sensitivities is disposed with a nonlinear reference signal that changes nonlinearly to perform analog to digital (AD) conversion on the electric signal.

<13> An electronic device including:
a solid-state imaging device; and
a control unit that controls the solid-state imaging device,
in which the solid-state imaging device includes:
a pixel array unit in which a pixel including a plurality of photoelectric conversion units having different light receiving sensitivities is disposed; and
an analog to digital (AD) conversion unit that compares an electric signal corresponding to a charge of the photoelectric conversion unit having a low light receiving sensitivity among the plurality of photoelectric conversion units included in the pixel of the pixel array unit with a nonlinear reference signal that changes nonlinearly to perform AD conversion on the electric signal.

<14> A solid-state imaging device including:
a pixel array unit in which a pixel including a plurality of photoelectric conversion units having different light receiving sensitivities is disposed; and
an analog to digital (AD) conversion unit that compares an electric signal corresponding to a charge of the photoelectric conversion unit having a low light receiving sensitivity among the plurality of photoelectric conversion units included in the pixel of the pixel array unit with a linear reference signal that changes linearly to perform AD conversion on the electric signal,
in which the AD conversion unit includes:
a comparator that compares the electric signal with the linear reference signal; and
a counter that outputs a count value obtained by counting a time required for a change of the linear reference signal according to a clock of which a frequency is changed until the electrical signal and the linear reference signal match according to a result of the comparison between the electrical signal and the linear reference signal.

<15> A driving method including:
by an analog to digital (AD) conversion unit of an solid-state imaging device including a pixel array unit in which a pixel including a plurality of photoelectric conversion units having different light receiving sensitivities is disposed, and the AD conversion unit that compares an electric signal corresponding to a charge of the photoelectric conversion unit having a low light receiving sensitivity among the plurality of photoelectric conversion units included in the pixel of the pixel array unit with a linear reference signal that linearly changes to perform an AD conversion on the electric signal,
comparing the electric signal with the linear reference signal; and
outputting a count value obtained by counting a time required for a change of the linear reference signal according to a clock of which a frequency is changed until the electrical signal and the linear reference signal matches according to a result of the comparison between the electrical signal and the linear reference signal.

<16> An electronic device including:
a solid-state imaging device; and
a control unit that controls the solid-state imaging device,
in which the solid-state imaging device includes:
a pixel array unit in which a pixel including a plurality of photoelectric conversion units having different light receiving sensitivities is disposed; and
an analog to digital (AD) conversion unit that compares an electric signal corresponding to a charge of the photoelectric conversion unit having a low light receiving sensitivity among the plurality of photoelectric conversion units included in the pixel of the pixel array unit with a linear reference signal that changes linearly to perform AD conversion on the electric signal, and
the AD conversion unit comprises:
a comparator that compares the electric signal with the linear reference signal; and
a counter that outputs a count value obtained by counting a time required for a change of the linear reference signal according to a clock of which a frequency is changed until the electrical signal and the linear reference signal match according to a result of the comparison between the electrical signal and the linear reference signal.

Additionally, the present technology may also be configured as below.

(B1) A solid-state imaging device including:
a pixel array unit in which pixels including a plurality of photoelectric conversion portions with different light reception sensitivities are arrayed; and
an AD conversion unit configured to perform AD conversion nonlinearly on an electric signal corresponding to the photoelectric conversion portion with the lower light reception sensitivity among the plurality of photoelectric conversion portions included in the pixels of the pixel array unit.

(B2) The solid-state imaging device according to (B1),
in which the AD conversion unit includes
a DA converter configured to output a ramp wave to be compared to the electric signal output from the pixel of the pixel array unit, and
a counter configured to perform count in accordance with a counter driving frequency on the basis of a comparison result of the ramp wave and the electric signal output from the pixel of the pixel array unit,
the DA converter outputs a nonlinear ramp wave to be compared to the electric signal corresponding to the photoelectric conversion portion with the lower light reception sensitivity among the plurality of photoelectric conversion portions included in the pixels, and
the counter performs the count in accordance with the constant counter driving frequency.

(B3) The solid-state imaging device according to (B2),
in which the DA converter outputs the nonlinear ramp wave to be compared to the electric signal of a P-phase corresponding to the photoelectric conversion portion with the lower light reception sensitivity subjected to DDS driving among the plurality of photoelectric conversion portions included in the pixels.

(B4) The solid-state imaging device according to (B2) or (B3),
in which the DA converter outputs a nonlinear concave ramp wave to be compared to the electric signal of a P-phase corresponding to the photoelectric conversion portion with the lower light reception sensitivity subjected to DDS driving among the plurality of photoelectric conversion portions included in the pixels.

(B5) The solid-state imaging device according to (B4),
in which the DA converter outputs the nonlinear concave ramp wave by offsetting a slope start position of the nonlinear concave ramp wave upward.

(B6) The solid-state imaging device according to any of (B2) to (B5),
in which the DA converter outputs a nonlinear convex ramp wave to be compared to the electric signal of a D-phase corresponding to the photoelectric conversion portion with the higher light reception sensitivity subjected to CDS driving among the plurality of photoelectric conversion portions included in the pixels.

(B7) The solid-state imaging device according to any of (B2) to (B6),
in which the DA converter includes a shift register.

(B8) The solid-state imaging device according to (B7),
in which a CLR signal is input to the shift register for each gain switching time.

(B9) The solid-state imaging device according to (B7) or (B8),
in which a waiting time is provided after a CLR signal is input to the shift register for each gain switching time.

(B10) The solid-state imaging device according to (B7),
in which a CLR signal is input to the shift register at any timing.

(B11) The solid-state imaging device according to (B2),
in which the DA converter is driven in accordance with a DA converter driving frequency to be changed and hereby outputs the nonlinear ramp wave to be compared to the electric signal corresponding to the photoelectric conversion portion with the lower light reception sensitivity among the plurality of photoelectric conversion portions included in the pixels.

(B12) The solid-state imaging device according to (B1),
in which the AD conversion unit includes
a DA converter configured to output a ramp wave to be compared to the electric signal output from the pixel of the pixel array unit, and
a counter configured to perform count in accordance with a counter driving frequency on the basis of a comparison result of the ramp wave and the electric signal output from the pixel of the pixel array unit,
the DA converter outputs a linear ramp wave, and
the counter performs the count in accordance with the counter driving frequency to be changed.

(B13) The solid-state imaging device according to any of (B1) to (B12), further including: a correction unit configured to correct nonlinear data output from the AD conversion unit to linear data.

(B14) A driving method for a solid-state imaging device including a pixel array unit in which pixels including a plurality of photoelectric conversion portions with different light reception sensitivities are arrayed, the driving method including:
performing AD conversion nonlinearly on an electric signal corresponding to the photoelectric conversion portion with the lower light reception sensitivity among the plurality of photoelectric conversion portions included in the pixels of the pixel array unit.

(B15) An electronic device on which a solid-state imaging device is mounted,
in which the solid-state imaging device includes
a pixel array unit in which pixels including a plurality of photoelectric conversion portions with different light reception sensitivities are arrayed, and
an AD conversion unit configured to perform AD conversion nonlinearly on an electric signal corresponding to the photoelectric conversion portion with the lower light reception sensitivity among the plurality of photoelectric conversion portions included in the pixels of the pixel array unit.

REFERENCE SIGNS LIST 10 image sensor
11 pixel array unit
11P pixel
12 address decoder
13 pixel timing driving unit
14 AD conversion unit
15 sensor controller
21 constant current circuit
22 DA converter
23 comparator
24 counter
31 IREF
32 PGC DAC
33 CLP DAC
34 RAMP DAC
41 LPF
61 logic unit
62 DSP

The invention claimed is:
1. A solid-state imaging device comprising:
a pixel array unit in which a pixel including a plurality of photoelectric conversion units having different light receiving sensitivities is disposed, wherein the plurality of photoelectric conversion units includes a first photoelectric conversion unit having a first light receiving sensitivity and a second photoelectric conversion unit having a second light receiving sensitivity lower than the first light receiving sensitivity; and
an analog to digital (AD) conversion unit configured to:
compare a first electric signal corresponding to a charge of the first photoelectric conversion unit with a linear reference signal to perform AD conversion on the first electric signal; and
compare a second electric signal corresponding to a charge of the second photoelectric conversion unit with a nonlinear reference signal that changes nonlinearly to perform AD conversion on the second electric signal.

2. The solid-state imaging device according to claim 1, further comprising:
a digital to analog (DA) converter configured to output the nonlinear reference signal,
wherein the AD conversion unit includes:
a comparator configured to compare the second electric signal with the nonlinear reference signal; and
a counter configured to output a count value obtained by counting a time required for a change of the nonlinear reference signal until the second electrical signal and the nonlinear reference signal match according to a result of the comparison between the second electric signal and the nonlinear reference signal.

3. The solid-state imaging device according to claim 2, wherein the comparator is further configured to compare a noise signal of the second electric signal with the nonlinear reference signal.

4. The solid-state imaging device according to claim 3, wherein the DA converter is further configured to output the nonlinear reference signal changing in a concave shape.

5. The solid-state imaging device according to claim 4, wherein the DA converter is further configured to increase the nonlinear reference signal to a voltage greater than a predetermined voltage, decrease the nonlinear reference signal to the predetermined voltage, and then change the reference signal nonlinearly.

6. The solid-state imaging device according to claim 4, wherein the DA converter is further configured to output the nonlinear reference signal changing in a convex shape, and
the comparator is further configured to compare a data signal among electric signals corresponding to a charge of the photoelectric conversion units having a high light receiving sensitivity among the plurality of photoelectric conversion units included in the pixel with the nonlinear reference signal.

7. The solid-state imaging device according to claim 2, wherein the DA converter has a plurality of switches connected in parallel through which a current flowing through a resistance causing a voltage drop serving as the nonlinear reference signal flows, reduces a voltage as the nonlinear reference signal by sequentially turning off ½ switches among the plurality of switches, performs clearing for turning the plurality of switches, reduces a current flowing through the switches to ½, reduces the voltage as the nonlinear reference signal by sequentially turning off the ½ switches among the plurality of switches, and thus generates the nonlinear reference signal of which slope before and after the clearing changes.

8. The solid-state imaging device according to claim 7, wherein a predetermined waiting time is provided before the clearing and the reduction of the current flowing through the switches.

9. The solid-state imaging device according to claim 7, wherein a timing of the clearing and the reduction of the current flowing through the switches is changed.

10. The solid-state imaging device according to claim 2, wherein the DA converter is configured to generate the nonlinear reference signal by changing a frequency of a clock driving the DA converter.

11. The solid-state imaging device according to claim 2, further comprising:
a correction unit configured to correct nonlinear data that is the AD conversion result of the second electric signal using the nonlinear reference signal to linear data that is the AD conversion result using a linear reference signal that changes linearly.

12. A driving method comprising:
comparing a first electric signal corresponding to a charge of a first photoelectric conversion unit having a first light receiving sensitivity with a linear reference signal to perform analog to digital (AD) conversion on the first electric signal; and
comparing a second electric signal corresponding to a charge of a second photoelectric conversion unit having a second light receiving sensitivity lower than the first light receiving sensitivity with a nonlinear reference signal that changes nonlinearly to perform AD conversion on the second electric signal.

13. An electronic device comprising:
a solid-state imaging device; and
a control unit configured to control the solid-state imaging device,
wherein the solid-state imaging device includes:
a pixel array unit in which a pixel including a plurality of photoelectric conversion units having different light receiving sensitivities is disposed, wherein the plurality of photoelectric conversion units includes a first photoelectric conversion unit having a first light receiving sensitivity and a second photoelectric conversion unit having a second light receiving sensitivity lower than the first light receiving sensitivity; and
an analog to digital (AD) conversion unit configured to:
compare a first electric signal corresponding to a charge of the first photoelectric conversion unit with a linear reference signal to perform AD conversion on the first electric signal; and
compare a second electric signal corresponding to a charge of the second photoelectric conversion unit with a nonlinear reference signal that changes nonlinearly to perform AD conversion on the second electric signal.

14. A solid-state imaging device comprising:
a pixel array unit in which a pixel including a plurality of photoelectric conversion units having different light receiving sensitivities is disposed; and
an analog to digital (AD) conversion unit configured to:
compare an electric signal corresponding to a charge of the photoelectric conversion unit having a low light receiving sensitivity among the plurality of photoelectric conversion units included in the pixel of the pixel array unit with a nonlinear reference signal that changes nonlinearly to perform AD conversion on the electric signal,
wherein the AD conversion unit includes:
a comparator configured to compare the electric signal with the linear reference signal; and
a counter configured to output a count value obtained by counting a time required for a change of the linear reference signal according to a clock of which a frequency is changed until the electrical signal and the linear reference signal match according to a result of the comparison between the electric signal and the linear reference signal.

15. A driving method comprising:
by an analog to digital (AD) conversion unit of a solid-state imaging device including a pixel array unit in which a pixel including a plurality of photoelectric conversion units having different light receiving sensitivities is disposed, and the AD conversion unit that compares an electric signal corresponding to a charge of the photoelectric conversion unit having a low light receiving sensitivity among the plurality of photoelectric conversion units included in the pixel of the pixel array unit with a linear reference signal that linearly changes to perform an AD conversion on the electric signal, comparing the electric signal with the linear reference signal; and outputting a count value obtained by counting a time required for a change of the linear reference signal according to a clock of which a frequency is changed until the electrical signal and the linear reference signal matches according to a result of the comparison between the electrical electric signal and the linear reference signal.

16. An electronic device comprising:

a solid-state imaging device; and a control unit configured to control the solid-state imaging device, wherein the solid-state imaging device includes:

a pixel array unit in which a pixel including a plurality of photoelectric conversion units having different light receiving sensitivities is disposed; and an analog to digital (AD) conversion unit configured to compare an electric signal corresponding to a charge of the photoelectric conversion unit having a low light receiving sensitivity among the plurality of photoelectric conversion units included in the pixel of the pixel array unit with a linear reference signal that changes linearly to perform AD conversion on the electric signal, and the AD conversion unit comprises:

a comparator configured to compare the electric signal with the linear reference signal; and a counter configured to output a count value obtained by counting a time required for a change of the linear reference signal according to a clock of which a frequency is changed until the electrical signal and the linear reference signal match according to a result of the comparison between the electric signal and the linear reference signal.

* * * * *